United States Patent
Marleau et al.

(10) Patent No.: US 10,526,025 B2
(45) Date of Patent: *Jan. 7, 2020

(54) TRACKED VEHICLE AND CHASSIS THEREFOR

(71) Applicant: Prinoth Ltd., St. John (CA)

(72) Inventors: Benoit Marleau, Granby (CA); Alain Chabot, Waterloo (CA); Carl Gagné, Bromont (CA)

(73) Assignee: Prinoth Ltd., St. John, New Brunswick (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/574,863

(22) PCT Filed: Sep. 25, 2015

(86) PCT No.: PCT/EP2015/072138
§ 371 (c)(1),
(2) Date: Nov. 17, 2017

(87) PCT Pub. No.: WO2016/198130
PCT Pub. Date: Dec. 15, 2016

(65) Prior Publication Data
US 2018/0127035 A1    May 10, 2018

Related U.S. Application Data

(60) Provisional application No. 62/173,990, filed on Jun. 11, 2015.

(51) Int. Cl.
*B62D 55/10*     (2006.01)
*B62D 21/18*     (2006.01)
(Continued)

(52) U.S. Cl.
CPC ........... *B62D 55/10* (2013.01); *B62D 21/186* (2013.01); *B62D 55/062* (2013.01);
(Continued)

(58) Field of Classification Search
CPC .... B62D 55/10; B62D 55/062; B62D 55/244; B62D 55/305; B62D 21/186
(Continued)

(56) References Cited

U.S. PATENT DOCUMENTS 4,683,969 A  *  8/1987  Littau ................... B62D 55/06
                                                    180/6.48
5,598,896 A  *  2/1997  Haest ................... B62D 55/084
                                                    180/9.48
(Continued)

FOREIGN PATENT DOCUMENTS

WO    WO 2010/066045 A1    6/2010
WO    WO 2013/029165 A1    3/2013

OTHER PUBLICATIONS

International PatentApplication PCT/EP2015/072138 International Search Report and Written Opinion dated May 10, 2017. 20 pages.
(Continued)

*Primary Examiner* — Tony H Winner
(74) *Attorney, Agent, or Firm* — Woodard, Emhardt, Henry, Reeves & Wagner LLP

(57) ABSTRACT

A tracked vehicle with a chassis comprising an upper frame structure connected to a lower frame structure, the lower frame structure spanning a longitudinal distance along a longitudinal direction of the vehicle, wherein over a first portion of the longitudinal distance, the lower frame structure overlaps with the upper frame structure and wherein over a second portion of the longitudinal distance, the lower frame structure does not overlap with the upper frame structure. The tracked vehicle may also comprise an operator
(Continued)

cabin, power plant mounted to the upper frame structure and a plurality of track assemblies for traction of the tracked vehicle. Each track assembly is mounted to the lower frame structure of the chassis and comprises a drive wheel; an end wheel; and a plurality of support wheels therebetween; and an endless track disposed around the plurality of wheels for engaging a ground on which the tracked vehicle travels.

49 Claims, 41 Drawing Sheets

(51) Int. Cl.
    *B62D 55/06*     (2006.01)
    *B62D 55/24*     (2006.01)
    *B62D 55/253*     (2006.01)
    *B62D 55/30*     (2006.01)

(52) U.S. Cl.
    CPC ......... *B62D 55/244* (2013.01); *B62D 55/253* (2013.01); *B62D 55/305* (2013.01)

(58) Field of Classification Search
    USPC .................................................. 180/9.23, 9.48
    See application file for complete search history.

(56) References Cited

U.S. PATENT DOCUMENTS

| | | | | |
|---|---|---|---|---|
| 6,145,610 | A * | 11/2000 | Gallignani | ........... B62D 55/084 |
| | | | | 180/9.48 |
| 8,607,903 | B2 * | 12/2013 | Godin | .................. B62D 55/104 |
| | | | | 180/9.1 |
| 2014/0174839 | A1 * | 6/2014 | Steben | .................. B62D 55/06 |
| | | | | 180/9.23 |
| 2014/0360811 | A1 | 12/2014 | Ross, Jr. et al. | |

OTHER PUBLICATIONS

Canadian Patent Application No. 2,983,949 Examiner's Report dated Aug. 28, 2018. 3 pages.
U.S. Appl. No. 16/145,439 Office Action dated Nov. 29, 2018. 13 pages.

* cited by examiner

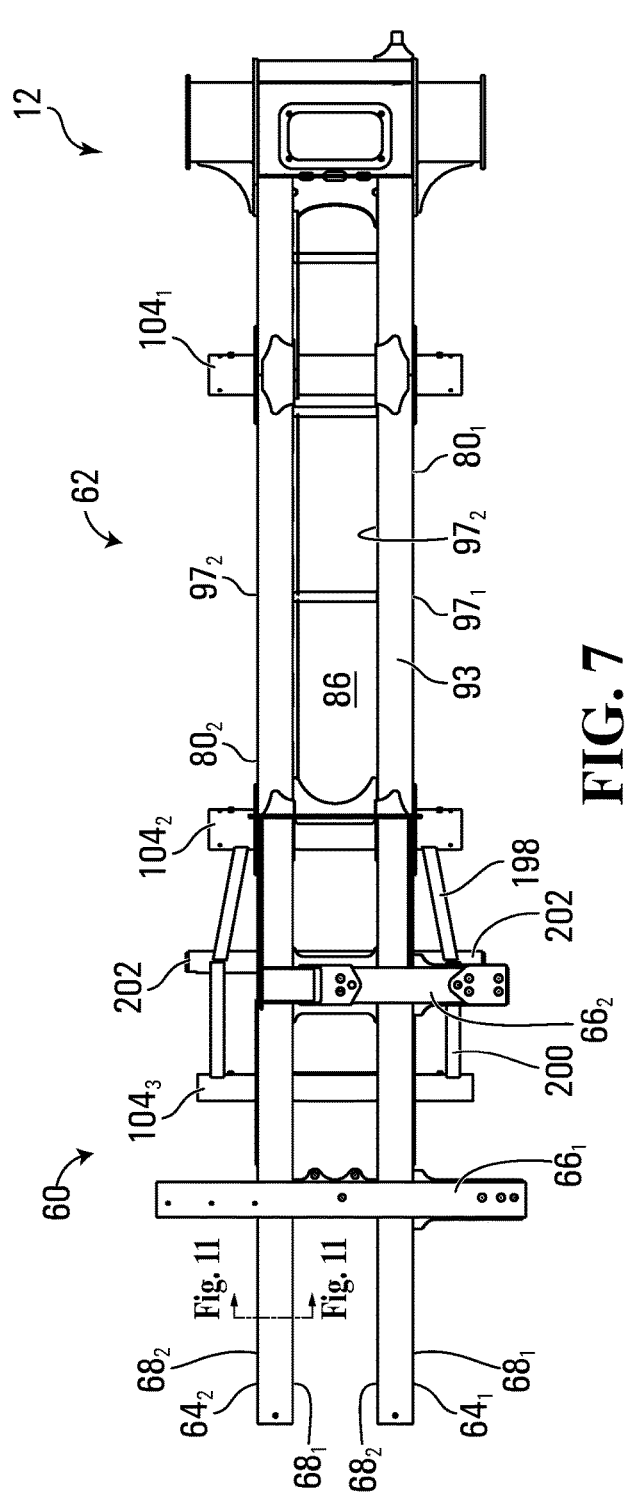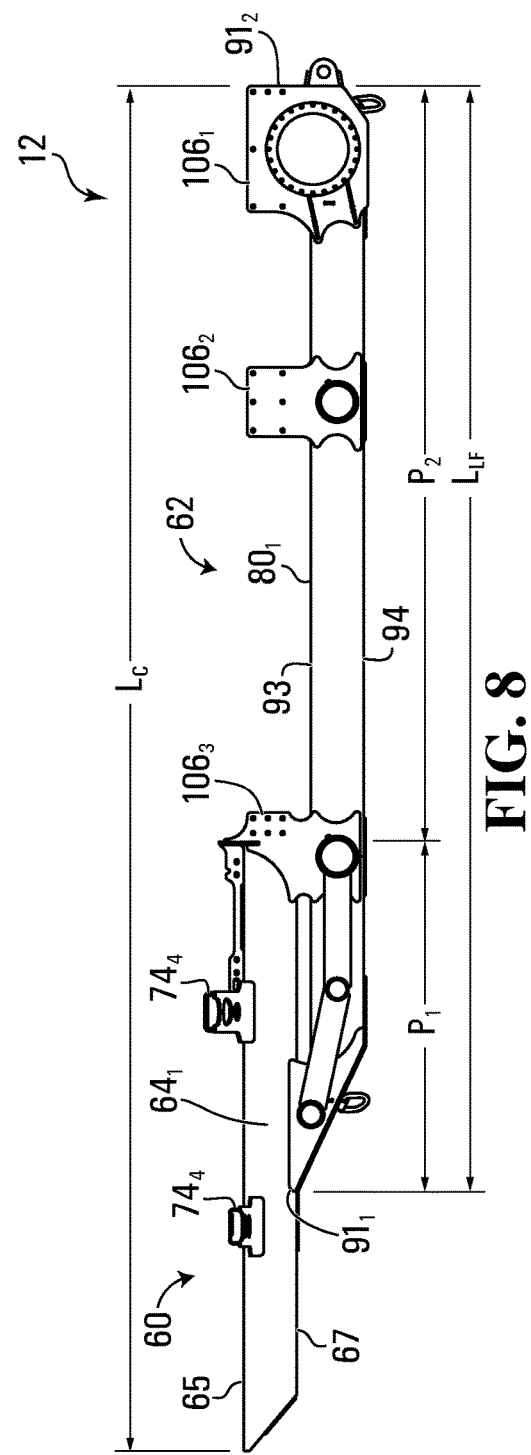
FIG. 7
FIG. 8

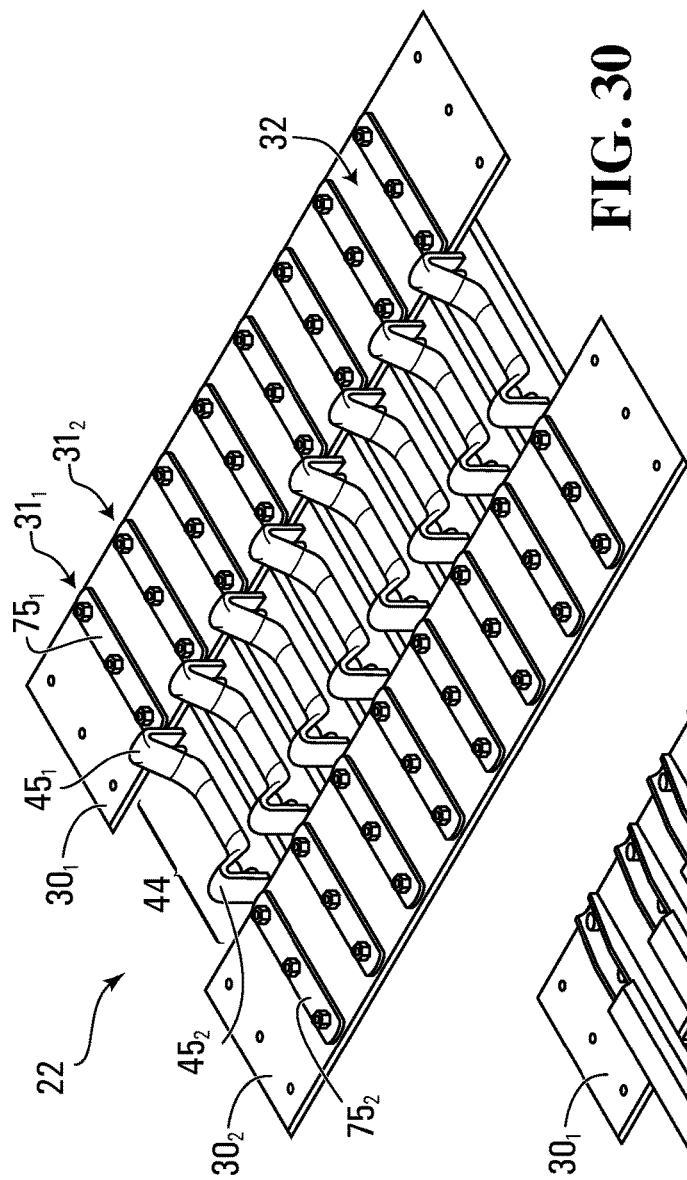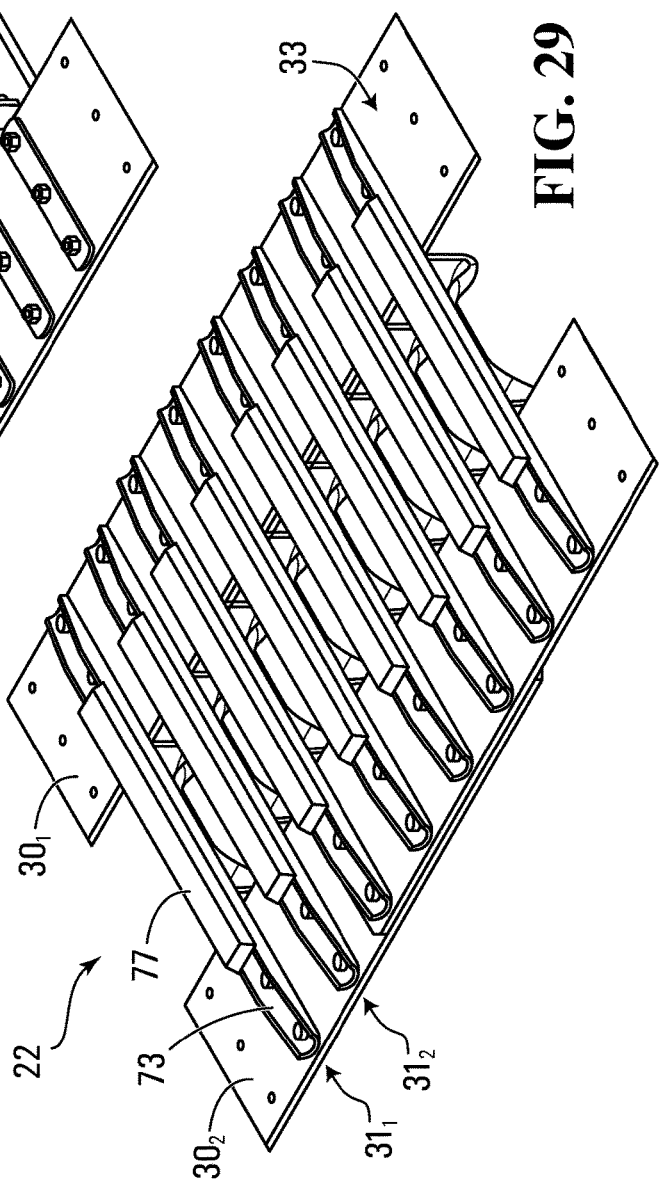

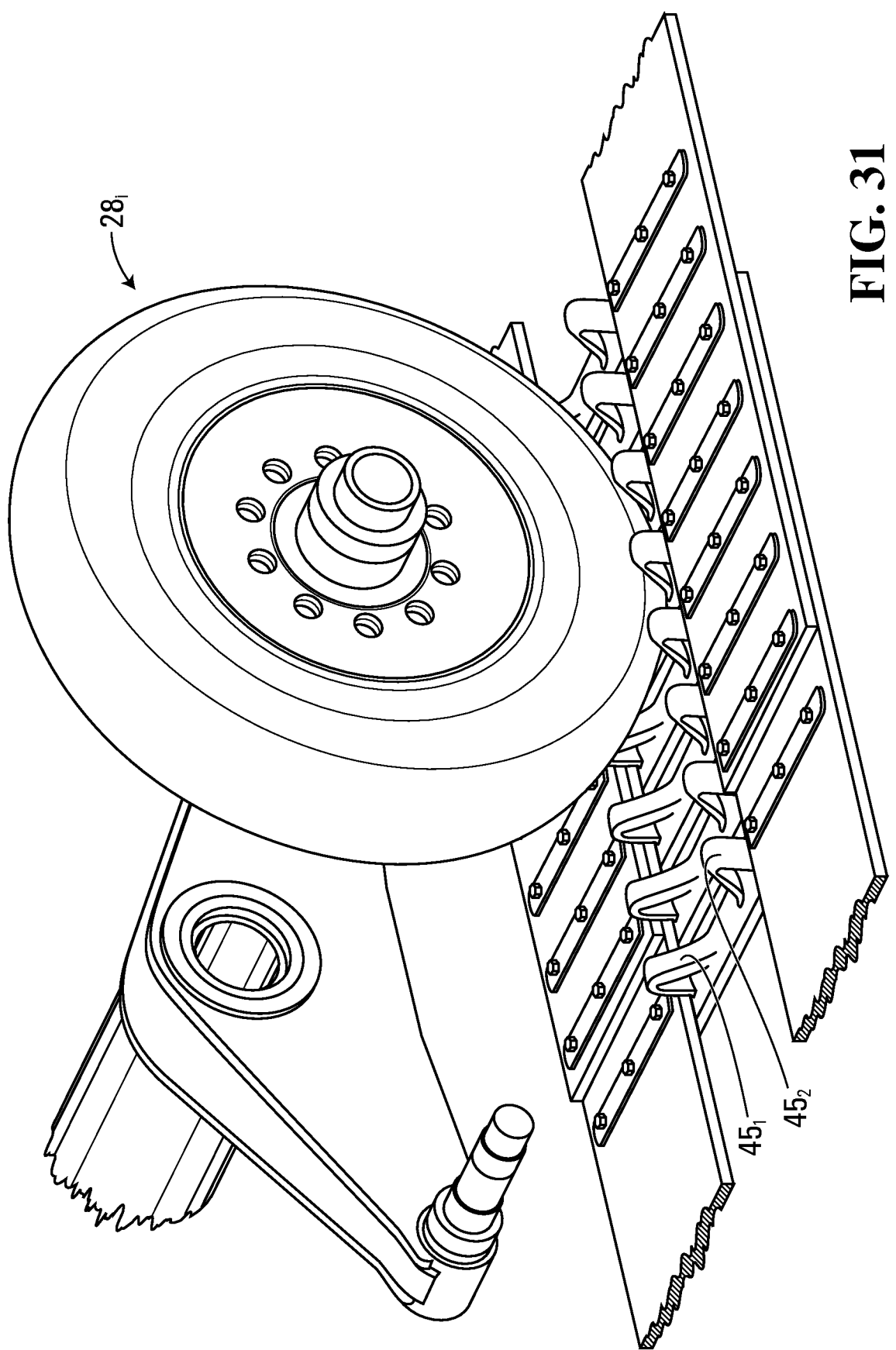

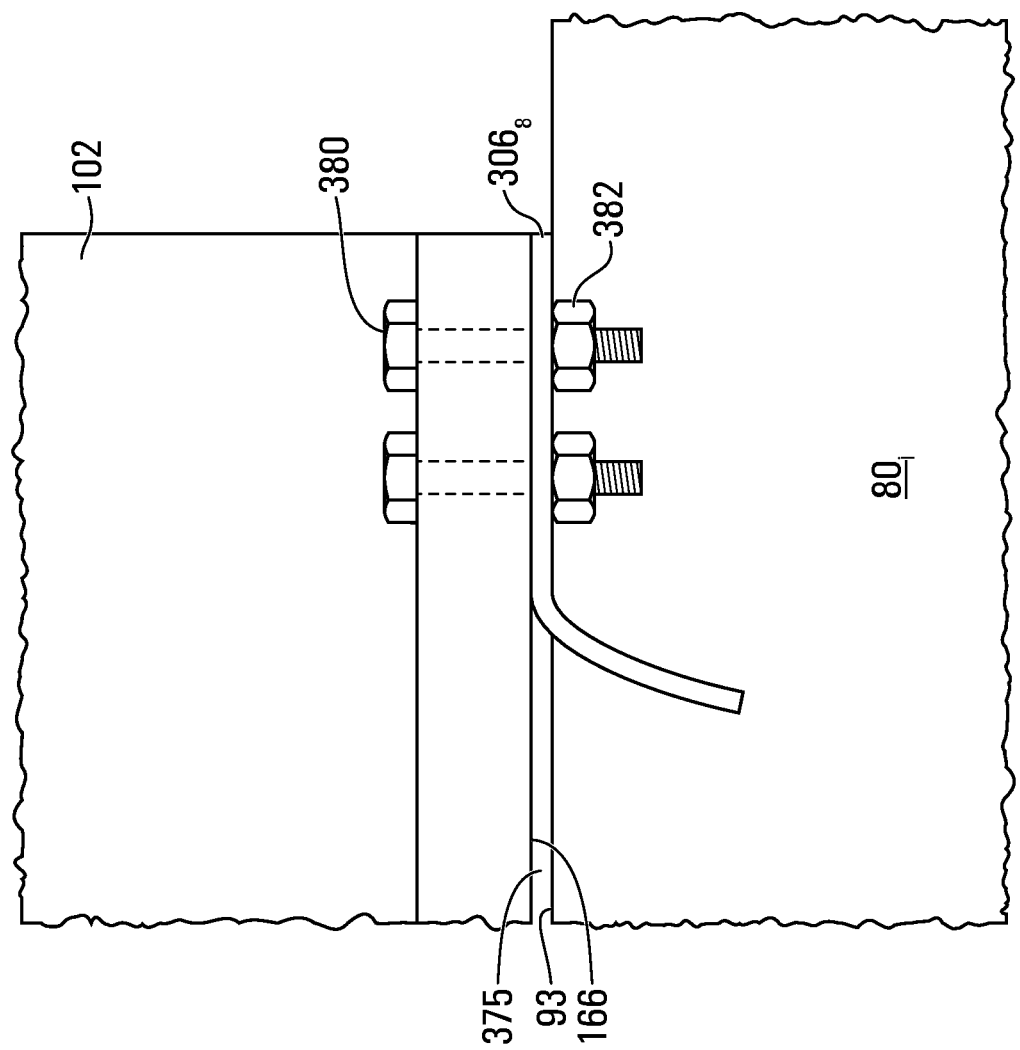

TRACKED VEHICLE AND CHASSIS THEREFOR

CROSS-REFERENCE TO RELATED APPLICATION

The present application claims the benefit of U.S. Provisional Application Ser. No. 62/173,990, filed on Jun. 11, 2015, which is hereby incorporated by reference herein.

FIELD

The invention relates to tracked vehicles designed to travel on various terrains, including rugged terrain, for example, tracked utility vehicles carrying work equipment.

BACKGROUND

One type of tracked vehicle is a tracked utility vehicle, sometimes referred to as a "tracked carrier" or "tracked equipment carrier" vehicle, which carries and enables use of work equipment, such as a crane, an aerial device, a drill rig, a digger derrick, and/or any other industrial apparatus, on various terrains, including rugged terrain (e.g., with mud, steep hills, swamps, rocks, mud, and/or snow).

It is often desirable for a tracked utility vehicle to have a carrying capacity as large as possible but yet be sized such that the vehicle can fit a public road infrastructure. For example, it may be desirable that the vehicle be low enough to fit below an underpass or otherwise respect a vehicle height limit of the public road infrastructure (e.g., when transported on a truck's deck trailer). This typically imposes certain limitations on components of the vehicle. For instance, this may limit a size of a chassis of the vehicle, to avoid interference of the work equipment with public road infrastructures (e.g., bridges) or to otherwise respect the vehicle height limit of the public road infrastructure.

Moreover, it may also be desirable to facilitate the installation of the work equipment onto the chassis of the vehicle.

The work equipment carried by a tracked utility vehicle is normally mounted to the vehicle's frame. This can often present issues or challenges. For example, the work equipment is often designed to be installed on a truck's frame. Since the tracked utility vehicle's frame is typically very different from a truck's frame, the work equipment cannot be mounted as readily to the tracked utility vehicle's frame than to a truck's frame. Rather, modifications may have to be made to the work equipment and/or to the tracked utility vehicle to allow the work equipment to be installed on the tracked utility vehicle's frame. For instance, in some cases, an intermediate support structure may need to be installed between the work equipment and the tracked utility vehicle's frame to support and anchor the work equipment.

Challenges similar to those discussed above in respect of a tracked utility vehicle may be encountered in other types of industrial tracked vehicles.

Accordingly, there is a need for improvements in tracked utility vehicles and other tracked vehicles.

SUMMARY

In accordance with an aspect of the invention, there is provided a tracked vehicle.

Accordingly, there may be provided a tracked vehicle that comprises a chassis comprising an upper frame structure connected to a lower frame structure, the lower frame structure spanning a longitudinal distance along a longitudinal direction of the tracked vehicle, wherein over a first portion of the longitudinal distance, the lower frame structure overlaps with the upper frame structure and wherein over a second portion of the longitudinal distance, the lower frame structure does not overlap with the upper frame structure. The tracked vehicle may also comprise an operator cabin mounted to the upper frame structure of the chassis; a power plant mounted to the upper frame structure of the chassis and comprising a prime mover; and a plurality of track assemblies for traction of the tracked vehicle, a first one of the track assemblies being on a first lateral side of the tracked vehicle, a second one of the track assemblies being on a second lateral side of the tracked vehicle. Each track assembly of the plurality of track assemblies may be mounted to the lower frame structure of the chassis may comprise a plurality of wheels including a drive wheel; an end wheel spaced apart from the drive wheel in the longitudinal direction of the tracked vehicle; and a plurality of support wheels arranged between the drive wheel and the end wheel; and may also comprise an endless track disposed around the plurality of wheels for engaging a ground on which the tracked vehicle travels, the drive wheel being in driving engagement with the endless track to impart motion to the endless track.

There may also be provided a tracked vehicle that comprises a) a chassis extending in a longitudinal direction of the tracked vehicle; b) an operator cabin mounted on top of the chassis; c) a power plant mounted to the chassis and comprising a prime mover; and d) a plurality of track assemblies for traction of the tracked vehicle, a first one of the track assemblies being on a first lateral side of the tracked vehicle, a second one of the track assemblies being on a second lateral side of the tracked vehicle. Each track assembly of the plurality of track assemblies may be mounted to the chassis and may comprise a plurality of wheels including: a drive wheel; an end wheel spaced apart from the drive wheel in the longitudinal direction of the tracked vehicle; and a plurality of support wheels arranged between the drive wheel and the end wheel; and may comprise an endless track disposed around the plurality of wheels for engaging a ground on which the tracked vehicle travels, the drive wheel being in driving engagement with the endless track to impart motion to the endless track. The chassis may have a first portion directly under the operator cabin and a second portion behind the operator cabin in the longitudinal direction of the tracked vehicle, the first portion being structurally reinforced so as to provide a greater resistance to torsion than the second portion.

There may also be provided a tracked vehicle comprising: a chassis with a lowered portion in which a torque box is received; an operator cabin mounted to the chassis; a power plant mounted to the chassis and comprising a prime mover; and a plurality of track assemblies for traction of the tracked vehicle, a first one of the track assemblies being on a first lateral side of the tracked vehicle, a second one of the track assemblies being on a second lateral side of the tracked vehicle. Each track assembly of the plurality of track assemblies may be mounted to the chassis and may comprise a plurality of wheels including: a drive wheel; an end wheel spaced apart from the drive wheel in a longitudinal direction of the tracked vehicle; and a plurality of support wheels arranged between the drive wheel and the end wheel; and also having an endless track disposed around the plurality of wheels for engaging a ground on which the tracked vehicle travels, the drive wheel being in driving engagement with the endless track to impart motion to the endless track.

There may also be provided a tracked vehicle comprising: a) a chassis comprising an upper frame structure and a lower frame structure; the lower frame structure spanning a longitudinal distance along a longitudinal direction of the vehicle; over a first portion of the longitudinal distance spanned by the lower frame structure, the lower frame structure overlapping with a first section of the upper frame structure; over a second portion of the longitudinal distance, the lower frame structure overlapping with a second section of the upper frame structure, the second section of the upper frame structure comprising a torque box; the first and second sections of the upper frame structure being secured to the lower frame structure; b) an operator cabin mounted to the chassis; c) a power plant mounted to the chassis and comprising a prime mover; and d) a plurality of track assemblies for traction of the tracked vehicle, a first one of the track assemblies being on a first lateral side of the tracked vehicle, a second one of the track assemblies being on a second lateral side of the tracked vehicle, where each track assembly of the plurality of track assemblies may be mounted to the chassis and comprise: i) a plurality of wheels including: a drive wheel; an end wheel spaced apart from the drive wheel in the longitudinal direction of the tracked vehicle; and a plurality of support wheels arranged between the drive wheel and the end wheel; and also an endless track disposed around the plurality of wheels for engaging a ground on which the tracked vehicle travels, the drive wheel being in driving engagement with the endless track to impart motion to the endless track.

In accordance with another aspect of the invention, there is provided a method of installing a torque box on a tracked vehicle.

Accordingly, there may be provided a method for installing a torque box on a tracked vehicle, the tracked vehicle comprising a chassis extending in a longitudinal direction of the tracked vehicle and a plurality of track assemblies for traction of the vehicle, a first one of the track assemblies being on a first lateral side of the tracked vehicle, a second one of the track assemblies being on a second lateral side of the tracked vehicle, the method comprising: placing the torque box within a lowered channel defined by side walls and a frame structure of the chassis; and securing the torque box to at least the side walls.

Also, there may be provided a method for installing a torque box on a tracked vehicle, the tracked vehicle comprising a chassis extending in a longitudinal direction of the tracked vehicle, a plurality of track assemblies for traction of the vehicle, and an operator cabin mounted to the chassis, the method comprising: without removing the operator cabin from the chassis of the tracked vehicle, securing the torque box to a reinforced portion of the chassis under the operator cabin and to a lowered portion of the chassis behind the operator cabin.

In accordance with another aspect of the invention, there is provided a chassis for a tracked vehicle.

Accordingly, there may be provided a chassis for a tracked vehicle, comprising: an upper frame structure; and a lower frame structure connected to the upper frame structure, the lower frame structure spanning a longitudinal distance along a longitudinal direction of the tracked vehicle; wherein over a first portion of the longitudinal distance, the lower frame structure overlaps with the upper frame structure and wherein over a second portion of the longitudinal distance, the lower frame structure does not overlap with the upper frame structure.

Also, there may be provided a chassis extending in a longitudinal direction for a tracked vehicle having an operator cabin, comprising: a first portion directly under the operator cabin; and a second portion behind the operator cabin in the longitudinal direction, the second portion being lower to the ground than the first portion, the first portion being reinforced so as to provide a greater resistance to torsion than the second portion.

Also, there may be provided a chassis for a tracked vehicle, comprising: an upper frame structure; and a lower frame structure; wherein the lower frame structure spans a longitudinal distance along a direction of travel of the vehicle; wherein over a first portion of the longitudinal distance spanned by the lower frame structure, the lower frame structure overlaps with a first section of the upper frame structure; wherein over a second portion of the longitudinal distance, the lower frame structure overlaps with a second section of the upper frame structure, the second section of the upper frame structure comprising a torque box; and wherein the first and second sections of the upper frame structure are secured to each other and to the lower frame structure.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 7 and 8 respectively show a top and a side view of the chassis;

FIGS. 29 and 30 show a perspective view of a ground-engaging outer side, and a perspective view of an inner side, of an endless track in accordance with another embodiment of the invention;

FIG. 31 shows a perspective view of a support wheel of a track assembly in accordance with another embodiment of the invention;

FIG. 49 shows a connection between the torque box and the lateral frontal plate of FIGS. 47 and 48.

Figure 1:
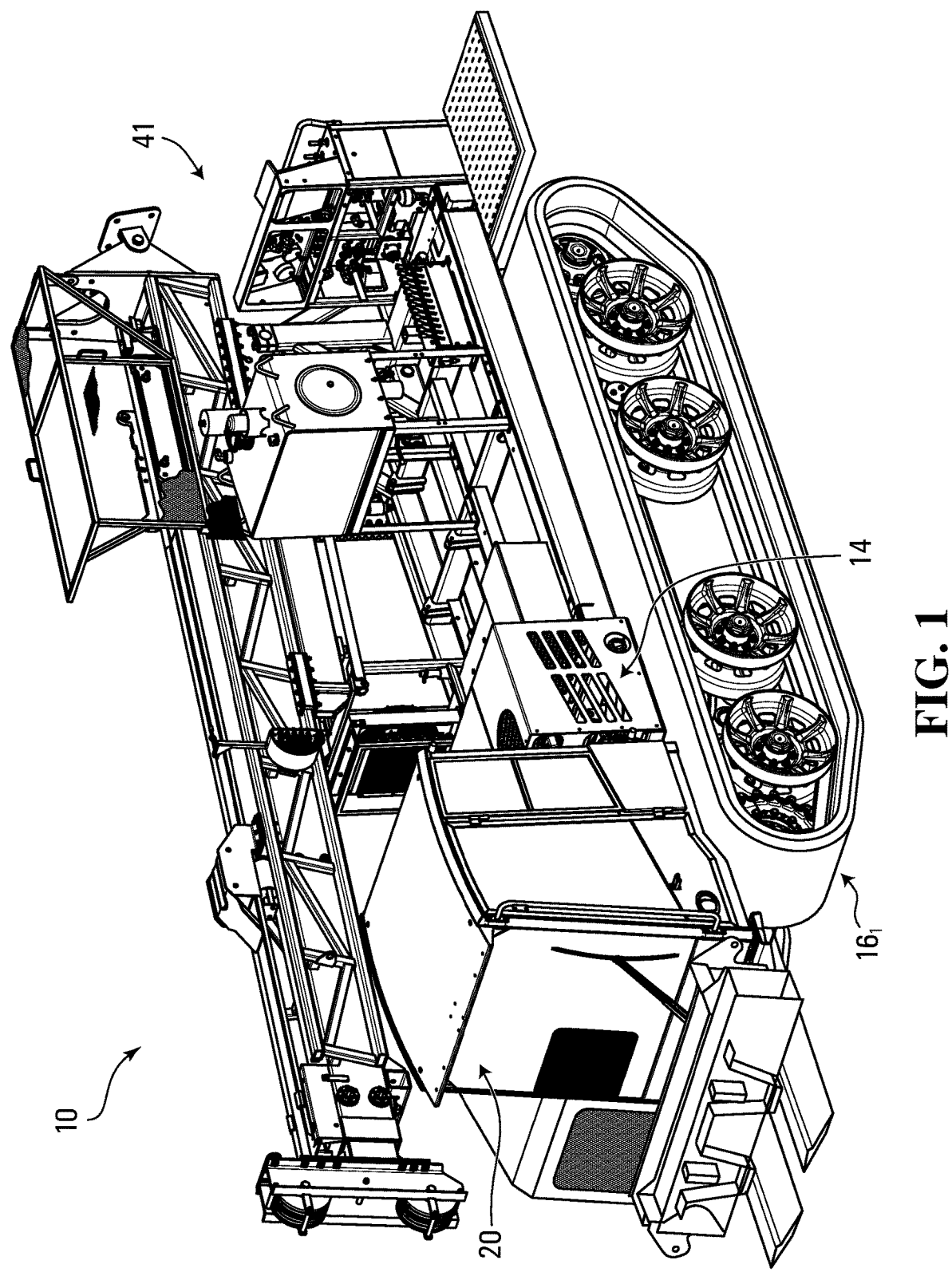
FIG. 1 shows a perspective view of an example of a tracked vehicle equipped with work equipment in accordance with an embodiment of the invention.
Figure 2:
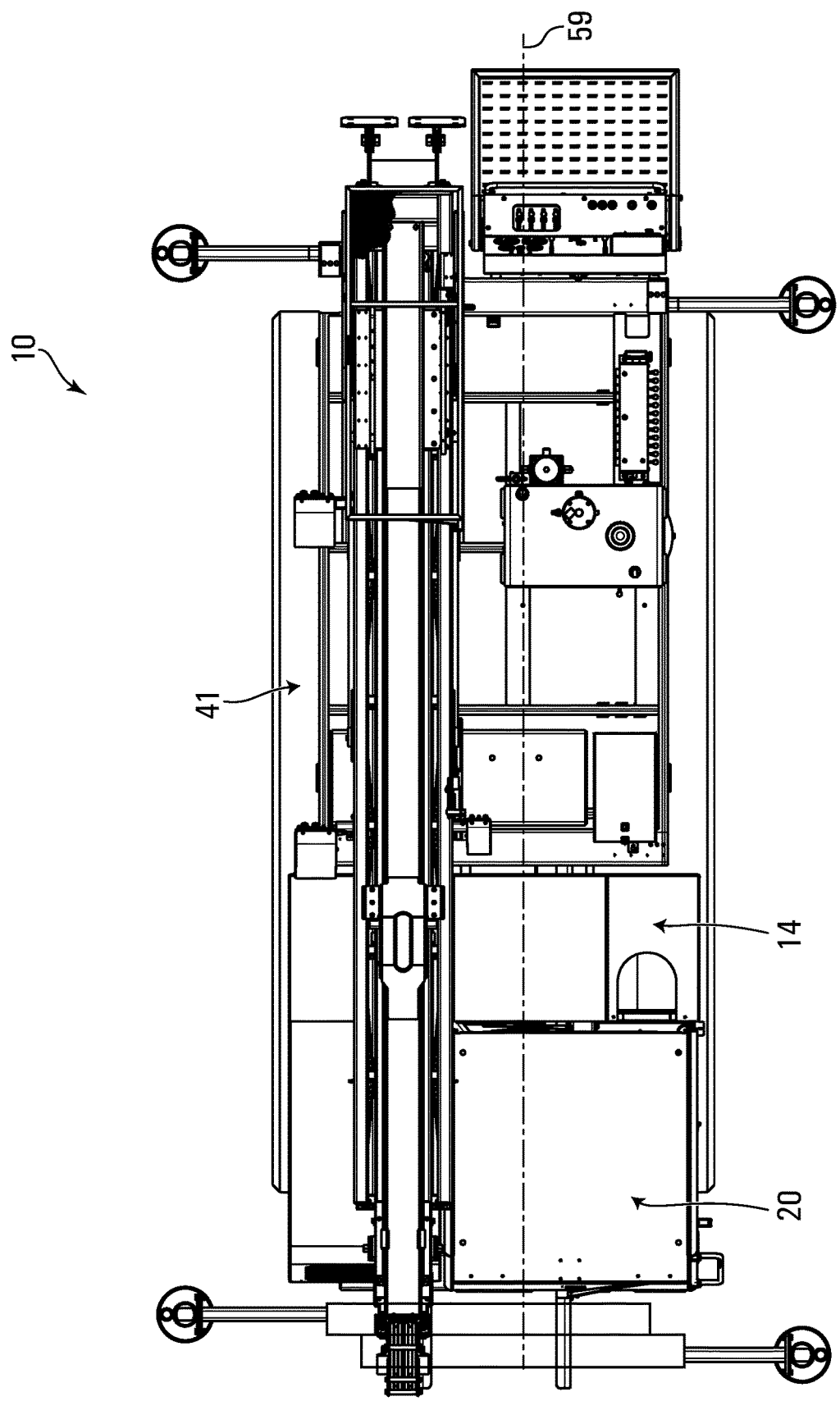
FIG. 2 shows a top view of the tracked vehicle equipped with work equipment.
Figure 3:
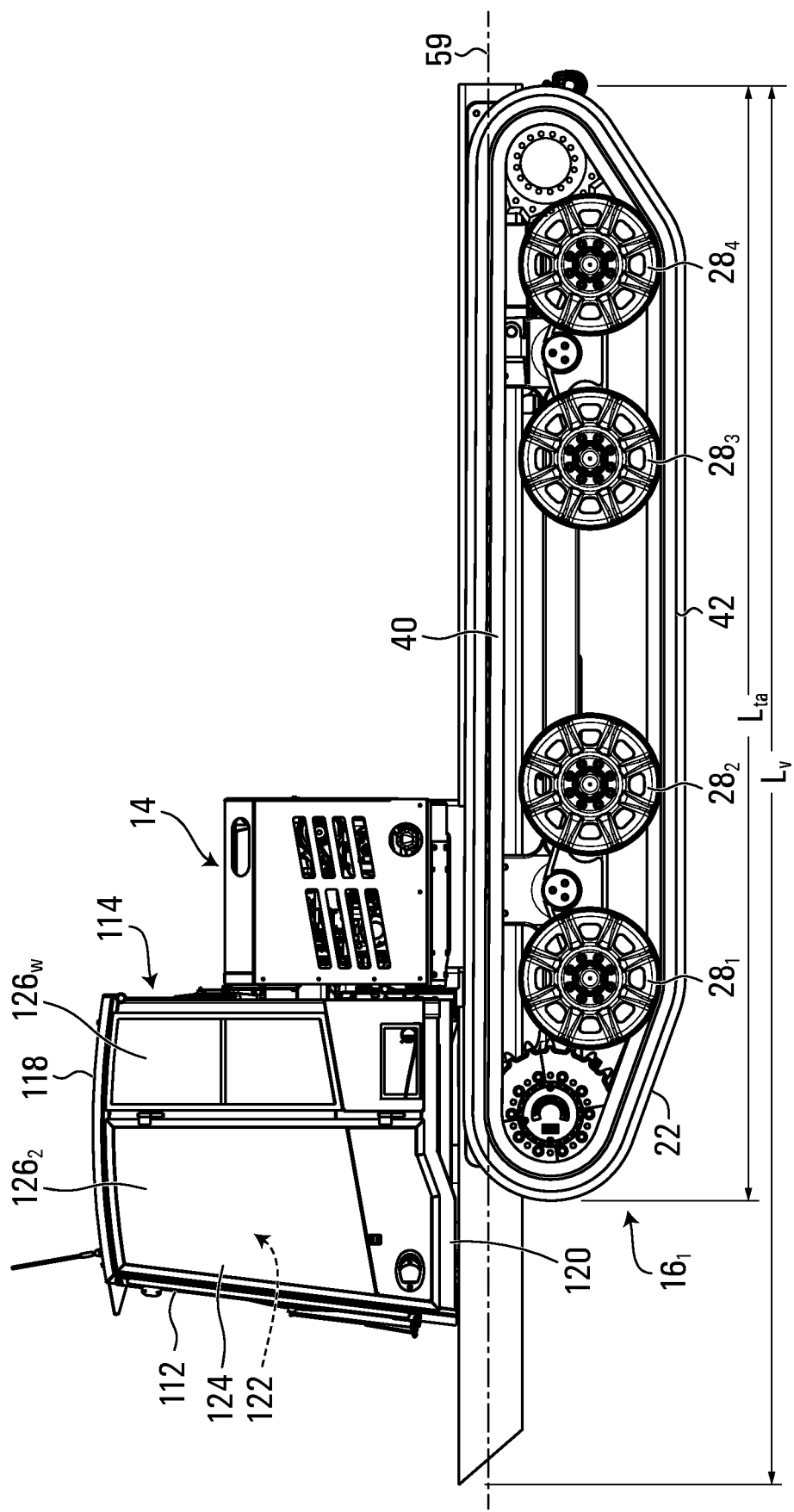
FIGS. 3 and 4 respectively show a side and a front view of the tracked vehicle without an equipment-mounting platform, such as a torque box, for mounting work equipment.
Figure 4:
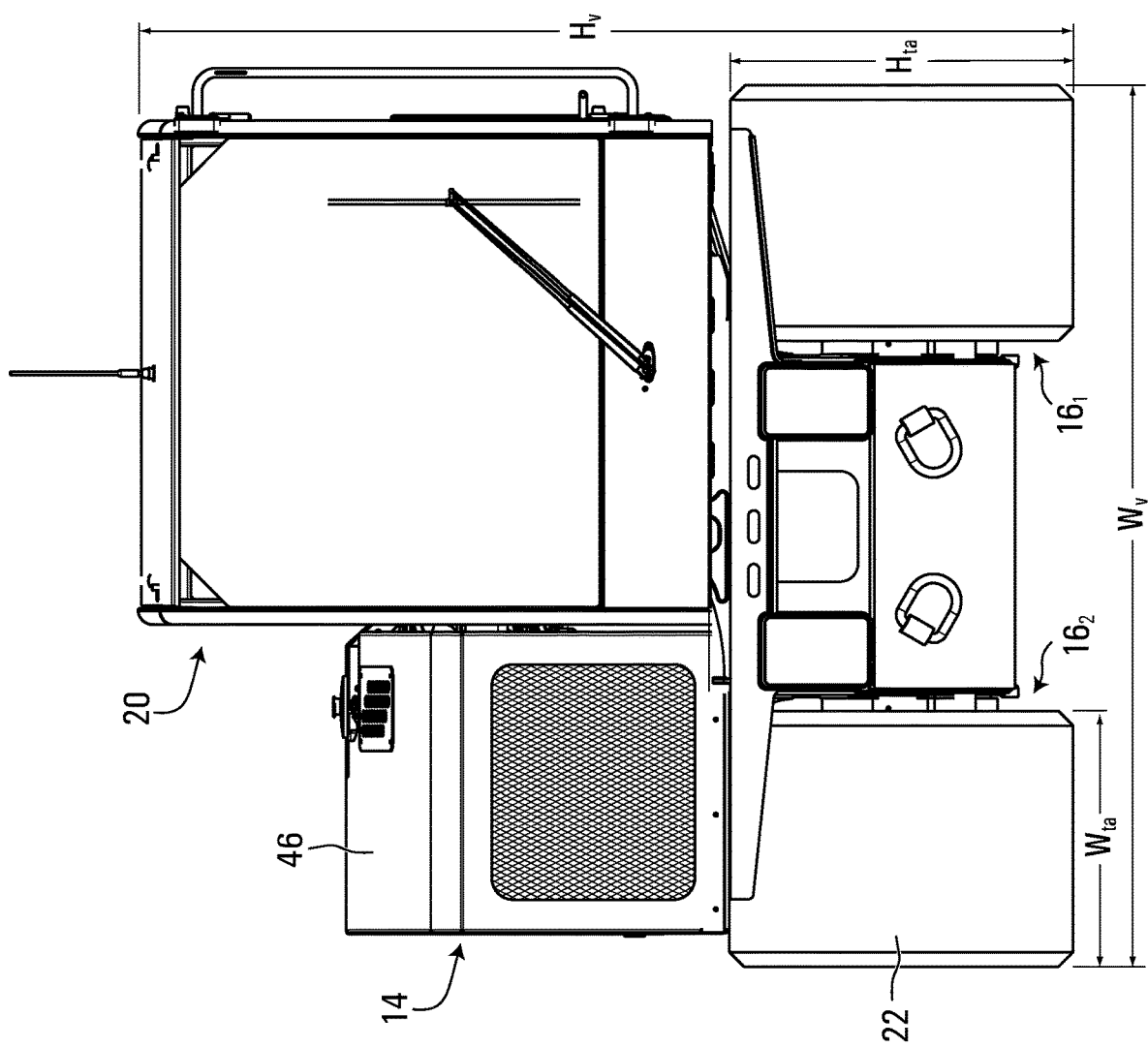
Figure 5:
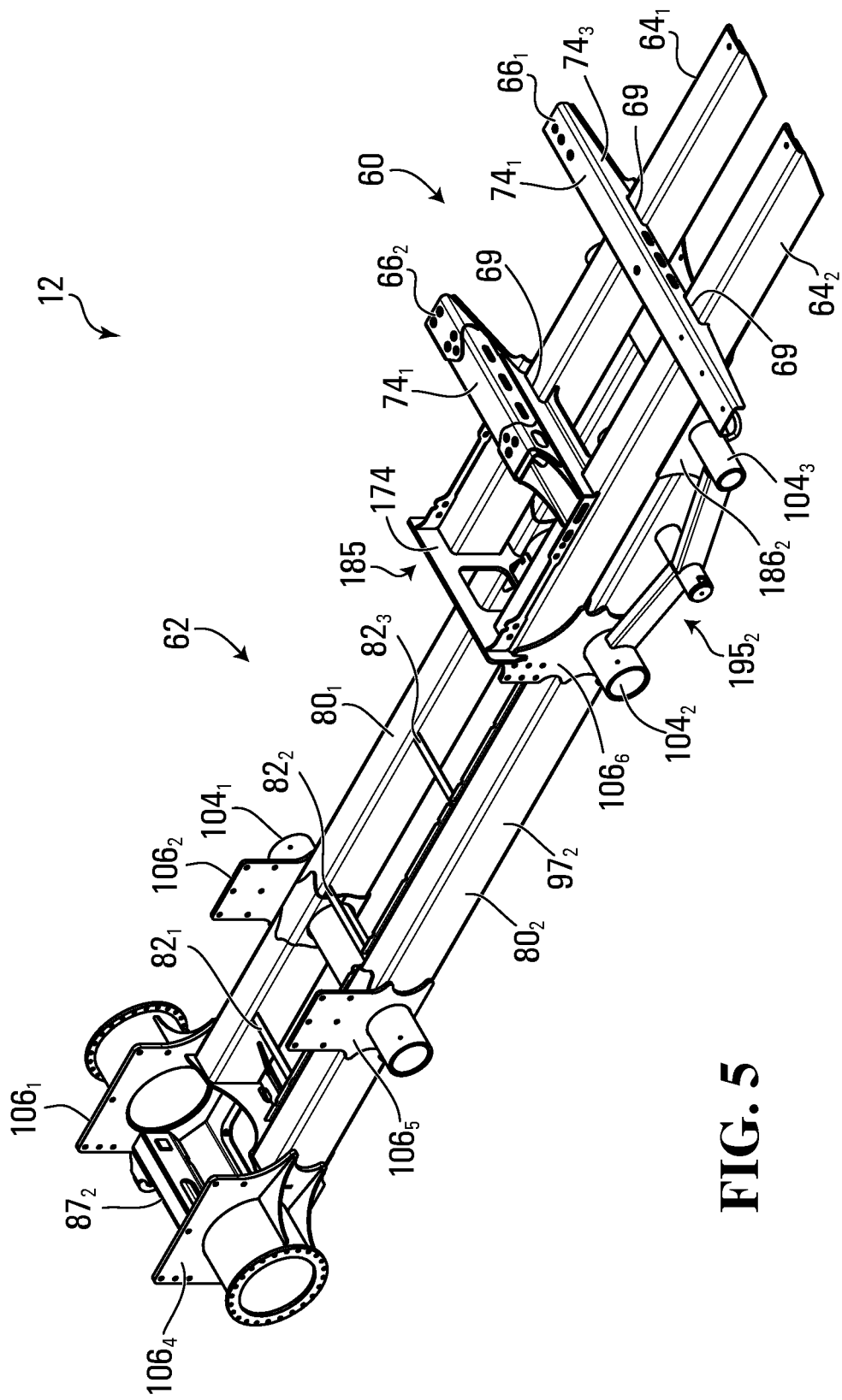
FIGS. 5 and 6 respectively show top and bottom perspective views of a chassis of the tracked vehicle.
Figure 6:
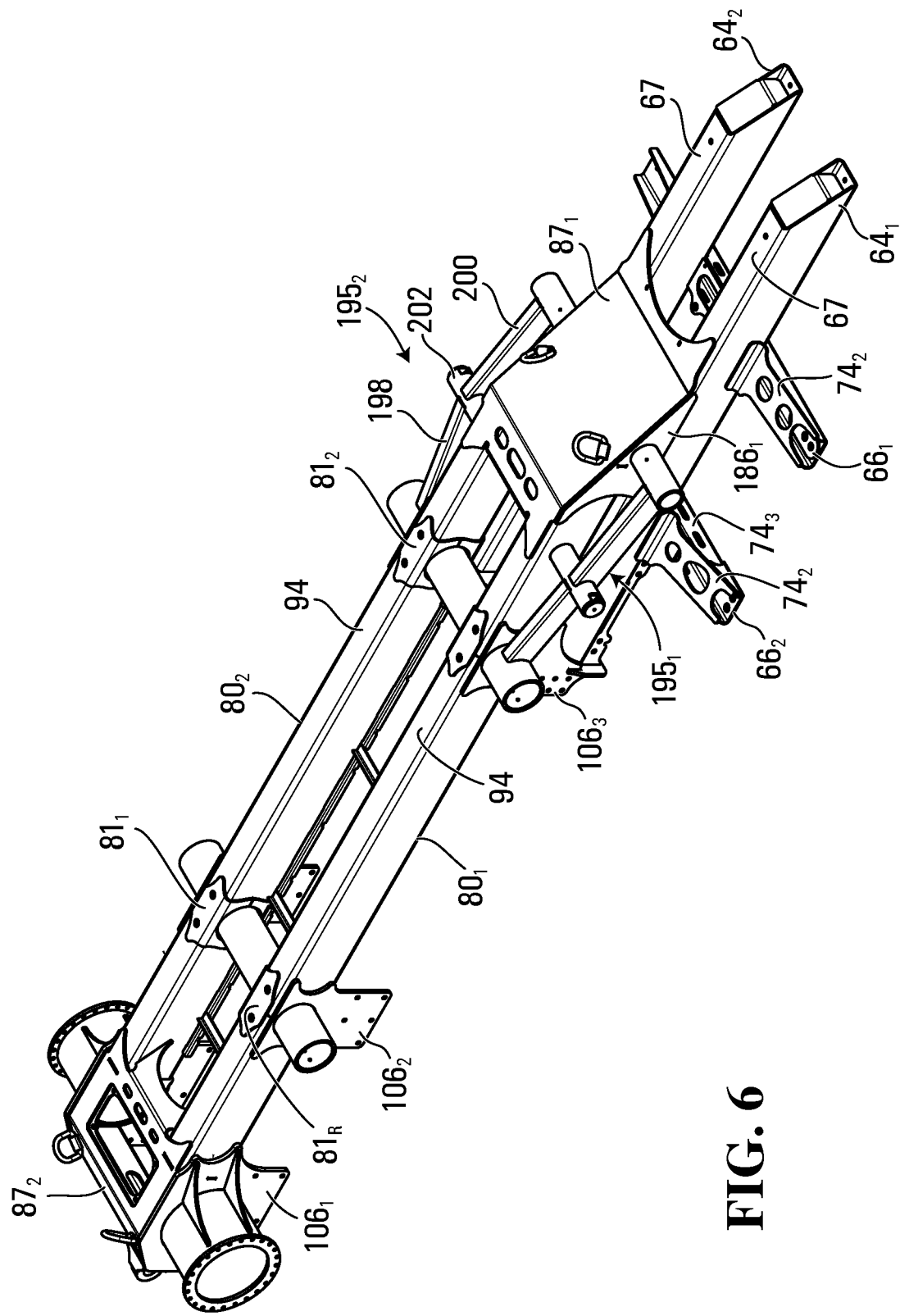
Figure 9:
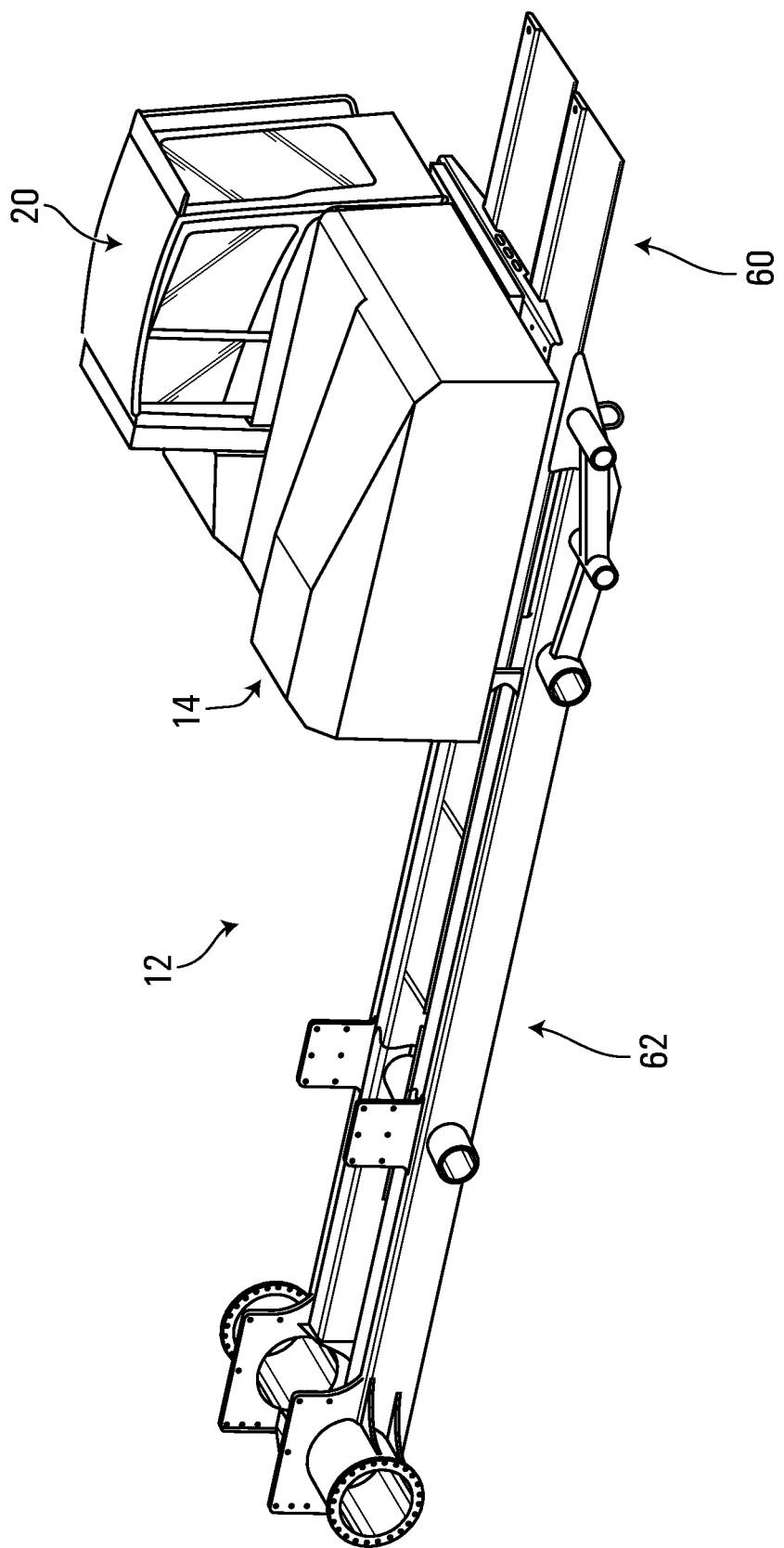
FIG. 9 shows a perspective view of the chassis with an operator cabin and a power plant of the tracked vehicle mounted to an upper frame structure of the chassis.
Figure 10:
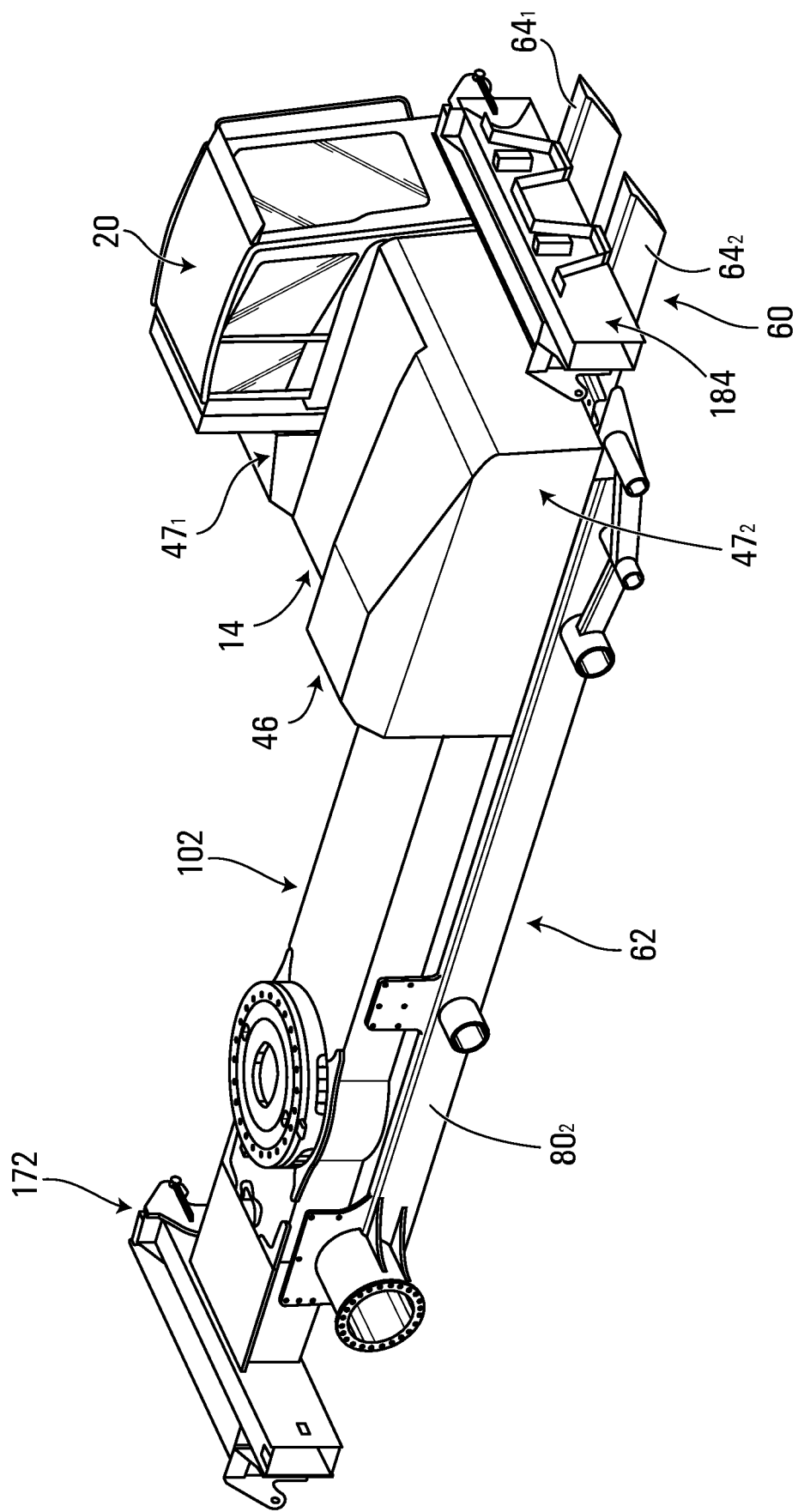
FIG. 10 shows a perspective view of the chassis with the operator cabin, the power plant and the torque box mounted to a lower frame structure of the chassis.

In the drawings, embodiments of the invention are illustrated by way of example. It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

FIGS. 1 to 4 show an example of a tracked utility vehicle 10 in accordance with an embodiment of the invention. The tracked utility vehicle 10 is designed to carry and enable use of work equipment 41, which includes one or more work implements such as, for example, a crane, a ladder, an aerial device, an aerial work platform, a lift, a drill rig, a digger derrick, a material handler, a mulcher or other vegetation management apparatus, and/or any other industrial apparatus, on various terrains, including rugged terrain (e.g., with mud, steep hills, swamps, rocks, mud, and/or snow). This type of vehicle can sometimes be referred to as a "tracked carrier" or "tracked equipment carrier" vehicle.

The tracked utility vehicle 10 has a length $L_v$, a width $W_v$, and a height $H_v$ (measured without taking into account the work equipment 41). These dimensions may allow the vehicle 10 to have a large payload capacity while being able to be used on a public road infrastructure. For example, in some embodiments, the length $L_v$ may be at least 5 m, such as between 5 m and 10 m, in some cases between 6 m and 9 m, and in some cases between 7 m and 8 m; the width $W_v$ may be at least 2 m, such as between 2 m and 5 m, in some cases between 2.5 m and 4.5 m, and in some cases between 3 m and 4 m; and the height may be no more than 4 m, in some cases no more than 3.5 m, and in some cases no more than 3 m. The length $L_v$, width $W_v$, and height $H_v$ may take on various other values in other embodiments.

The tracked utility vehicle 10 has a payload capacity which can be quite large. For example, in some embodiments, the payload capacity of the vehicle 10 may be at least 10000 lbs (about 4536 kg), in some cases at least 15000 lbs (about 6804 kg), in some cases at least 20000 lbs (about 9072 kg), in some cases at least 30000 lbs (about 13608 kg), in some cases at least 40000 lbs (18144 kg), in some cases at least 46000 lbs (20865 kg) and in some cases even more than 46000 lbs (e.g., 50000 lbs). The payload capacity may take on various other values in other embodiments.

In this embodiment, the tracked utility vehicle 10 comprises a chassis 12, a power plant 14, a plurality of track assemblies 16$_1$, 16$_2$, and an operator cabin 20. The vehicle 10 has a longitudinal axis 59 defining a longitudinal direction of the vehicle 10 (i.e., a direction generally parallel to its longitudinal axis 59) and transversal directions (i.e., directions transverse to its longitudinal axis 59), including a widthwise direction (i.e., a lateral direction generally perpendicular to its longitudinal axis 59). The vehicle 10 also has a height direction which is normal to both its longitudinal direction and its widthwise direction.

As will be described in more detail later on, in some embodiments, the tracked utility vehicle 10 may be configured to allow the work equipment 41 to be mounted on the chassis 12 at a lowered position such as to allow a greater clearance between the work equipment 41 and the vehicle height limit of the public road infrastructure and/or to allow taller work equipment 41 to be installed without surpassing the vehicle height limit of the public road infrastructure. In one non-limiting embodiment, a "lowered" position may refer to a position that is lower than a floor of an operator cabin of the vehicle, but the lowered position may also be defined in other ways and relative to other aspects of the tracked vehicle, as will be described herein below.

a) Chassis

The chassis 12 extends along the longitudinal axis 59 of the tracked utility vehicle 10 and has a length $L_C$ measured between opposite longitudinal ends of the chassis 12. The chassis 12 supports various components of the vehicle 10, including the power plant 14, the track assemblies $16_1$, $16_2$, and the operator cabin 20. The chassis 12 also supports the work equipment 41 carried by the vehicle 10.

As further discussed below, in this embodiment, the chassis 12 is configured such as to receive an equipment-mounting platform 102, such as a torque box for example, onto which can be mounted the work equipment 41. The equipment-mounting platform 102 may be similar in certain aspects to torque boxes used in trucks to transport work equipment. For instance, a manner in which the equipment-mounting platform 102 is mounted to the chassis 12 may be akin to a manner in which torque boxes are installed on truck frames. As a result, work equipment such as the work equipment 41 may be as easily installable on the tracked utility vehicle 10 as on trucks. Work equipment such as the work equipment 41 which may be primarily designed for trucks due to a potentially larger market for trucks can therefore also be easily installed on the tracked utility vehicle 10.

In addition, in this embodiment, the chassis 12 is configured to receive the equipment-mounting platform 102 at a lowered height portion of the chassis 12 such as to reduce an overall height $H_{v-o}$ of the vehicle 10 (i.e., a height including the work equipment 41) and/or to allow taller work equipment to be transported without exceeding vehicle height limits. The overall height $H_{v-o}$ of the vehicle 10, measured with the work equipment 41 in a retracted nonworking state, may thus be designed taking into account the vehicle height limit and a height of a trailer on which the vehicle 10 may be transported on the public road infrastructure. For example, if a trailer having a height of 24 inches is expected to be used for transporting the vehicle 10, the overall height $H_{v-o}$ of the vehicle 10 may be no more than 11.5 feet (3.5 m) if the vehicle height limit is 13.5 feet or no more than 12 feet (3.7 m) if the vehicle height limit is 14 feet. As another example, if a trailer having a height of 18 inches is expected to be used for transporting the vehicle 10, the overall height $H_{v-o}$ of the vehicle 10 may be no more than 12 feet if the vehicle height limit is 13.5 feet or no more than 12.5 feet if the vehicle height limit is 14 feet. Thus, in various examples, the overall height $H_{v-o}$ of the vehicle 10 may be no more than 12.5 feet, in some cases no more than 12 feet, and in some cases no more than 11.5 feet.

With additional reference to FIGS. 5 to 10, in this embodiment, the chassis 12 comprises an upper frame structure 60 and a lower frame structure 62, the upper and lower frame structures 60, 62 being connected to one another.

The upper frame structure 60 is that portion of the chassis 12 on which rests and to which are secured the operator cabin 20 and the power plant 14. For its part, the lower frame structure 62 is that portion of the chassis 12 to which is secured the equipment-mounting platform 102 onto which the work equipment 41 is mounted.

In this embodiment, the upper frame structure 60 comprises a pair of beams $64_1$, $64_2$ extending in the longitudinal direction of the vehicle 10 and spaced apart in the widthwise direction of the vehicle 10. In this embodiment, the upper frame structure 60 also comprises first and second crossmembers $66_1$, $66_2$ extending transversally to the beams $64_1$, $64_2$ and thus transversally to the longitudinal direction of the vehicle 10.

Figure 11:
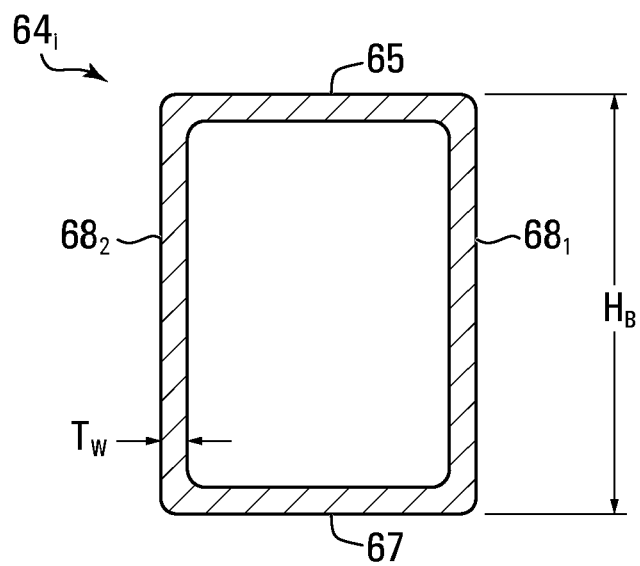
FIG. 11 shows a cross-sectional view of a beam of the upper frame structure of the chassis taken along line 11-11 in FIG. 6.

In this embodiment, each beam $64_i$ is a hollow beam (i.e., a beam defining a hollow interior) and more specifically a rectangular box beam. As shown in FIG. 11, the beam $64_i$ comprises a top surface 65, a bottom surface 67 opposite the top surface 65, and a pair of lateral surfaces $68_1$, $68_2$ opposite one another. The beam $64_i$ is made of metallic material, in this case steel. Moreover, each beam $64_i$ is dimensioned such that the beams $64_1$, $64_2$ are able to support the operator cabin 20 and the power plant 14. For example, in some examples of implementation, the beam $64_i$ may have a height $H_B$ measured between its top and bottom surfaces 65, 67 of at least 8 inches, in some cases at least 10 inches, in some cases at least 12 inches, and in some cases at least 16 inches. In some examples of implementation, the beam $64_i$ may have a width $W_B$ measured between its lateral surfaces $68_1$, $68_2$ of at least 4 inches, in some cases at least 8 inches, and in some cases at least 12 inches. Moreover, in some examples of implementation, the beam $64_i$ may have a wall thickness $T_W$ of at least ¼ inches, in some cases at least ⅝ inches, and in some cases at least ¾ inch. In this example, the beam $64_i$ can be made by forming different sections of steel plates and subsequently welding them together, although other processes are possible such as an extrusion process or any other suitable process. Dimensions of the beams $64_1$, $64_2$ may take on various other values in other embodiments.

The beams $64_1$, $64_2$ may be configured in various other ways in other embodiments. For instance, in some embodiments, each one of the beams $64_1$, $64_2$ may have a cross-sectional shape other than rectangular (e.g., circular or otherwise curved, square, etc.). In some examples, the beams $64_1$, $64_2$ may be C-beams, I-beams, or any other suitable elongated structural member. As another example, in some embodiments, the beams $64_1$, $64_2$ may be made of material other than steel.

Furthermore, in some embodiments, the beams $64_1$, $64_2$ may be joined via a plate fastened to the top surface 65 of each beam $64_i$ and another plate fastened to the bottom surface 67 of each beam $64_i$. For instance, such plates may be steel plates that are welded to the beams $64_1$, $64_2$ or fastened in any other suitable way to the beams $64_1$, $64_2$. In such embodiments, the beams $64_1$, $64_2$ along with the steel plates fastened thereto may form a hollow structure having a cross-sectional span greater than the combined cross-sectional spans of each of the beams $64_1$, $64_2$. This may be useful to reinforce the beams $64_1$, $64_2$ such that they have a greater stiffness to resist applied torques.

The crossmembers $66_1$, $66_2$ are secured to the beams $64_1$, $64_2$ to interconnect the beams $64_1$, $64_2$. More particularly, in this embodiment, the crossmembers $66_1$, $66_2$ are secured to the beams $64_1$, $64_2$ via fasteners (e.g., bolts and/or rivets). The crossmembers $66_1$, $66_2$ may be secured to the beams $64_1$, $64_2$ in other ways in other embodiments (e.g., by welding). Each crossmember $66_i$ is an elongated and hollow structural member including a top surface $74_1$, a bottom surface $74_2$, and opposite lateral surfaces $74_3$, $74_4$. The lateral surfaces $74_3$, $74_4$ comprise recesses 69 configured for positioning the crossmember $66_i$ onto the beams $64_1$, $64_2$. The crossmember $66_i$ is made of metallic material, in this case steel.

In this embodiment, the first crossmember $66_1$ has a length greater than a length of the second crossmember $66_2$. Moreover, in this embodiment, the first crossmember $66_1$ is connected to the beams $64_1$, $64_2$ such that it extends beyond a widthwise span of the beams $64_1$, $64_2$ (i.e., a span between outboard lateral walls of the beams $64_1$, $64_2$ in the widthwise direction of the vehicle 10) on both sides of the widthwise span of the beams $64_1$, $64_2$. In this example, the second crossmember $66_2$ is connected to the beams $64_1$, $64_2$ such that the second crossmember $66_2$ extends beyond the widthwise span of the beams $64_1$, $64_2$ on a single side of the widthwise span of the beams $64_1$, $64_2$. In this embodiment, the second crossmember $66_2$ has a height greater than the first crossmember $66_1$ such that a distance between the top surface $74_1$ of the second crossmember $66_2$ and the top surface 65 of the beams $64_1$, $64_2$ is greater than a distance between the top surface $74_1$ of the first crossmember $66_1$ and the top surface 65 of the beams $64_1$, $64_2$.

The crossmembers $66_1$, $66_2$ may be any other suitable elongated structural member in other embodiments. As another example, in some embodiments, the crossmembers $66_1$, $66_2$ may be made of material other than steel.

The lower frame structure 62 provides a main structure for supporting the track assemblies $16_1$, $16_2$ and the equipment-mounting platform 102 onto which the work equipment 41 is mounted. In this embodiment, the lower frame structure 62 comprises a pair of parallel rails $80_1$, $80_2$ extending along the longitudinal direction of the vehicle 10 and spaced apart in the widthwise direction of the vehicle 10. More specifically, the lower frame structure 62 is generally centered in relation to the longitudinal axis 59 of the vehicle 10 such that the longitudinal axis 59 bisects a width of the lower frame structure 62. The lower frame structure 62 also comprises a plurality of crossmembers $82_1$-$82_3$ extending transversally to the longitudinal direction of the vehicle 10 between the rails $80_1$, $80_2$. The lower frame structure 62 also comprises a front drawbar $87_1$ and a rear drawbar $87_2$. The lower frame structure 62 has a length $L_{LF}$ defined between its opposite longitudinal ends $91_1$, $91_2$.

Although the rails $80_1$, $80_2$ of the lower frame structure 62 and the beams $64_1$, $64_2$ of the upper frame structure 60 are respectively described as "rails" and "beams", this is merely done to avoid confusion when referring to them. In some embodiments, the rails $80_1$, $80_2$ and the beams $64_1$, $64_2$ may be similarly structured, while in others they may be quite different. For instance, in this embodiment, each of the rails $80_1$, $80_2$ is a rectangular box beam similar to the beams $64_1$, $64_2$. Each rail $80_i$ comprises a top surface 93, a bottom surface 94 opposite the top surface 93, and a pair of lateral surfaces $97_1$, $97_2$ opposite one another. The rails $80_1$, $80_2$ are made of metallic material, in this case steel. The rails $80_1$, $80_2$ may be configured in various other ways in other embodiments. For example, in some embodiments, each of the rails $80_1$, $80_2$ may be a hollow beam having a cross-sectional shape other than rectangular (e.g., circular or otherwise curved). In other examples, each of the rails $80_1$, $80_2$ could be implemented as a non-hollow beam, such as a C-beam or an I-beam (or H-beam), or any other suitable elongated structural member. As another example, in some embodiments, the rails $80_1$, $80_2$ may be made of material other than steel.

Each rail $80_i$ is dimensioned such that the rails $80_1$, $80_2$ are able to support the equipment-mounting platform 102 and the work equipment 41. For example, in this embodiment, the rail $80_i$ may have dimensions similar to those of the beams $64_1$, $64_2$ and may be manufactured in a similar manner. In this example, the rail $80_i$ can be made by forming different sections of steel plates and subsequently welding them together, although other processes are possible such as an extrusion process or any other suitable process. Dimensions of the rails $80_1$, $80_2$ may take on various other values in other embodiments.

In this embodiment, the rails $80_1$, $80_2$ of the lower frame structure 62 are aligned with the beams $64_1$, $64_2$ of the upper frame structure 60 in the widthwise direction of the vehicle 10. More specifically, in this embodiment, a position of each of the rails $80_1$, $80_2$ in the widthwise direction of the vehicle 10 corresponds to a position of each of the beams $64_1$, $64_2$ in the widthwise direction of the vehicle 10. For example, the rail $80_1$ is positioned such that its outboard lateral wall $97_1$ is coplanar with the outboard lateral wall $68_1$ of the beam $64_1$. Moreover, in this embodiment, the rails $80_1$, $80_2$ and the beams $64_1$, $64_2$ have a same width (i.e., a distance between their respective lateral walls) and thus the inboard lateral wall $97_2$ of the rail $80_1$ is also coplanar with the inner lateral wall $68_2$ of the beam $64_1$. In other embodiments, the rails $80_1$, $80_2$ and the beams $64_1$, $64_2$ may not be aligned with one another. For example, the rails $80_1$, $80_2$ and the beams $64_1$, $64_2$ may be offset relative to one another in the widthwise direction of the vehicle 10.

The crossmembers $82_1$-$82_3$ of the lower frame structure 62 are secured to the rails $80_1$, $80_2$ and are configured to support an electric harness and hydraulic hoses of the tracked utility vehicle 10. In this embodiment, the crossmembers $82_1$-$82_3$ comprise elongated L-beams. The crossmembers $82_1$-$82_3$ may be any other suitable type of beams in other embodiments. Moreover, in this embodiment, the crossmembers $82_1$-$82_3$ are welded to the rails $80_1$, $80_2$. The crossmembers $82_1$-$82_3$ may be secured to the rails $80_1$, $80_2$ in other ways in other embodiments (e.g., by fasteners such as bolts and/or rivets). Although in this embodiment only three crossmembers are depicted, more or less crossmembers may be included in other embodiments.

The lower frame structure 62 also comprises a plurality of support members $104_1$-$104_3$ that extend transversally to the longitudinal direction of the vehicle 10. These support members $104_1$-$104_3$ are configured to stiffen the chassis 12 by providing support in its lateral direction and to receive respective wheel mounting structures of the track assemblies $16_1$, $16_2$. More specifically, the support members $104_1$, $104_2$ extend between the rails $80_1$, $80_2$ and are connected thereto (e.g., via welding) while the support member $104_3$ extends at a connection between the upper and lower frame structures 60, 62. In this embodiment, the support members $104_1$-$104_3$ comprise a hollow cylindrical body.

Figure 21:
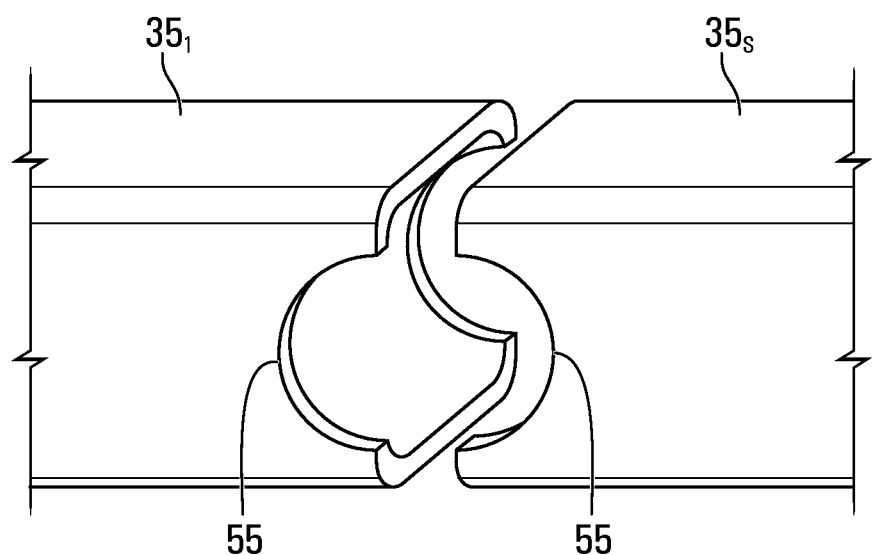
FIG. 21 shows a perspective view of an example of longitudinal ends of rail sections that are joined to form rails of the lower frame structure.
Figure 22:
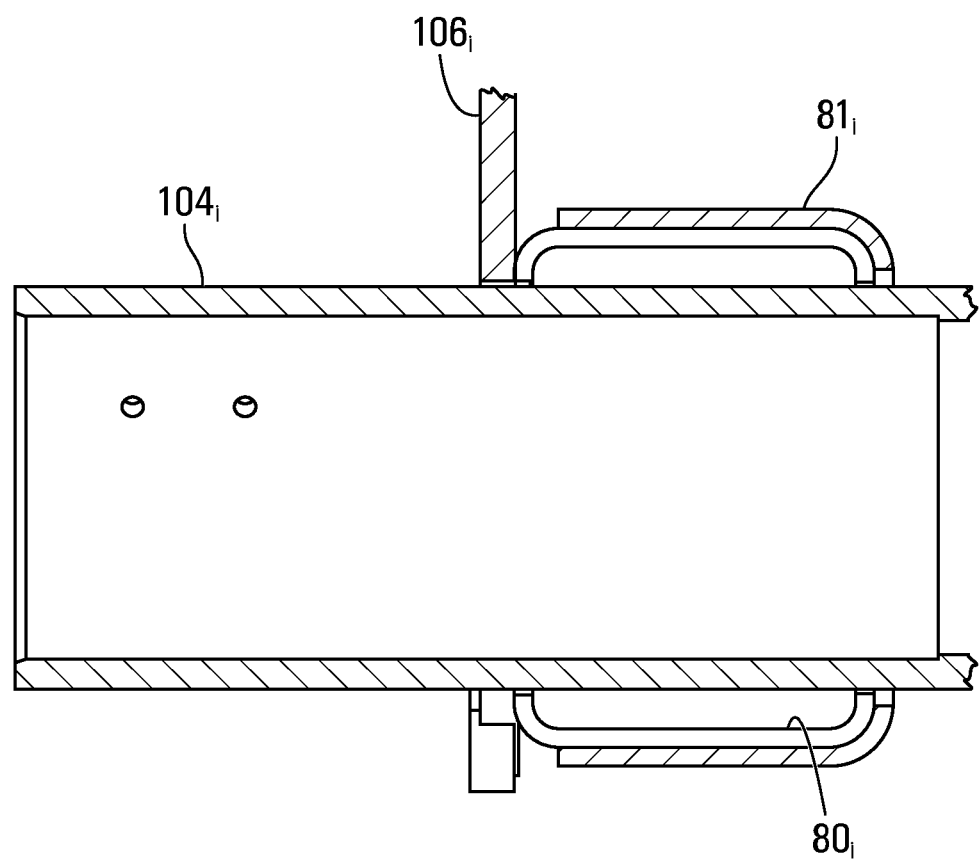
FIG. 22 shows a cross-section of the lower frame structure where a joint member is used to join the rail sections to form the rails.

In this embodiment, each rail $80_i$ comprises a plurality of separate rail sections $35_1$-$35_S$ that are joined to form the rail $80_i$. Adjacent ones of the rail sections $35_1$-$35_S$ are joined at locations where the support members $104_1$, $104_2$ extend between the rails $80_1$, $80_2$. To that end, as shown in FIG. 21, the rail sections $35_1$-$35_S$ are similarly structured, each rail section $35_i$ being elongated and comprising an aperture 55 at one of its longitudinal ends (or at both longitudinal ends in the case of the rail section positioned between the support members $104_1$, $104_2$). The aperture 55 is configured to fit a shape and size of a support member $104_i$. To that end, in this example, the aperture 55 is in the shape of a semi-circle such that adjacent ones of the rail sections $35_1$-$35_S$ together form a circular opening to fit a support member $104_i$. The rail sections $35_1$-$35_S$ may be joined in any suitable way. For instance, adjacent rail sections $35_1$-$35_S$ may be welded together to form the rail $80_i$. Additionally or alternatively, as shown in FIG. 22, the rail sections $35_1$-$35_S$ may be joined via joint members $81_1$-$81_R$ configured to join adjacent ones of the rail sections $35_1$-$35_S$ to form the rail $80_i$. Each joint member $81_i$ comprises an opening for fitting a respective support member $104_i$ and is positioned to contact adjacent ones of the rail section $35_1$-$35_S$ at a portion of their top surfaces, bottom surfaces, and inboard lateral surfaces (corresponding to the top surface 93, the bottom surface 94 and an inboard one of the lateral surfaces $97_1$, $97_2$ of the rails $80_1$, $80_2$).

Figure 40:
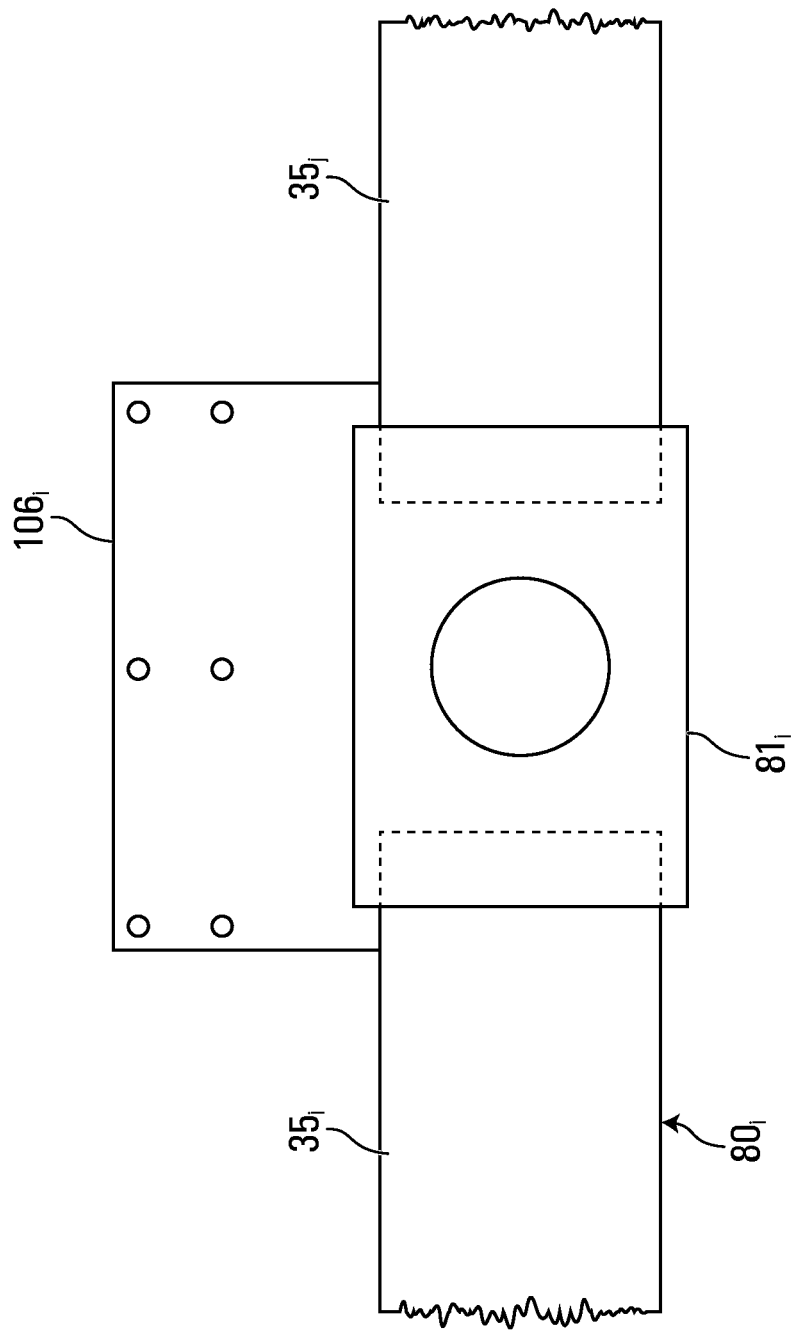
FIG. 40 shows an example of an embodiment where adjacent ones of the rail sections of the rails of the lower frame structure are spaced apart from one another such that the rails are discontinuous rails.

In some embodiments, as shown in FIG. 40, the rail sections $35_1$-$35_S$ of each rail $80_i$ may be arranged such that they do not form a continuous rail $80_i$. In other words, the rail $80_i$ may be a "discontinuous" rail in that its rail sections $35_1$-$35_S$ do not contact one another. In such embodiments, the rail sections $35_1$-$35_S$ do not comprise an aperture and adjacent ones of the rail sections $35_1$-$35_S$ are spaced apart by a distance equal to or greater than a diameter of the support member $104_i$. A joint member $81_i$ is then fastened to (e.g., welded to) each of the adjacent rail sections (denoted as $35_i$, $35_j$ in FIG. 40) to form a "bridge" (i.e., a connection) between each one of the adjacent rail sections $35_1$-$35_S$.

Figure 12:
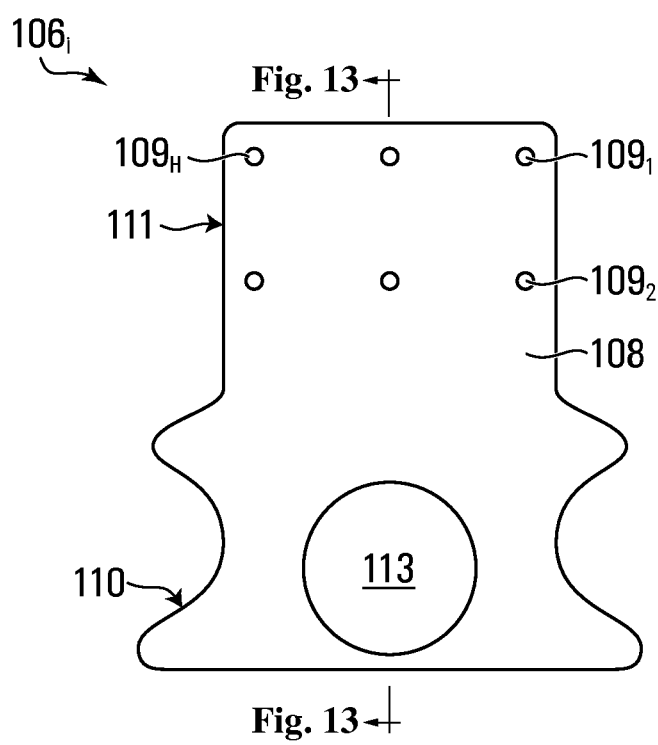
FIG. 12 shows a front view of an example of a lateral plate of the plurality of lateral plates of the lower frame structure of the chassis.
Figure 13:
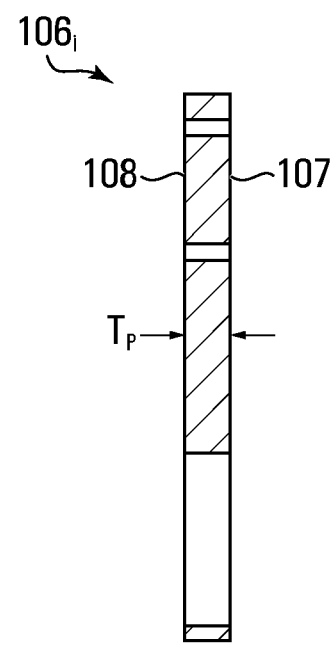
FIG. 13 shows a cross-sectional view of the lateral plate taken along line 13-13 in FIG. 12.

The lower frame structure 62 also comprises a plurality of side walls for positioning and attaching the equipment-mounting platform 102 to the lower frame structure 62. The side walls may be made of lateral plates $106_1$-$106_6$. As shown in FIGS. 12 and 13, each lateral plate $106_i$ comprises an interior surface 107 facing a center of the vehicle 10 in the widthwise direction of the vehicle 10 and an exterior surface 108 opposite the interior surface 107. The interior and exterior surfaces 107, 108 of the lateral plate $106_i$ are substantially flat. Each lateral plate $106_i$ is secured to a respective one of the rails $80_1$, $80_2$ such that the interior and exterior surfaces 107, 108 of the lateral plate $106_i$ are parallel to the longitudinal direction of the vehicle 10. More particularly, a lower portion 110 of the lateral plate $106_i$ is fastened to a respective one of the rails $80_1$, $80_2$ while an upper portion 111 of the lateral plate $106_i$ is configured to be fastened to the equipment-mounting platform 102. To that end, the lateral plate $106_i$ is positioned such that its upper portion 111 extends beyond the top surface 93 of the rail $80_i$ to which the lateral plate $106_i$ is mounted.

In this embodiment, the upper portion 111 of the lateral plate $106_i$ has a generally rectangular shape and comprises a plurality of holes $109_1$-$109_H$ for inserting a fastening element configured to engage the equipment-mounting platform 102. The lateral plates $106_1$-$106_6$ may be configured similarly to "fishplates" typically found on truck frames and used to attach a torque box thereto. Therefore, the lateral plates $106_1$-$106_6$ may be familiar to a person accustomed to using fishplates on truck frames. This may thus facilitate the installation of the equipment-mounting platform 102 onto the lower frame structure 62.

In this embodiment, some of the lateral plates $106_1$-$106_6$ are positioned such that they are aligned with respective ones of the support members $104_1$-$104_3$ in the longitudinal direction of the vehicle 10. For example, the lateral plates $106_2$, $106_5$ are aligned with the support member $104_1$ in the longitudinal direction of the vehicle 10. Each of these lateral plates may comprise an opening 113 in its lower portion 110 that is shaped and dimensioned to fit the support member $104_i$ with which it is aligned such as to enable the inner surface 107 of the lateral plate $106_i$ to be placed in contact with a respective one of the rails $80_1$, $80_2$. In some cases, the lower portion 110 of the lateral plate $106_i$ may be fastened to a respective one of the support members $104_1$-$104_3$.

While in this embodiment the lateral plates $106_1$-$106_6$ are welded to the rails $80_1$, $80_2$, the lateral plates $106_1$-$106_6$ may be fastened to the rails $80_1$, $80_2$ in any other suitable way in other embodiments (e.g., via bolts and/or rivets). Moreover, in some embodiments, the lateral plates $106_1$-$106_6$ may be made integrally with the rails $80_1$, $80_2$. That is, the lateral plates $106_1$-$106_6$ may be manufactured together with the rails $80_1$, $80_2$ such that they constitute a single component.

In embodiments where adjacent ones of the rail sections $35_1$-$35_S$ of the rails $80_1$, $80_2$ are spaced apart from one another such that each one of the rails $80_1$, $80_2$ is a discontinuous rail, as shown in FIG. 40, a lateral plate $106_i$ is fastened to each of the adjacent rail sections $35_i$, $35_j$ to connect, along with the joint member $81_i$, the adjacent rail sections $35_i$, $35_j$ to one another.

Each lateral plate $106_i$ may be dimensioned such as to support the equipment-mounting platform 102. For instance, in some examples of implementation, the lateral plate $106_i$ may have a thickness $T_P$ of at least ⅜ inch, in some cases at least, ½ inch, in some cases at least ⅝ inch, and in some cases at least 1 inch.

In this embodiment, the plurality of lateral plates $106_1$-$106_6$ includes a pair of frontal plates $106_3$, $106_6$, a pair of middle plates $106_2$, $106_5$, and a pair of rear plates $106_1$, $106_4$. Besides being connected to the rails $80_1$, $80_2$ of the lower frame structure 62, the frontal plates $106_3$, $106_6$ are also connected to the upper frame structure 60. More specifically, each of the frontal plates $106_3$, $106_6$ is connected to a respective one of the beams $64_1$, $64_2$ of the upper frame structure 60. For example, the frontal plates $106_3$, $106_6$ may be welded to the beams $64_1$, $64_2$ or otherwise connected to the beams $64_1$, $64_2$ (e.g., via bolts and/or rivets).

Moreover, in this embodiment, the rear plates $106_1$, $106_4$ are positioned such that they extend beyond the span of the rails $80_1$, $80_2$ in the longitudinal direction of the vehicle 10. As such, in this embodiment, the rear plates $106_1$, $106_4$ define the longitudinal end $91_2$ of the lower frame structure 62 (i.e., a rearmost endpoint of the lower frame structure 62).

Figure 14:
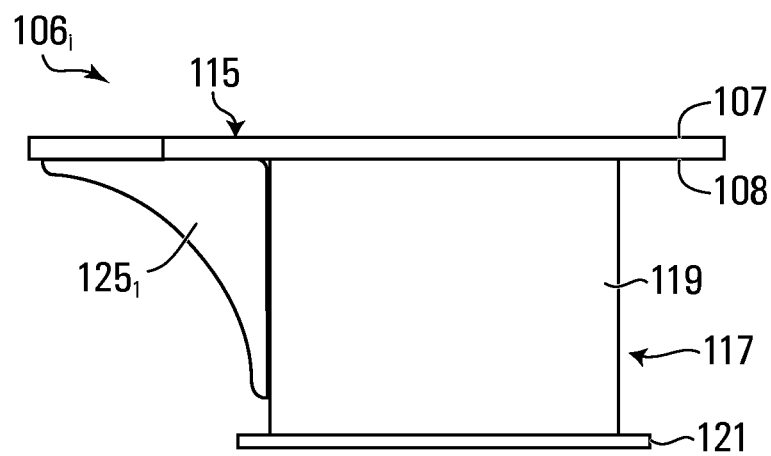
FIGS. 14 and 15 respectively show a top and a front view of a rear lateral plate of the lower frame structure.
Figure 15:
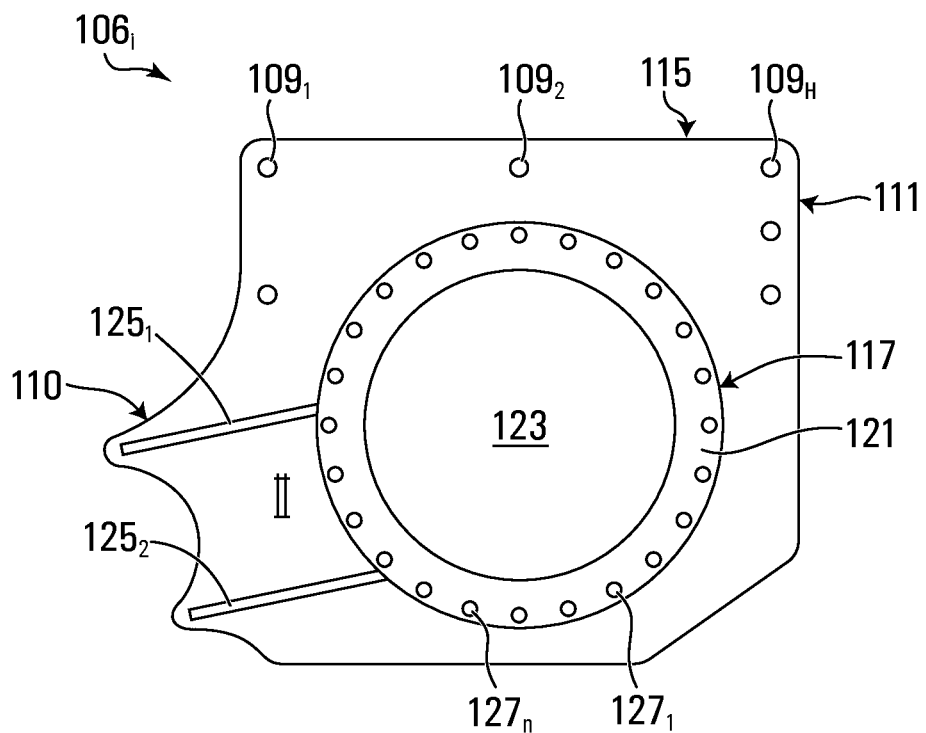

In this embodiment, the rear plates $106_1$, $106_4$ are structured differently than the remainder of the lateral plates in that they do not comprise an opening for fitting a support member $104_i$ since they are not aligned with any of the support members $104_1$-$104_3$. Rather, as shown in FIGS. 14 and 15, each of the rear plates $106_1$, $106_4$ comprises a plate portion 115 configured similarly to the frontal plates $106_3$, $106_6$ and the middle plates $106_2$, $106_5$, and a drive wheel support structure 117 for supporting a drive wheel of a respective one of the track assemblies $16_1$, $16_2$. The drive wheel support structure 117 comprises a cylindrical body 119 protruding from the outer surface 108 of the plate portion 115 and terminating in a flange 121. The flange 121 comprises a plurality of openings $127_1$-$127_n$ for mounting a planetary gearbox (not shown) configured to drive the drive wheel of each track assembly $16_1$, $16_2$. The cylindrical body 119 defines an opening 123 in which an axle of a respective one of the drive wheels of the track assemblies $16_1$, $16_2$ may be disposed. The drive wheel support structure 117 further comprises a pair of webs $125_1$, $125_2$ attached to the plate portion 115 and to the cylindrical body 119 in order to support the cylindrical body 119 of the drive wheel support structure 117.

While in this embodiment the plurality of lateral plates $106_1$-$106_6$ includes six lateral plates, the plurality of lateral plates may include any other suitable number of lateral plates. More specifically, the plurality of lateral plates includes at least two lateral plates. For example, in some embodiments, the side walls may include only two opposing lateral plates, each lateral plate spanning a majority of the length of the lower frame structure 62.

Figure 16:
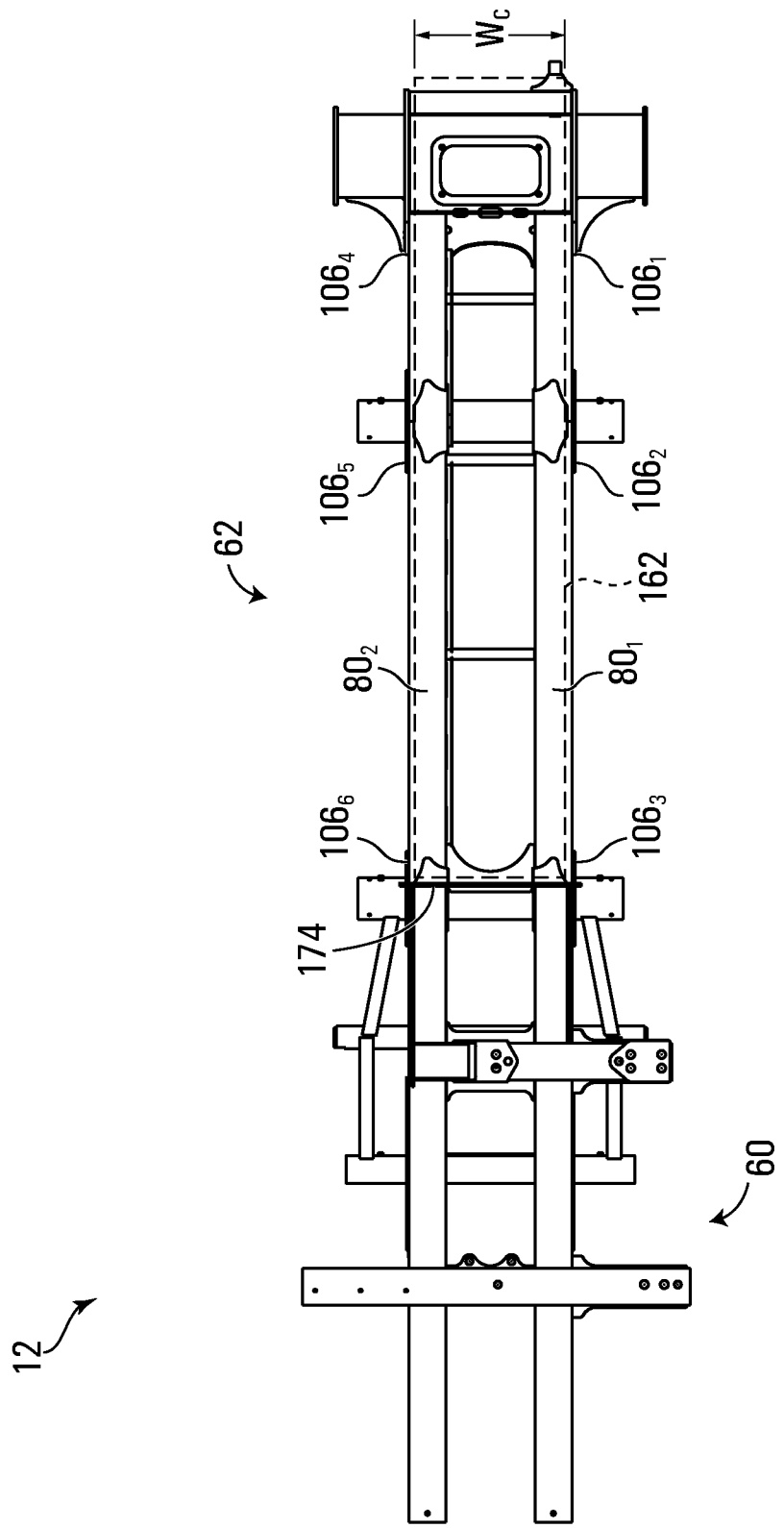
FIG. 16 shows a top view of the chassis including a channel defined by the lateral plates of the lower frame structure for receiving the torque box.

The positioning of the lateral plates $106_1$-$106_6$ may facilitate the installation of the equipment-mounting platform 102 onto the lower frame structure 62. More specifically, as shown in FIG. 16, the lateral plates $106_1$-$106_6$ are secured to the rails $80_1$, $80_2$ such that some of the lateral plates $106_1$-$106_6$ are separated in the widthwise direction of the vehicle 10 to define a channel 162 for laterally bounding the equipment-mounting platform 102. A width $W_C$ of the channel 162 defined between the side walls/lateral plates $106_1$-$106_6$ may take on various values. The channel 162 is also longitudinally bound at one end by a transversal connection plate 174 which is configured to connect the upper frame structure 60 to the lower frame structure 62 and will be described in more detail later.

In a non-limiting embodiment, the width $W_C$ of the channel 162 may correspond to a "nominal truck frame side rail spacing". The nominal truck frame side rail spacing may be different for different jurisdictions. The nominal truck frame side rail spacing may be 34 inches (about 0.86 m) in the United States, and 700 mm (about 27.5 inches) in Europe and in Japan). Accordingly, the width $W_C$ of the channel 162 may thus be 34 inches, or 700 mm, in various embodiments, depending on the jurisdiction. For a given jurisdiction, one way of defining the "nominal truck frame side rail spacing" is to refer to the average (mean, median or mode) an industry-standard advertised spacing of side rails of a frame of a truck chassis for across all trucks with a gross vehicle weight rating (GVWR) over 14000 lbs (6351 kg) sold in the given jurisdiction during a given time frame. By "advertised" one may take the spacing listed in the owners manual or other specification sheet. (A truck's GVWR corresponds to a curb weight of the truck plus a cargo and passenger weight capacity of the truck. In the United States, a GVWR over 14000 lbs would be a class 4 or higher class according to the U.S. Department of Transportation's truck classification.) Other ways of defining the nominal truck frame side rail spacing may be relied upon.

In other non-limiting embodiments, the width $W_C$ of the channel 162 may be greater than the nominal truck frame side rail spacing, in order to accommodate manufacturing tolerances and/or equipment variations. For example, in a particular jurisdiction, the width $W_C$ of the channel 162 may be between 0 and 3 inches greater than the nominal truck frame side rail spacing in that jurisdiction. Thus, by way of non-limiting example, in countries where the nominal truck frame side rail spacing is 34 inches, the width $W_C$ of the channel 162 may be 35¼ inches, 36 inches or 36½ inches.

In still other non-limiting embodiments, the width $W_C$ of the channel 162 may not bear a particular relationship to a nominal truck frame side rail spacing at all, but may be selected by the manufacturer according to other criteria. For example, the width $W_C$ of the channel 162 may have any suitable value, such as 32 inches, 36 inches, 40 inches and the like. In other embodiments, the width $W_C$ of the channel 162 may be between 30 and 34 inches, between 32 inches and 34 inches, or even between 33 inches and 34 inches. In still other embodiments, the $W_C$ of the channel 162 may be less than 30 inches.

The lower frame structure 62 may be positioned such that a portion of a longitudinal distance along the longitudinal direction of the vehicle 10 that is spanned by the lower frame structure 62 (i.e., its length $L_{LF}$) does not overlap (i.e., is non-overlapping with respect to) the upper frame structure 60. With additional reference to FIG. 8, in this embodiment, the lower frame structure 62 is positioned such that it overlaps with the upper frame structure 60 over a first portion $P_1$ of its length $L_{LF}$ and does not overlap with (i.e., is non-overlapping with respect to) the upper frame structure 60 over a second portion $P_2$ of its length $L_{LF}$. It is also noted that the first portion $P_1$ of the length $L_{LF}$ of the lower frame structure 62 is located further towards a front of the vehicle 10 than the second portion $P_2$ of the length $L_{LF}$ of the lower frame structure 62.

In this embodiment, the second portion $P_2$ of the length $L_{LF}$ of the lower frame structure 62 is longer than the first portion $P_1$ of the length $L_{LF}$ of the lower frame structure 62. That is, in this embodiment, a longitudinal span of the lower frame structure 62 over which the upper and lower frame structures 60, 62 do not overlap is greater than the longitudinal span of the lower frame structure 62 over which the upper and lower frame structures 60, 62 do overlap. For instance, in some cases, the second portion $P_2$ of the length $L_{LF}$ of the lower frame structure 62 may be at least 10% longer than the first portion $P_1$, in some cases at least 20% longer, in some cases at least 30% longer, in some cases at least 40% longer and in some cases even greater than 40% longer than the first portion $P_1$ (e.g., 50%, 60% or even 100% if not more).

In this manner, the second portion $P_2$ of the length $L_{LF}$ of the lower frame structure 62 may define a lowered platform-receiving area (e.g., to receive the equipment-mounting platform 102) that would otherwise not be available if the entire length $L_{LF}$ of the lower frame structure 62 overlapped the upper frame structure 60.

In this embodiment, the rails $80_1$, $80_2$ of the lower frame structure 62 extend along at least the second portion $P_2$ of the length $L_{LF}$ of the lower frame structure 62. Moreover, in this embodiment, the rails $80_1$, $80_2$ also extend along the first portion $P_1$ of the length $L_{LF}$ of the lower frame structure 62.

Figure 17:
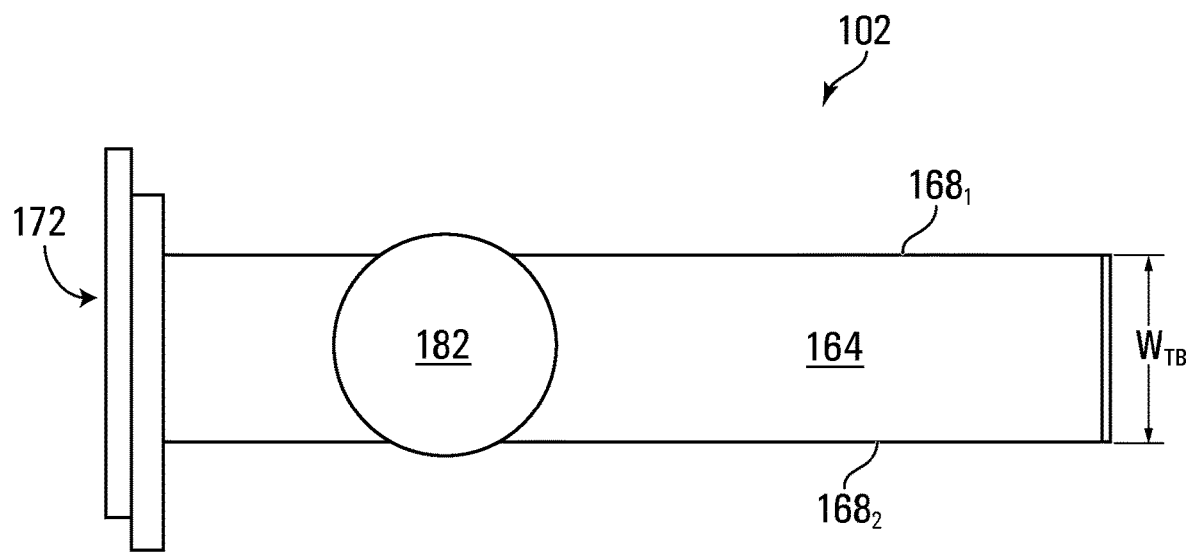
FIGS. 17 and 18 respectively show a top view and a side view of the torque box.
Figure 18:
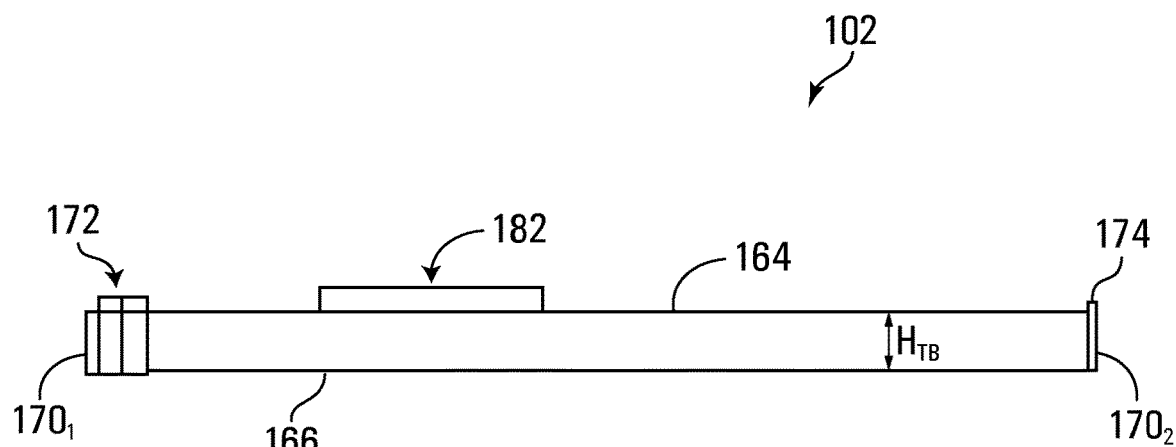

The equipment-mounting platform 102 is a platform that is positioned intermediate the work equipment 41 and the lower frame structure 62. In this embodiment, the equipment-mounting platform 102 is a torque box and will thus be referred to as such. In this embodiment, as shown in FIGS. 17 and 18, the torque box 102 is generally rectangular and comprises a top surface 164, a ground-facing bottom surface 166 opposite the top surface 164, lateral surfaces $168_1$, $168_2$, and longitudinal end surfaces $170_1$, $170_2$. In this embodiment, the torque box 102 comprises equipment-mounting structures 182 protruding from the top surface 164 of the torque box 102 for mounting the work equipment 41 onto the torque box 102. The torque box 102 has a width $W_{TB}$ defined between its lateral surfaces $168_1$, $168_2$ and a height $H_{TB}$ defined between its top and bottom surfaces 164, 166.

In this embodiment, the torque box 102 further comprises a stabilizer leg support assembly 172 affixed to the torque box 102 at its rear end such that the stabilizer leg support assembly 172 defines the rear longitudinal end surface $170_1$ of the torque box 102. The stabilizer leg support assembly 172 is configured to receive stabilizer legs (shown in FIG. 2) that may engage the ground for providing support to the work equipment 41 when it is deployed (i.e., in an extended state).

In this embodiment, the torque box 102 also comprises a front plate 178 at its front end such that the front plate 178 defines the front longitudinal end surface $170_2$ of the torque box 102. The front plate 178 is configured to connect the torque box 102 to the transversal connection plate 174.

Figure 19:
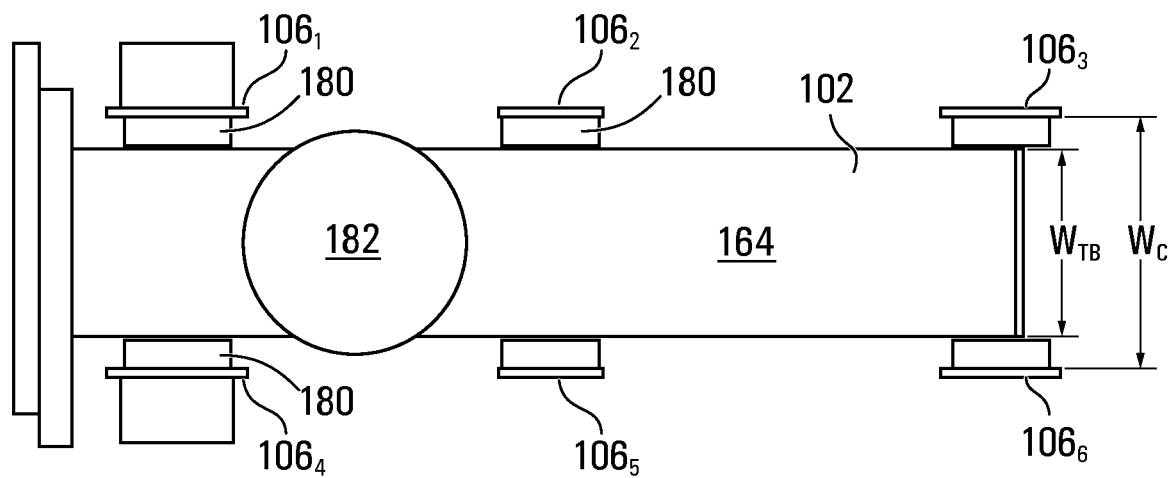
FIG. 19 shows a top view of the torque box in an embodiment where spacers are used to mount the torque box to the lateral plates of the lower frame structure.

The torque box 102 is mounted to the lower frame structure 62 via the lateral plates $106_1$-$106_6$ of the lower frame structure 62. More specifically, the torque box 102 is configured to fit the channel 162 defined by the lateral plates $106_1$-$106_6$. To that end, in this embodiment, the width $W_C$ of the channel 162 is at least as large as the width $W_{TB}$ of the torque box 102. In other embodiments, the width $W_C$ of the channel 162 may be greater than the width $W_{TB}$ of the torque box 102. In such embodiments, as shown in FIG. 19, at least one spacer 180 may be provided between the torque box 102 and at least one of the lateral plates 106$_1$-106$_6$ such as to securely fix the torque box 102 within the channel 162.

The torque box 102 may be secured to the lateral plates 106$_1$-106$_6$ in any suitable manner. For instance, in this embodiment, the torque box 102 is riveted to the lateral plates 106$_1$-106$_6$ via rivets extending through the holes 109$_1$-109$_H$ of the lateral plates 106$_1$-106$_6$. In other embodiments, the torque box 102 may be bolted or welded to the lateral plates 106$_1$-106$_6$. In yet other embodiments, the torque box 102 may be welded and riveted and/or bolted to the lateral plates 106$_1$-106$_6$. In this embodiment, the torque box 102 is also secured to the transversal connection plate 174 (e.g., via rivets).

Figure 20:
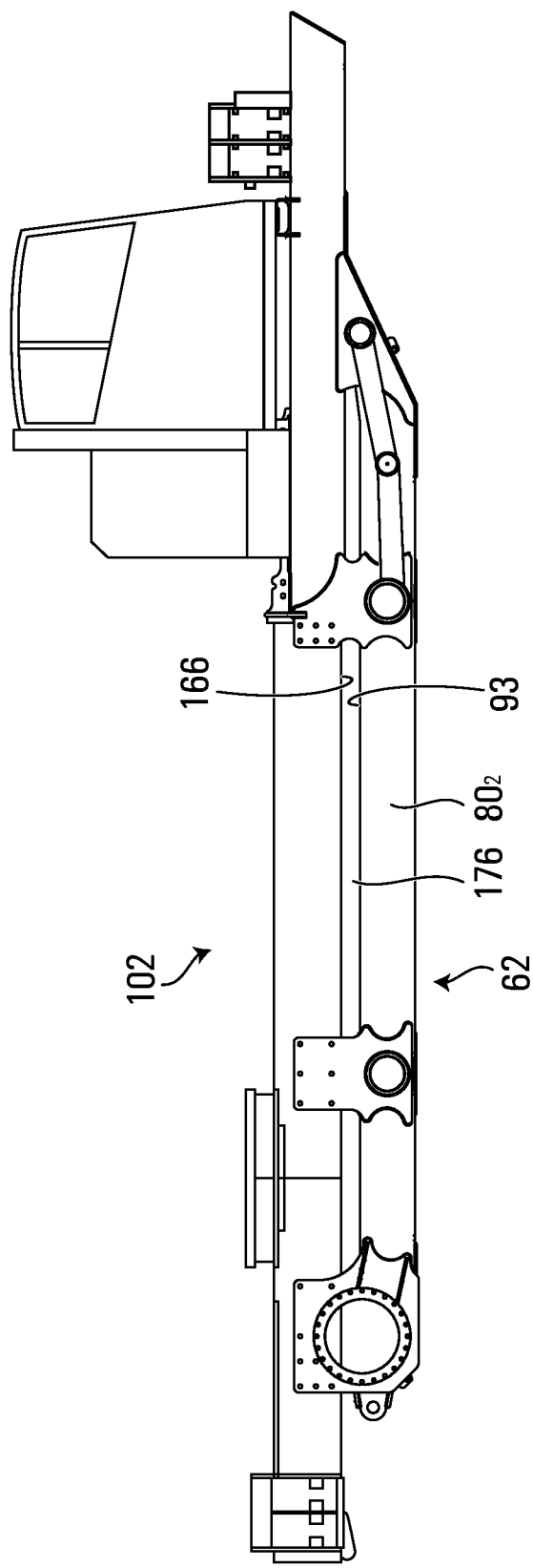
FIG. 20 shows a side view of the chassis with the torque box mounted to its lower frame structure and a stabilizer leg support assembly mounted to the upper frame structure frontwardly of the operator cabin.

In this embodiment, the torque box 102 is mounted above the rails 80$_1$, 80$_2$. More specifically, in this embodiment, as shown in FIG. 20, when the torque box 102 is mounted to the lower frame structure 62, the bottom surface 166 of the torque box 102 is separated from the top surface 93 of the rails 80$_1$, 80$_2$ by a vertical gap 176 (i.e., an empty space). Thus, in this embodiment, when the torque box 102 is mounted to the lower frame structure 62, the torque box 102 does not rest on the rails 80$_1$, 80$_2$. That is, the surfaces of the torque box 102 do not contact the surfaces of the rails 80$_1$, 80$_2$. The vertical gap 176 between the top surface 93 of the rails 80$_1$, 80$_2$ and the bottom surface 166 of the torque box 102 may be useful for routing cables and/or hoses related to the operation of the track assemblies 16$_1$, 16$_2$ and/or the torque box 102. In other embodiments, for example where height constraints may be more severe, the torque box 102 may be mounted to the lower frame structure 62 such that the bottom surface 166 of the torque box 102 rests on the rails 80$_1$, 80$_2$.

Figure 23:
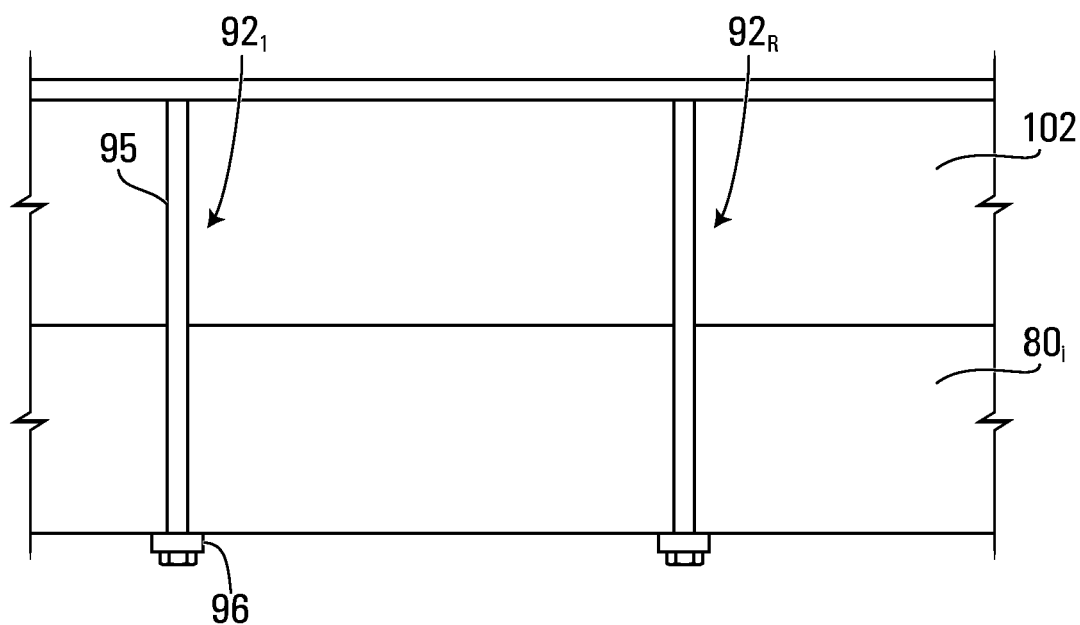
FIG. 23 shows an example of an attachment device used to secure the work equipment to the torque box.

In embodiments where the torque box 102 is mounted to the lower frame structure 62 such that the bottom surface 166 of the torque box 102 rests on the rails 80$_1$, 80$_2$, as shown in FIG. 23, the torque box 102 may be alternatively or additionally secured to the lower frame structure 62, and more specifically to the rails 80$_1$, 80$_2$, by a plurality of attachment devices 92$_1$-92$_R$. For example, each of the attachment devices 92$_1$-92$_R$ includes an attachment threaded rod assembly. Each attachment threaded rod assembly 92$_i$ includes a threaded rod 95 and a bottom link 96 disposed around the rail 80$_i$. Although the attachment devices 92$_1$-92$_R$ securing the torque box 102 to the rails 80$_1$, 80$_2$ are attachment threaded rod assemblies, various other types of attachment devices may be used in other embodiments.

In this embodiment, the torque box 102 is mounted to the lower frame structure 62 such that the torque box 102 does not extend into the first portion P$_1$ of the length L$_{LF}$ of the lower frame structure 62. That is, in this embodiment, the torque box 102 extends solely along the second portion P$_2$ of the length L$_{LF}$ of the lower frame structure 62. For example, the channel 162 defined by the lateral plates 106$_1$-106$_6$ is longitudinally bound by the front attachment plate 174 and thus the torque box 102 does not extend beyond the front attachment plate 174.

In this embodiment, the top surface 164 of the torque box 102 is substantially flat over a majority of the second portion P$_2$ of the length L$_{LF}$ of the lower frame structure 62. In other words, a profile height of the top surface 164 of the torque box 102 is largely—although not necessarily entirely—constant along its longitudinal span. For example, the equipment-mounting structures 182 of the torque box 102 may define locations at which the profile height of the top surface 164 of the torque box 102 varies.

The stabilizer leg support assembly 172 of the torque box 102 receives a pair of stabilizer legs (shown in FIG. 2) that are configured to support the vehicle 10 on the ground when the work equipment 41 is deployed (i.e., extended and ready to use). In this embodiment, the stabilizer leg support assembly 172 is a first stabilizer leg support assembly 172, the torque box 102 working in conjunction with a second stabilizer leg support assembly 184 that is separate from (i.e., not directly physically connected to) the torque box 102. The second stabilizer leg support assembly 184 is configured to receive another pair of stabilizer legs for supporting the vehicle 10 on the ground. The second stabilizer leg support assembly 184 is positioned at a front portion of the vehicle 10. More specifically, the second stabilizer leg support assembly 184 is connected to the beams 64$_1$, 64$_2$ of the upper frame structure 60 at a position frontwardly of the operator cabin 20.

The lower frame structure 62 is generally disposed at a lower height off the ground than the upper frame structure 60 in order to receive the torque box 102 at a lower height off the ground than if the torque box 102 were secured to the upper frame structure 60.

For instance, in this embodiment, the top surface 93 of each rail 80$_i$ of the pair of parallel rails 80$_1$, 80$_2$ is closer to the ground than the top surface of the pair of parallel beams 64$_1$, 64$_2$ of the upper frame structure 60. For instance, in some cases, a vertical distance between the top surface 93 of a rail 80$_i$ of the lower frame structure 62 and the top surface of a beam 64$_i$ of the upper frame structure 60 is at least 8 inches, in some cases at least 12 inches, in some cases at least 16 inches and in some cases even greater than 16 inches (e.g., 20 inches).

The upper and lower frame structures 60, 62 of the chassis 12 are connected at the first portion P$_1$ of the length L$_{LF}$ of the lower frame structure 62 (i.e., at the portion over which they overlap). More specifically, at the first portion P$_1$ of the length L$_{LF}$ of the lower frame structure 62, the rails 80$_1$, 80$_2$ of the lower frame structure 62 are located directly under the beams 64$_1$, 64$_2$ of the upper frame structure 60 and are connected thereto.

Connectedness of the upper and lower frame structures 60, 62 provides the chassis 12 with a greater resistance to torsion along the first portion P$_1$ than along the second portion P$_2$ of the length L$_{LF}$ of the lower frame structure 62. More specifically, the connectedness of the upper and lower frame structures 60, 62 reinforces the portion of the chassis 12 (including the upper and lower frame structures 60, 62) under the operator cabin to provide a greater resistance to torsion. For example, due to this reinforcement, the portion of the chassis 12 under the operator cabin 20 (i.e., the reinforced portion of the chassis 12) may have a greater resistance to torsion than a portion of the chassis 12 behind the operator cabin 20. For instance, in this embodiment, when a torque is applied to the chassis 12 about the longitudinal axis 59 of the vehicle 10, a von Mises stress generated at a point located halfway along a longitudinal span of the first portion P$_1$ of the length L$_{LF}$ of the lower frame structure 62 is smaller than a von Mises stress generated at a point located halfway along a longitudinal span of the second portion P$_2$ of the length L$_{LF}$ of the lower frame structure 62.

Furthermore, the connectedness of the upper and lower frame structures 60, 62 reinforces the chassis 12 such that the reinforced portion of the chassis 12 has a greater rigidity than other portions of the chassis 12. For instance, a point located halfway along the longitudinal portion P$_1$ of the length L$_{LF}$ of the lower frame structure 62 may be displaced by a smaller distance than a point located halfway along the longitudinal portion $P_2$ of the length $L_{LF}$ of the lower frame structure 62 in response to an applied forced thereat. This increased rigidity of the reinforced portion of the chassis 12 may prevent excessive displacement of work implements positioned on a side of the vehicle 10. For example, when the work equipment 41 includes a crane, the increased rigidity of the reinforced portion of the chassis 12 may prevent the crane from being excessively displaced in response to a torque about the longitudinal axis 59 of the vehicle 10 when the crane is positioned on a side of the vehicle 10.

As such, when the work equipment 41 is attached to the torque box 102 which is mounted to the lower frame structure 62, the reinforced portion of the chassis 12 described above, due to its increased rigidity, will transmit forces caused by operation of the work equipment 41 to the stabilizer legs supported by the second stabilizer leg support assembly 184 at the front of the vehicle 10. By transmitting forces to the front stabilizer legs, the reinforced portion of the chassis 12 may avoid overloading the rear stabilizer legs of the vehicle 10, thus preventing excessively elevated stresses from being generated at the rear stabilizer legs.

In this embodiment, the upper frame structure 60 is connected to the lower frame structure 62 by a connection structure 185 which comprises the transversal connection plate 174, the lateral plates $106_3$, $106_6$, a pair of front connection plates $186_1$, $186_2$ and a pair of reinforcement arm assemblies $195_1$, $195_2$. The transversal connection plate 174 extends transversally to the longitudinal direction of the vehicle 10 and is fastened to rear longitudinal ends of each of the beams $64_1$, $64_2$ and to at least the top surface 93 of each of the rails $80_1$, $80_2$. Each of the lateral plates $106_3$, $106_6$ and each of the front connection plates $186_1$, $186_2$ are fastened to the outboard lateral surfaces of respective ones of the rails $80_1$, $80_2$ and the beams $64_1$, $64_2$. In this embodiment, the transversal connection plate 174 is also fastened to each of the lateral plates $106_3$, $106_6$. In this embodiment, the plates of the connection structure 185 are fastened to the rails $80_1$, $80_2$ and the beams $64_1$, $64_2$ via welding, although in other embodiments, these plates may be fastened in any other suitable way (e.g., via bolts and/or rivets).

The reinforcement arm assemblies $195_1$, $195_2$ are configured to support a load induced by a tension of a track of the track assemblies $16_1$, $16_2$. Each of the reinforcement arm assemblies $195_1$, $195_2$ is connected to the support members $104_2$, $104_3$ via a pair of beams 198, 200 that are in turn connected to a transversal reinforcement element 202 positioned in between the support members $104_2$, $104_3$ in the longitudinal direction of the vehicle 10. In this embodiment, the beam 198 is fastened to the support member $104_2$ and to the transversal reinforcement element 202, while the beam 200 is fastened to the support member $104_3$ and to the transversal reinforcement element 202. The beam 198 is oriented at an angle relative to the longitudinal direction of the vehicle 10 while the beam 200 is generally parallel to the longitudinal direction of the vehicle 10. In this embodiment, the transversal reinforcement element 202 consists of a cylindrical hollow metallic member.

As will be appreciated, in this embodiment, the lower frame structure 62 is connected to the upper frame structure 60 over at least the first portion $P_1$ of the length $L_{LF}$ of the lower frame structure 62. More specifically, in this embodiment, the front connection plates $186_1$, $186_2$ are spaced apart from the transversal connection plate 174 in the longitudinal direction of the vehicle 10. For instance, in this embodiment, a frontmost connection point of a front connection plate $186_i$ is spaced apart from the transversal connection plate 174 by a distance equivalent to the first portion $P_1$ of the length $L_{LF}$ of the lower frame structure 62.

The front and rear drawbars $87_1$, $87_2$ of the lower frame structure 62 are positioned at a front and rear portion of the chassis 12 respectively. As more clearly shown in FIG. 6, the front drawbar $87_1$ comprises an angled plate fastened to the bottom surfaces 94 of the rails $80_1$, $80_2$, the front connection plates $186_1$, $186_2$ and the bottom surfaces 67 of the beams $64_1$, $64_2$. As such, the front drawbar $87_1$ may be considered as part of the connection structure 185. The rear drawbar $87_2$ comprises a folded sheet metal structure that extends transversally to the longitudinal direction of the vehicle 10 between the rear lateral plates $106_1$, $106_4$ and is fastened thereto (e.g., via welding). This may provide additional support to the rear lateral plates in $106_1$, $106_4$. Each of the front and rear drawbars $87_1$, $87_2$ may comprise shackles for attaching a load thereto.

The chassis 12 may be configured in various other ways.

Figure 43:
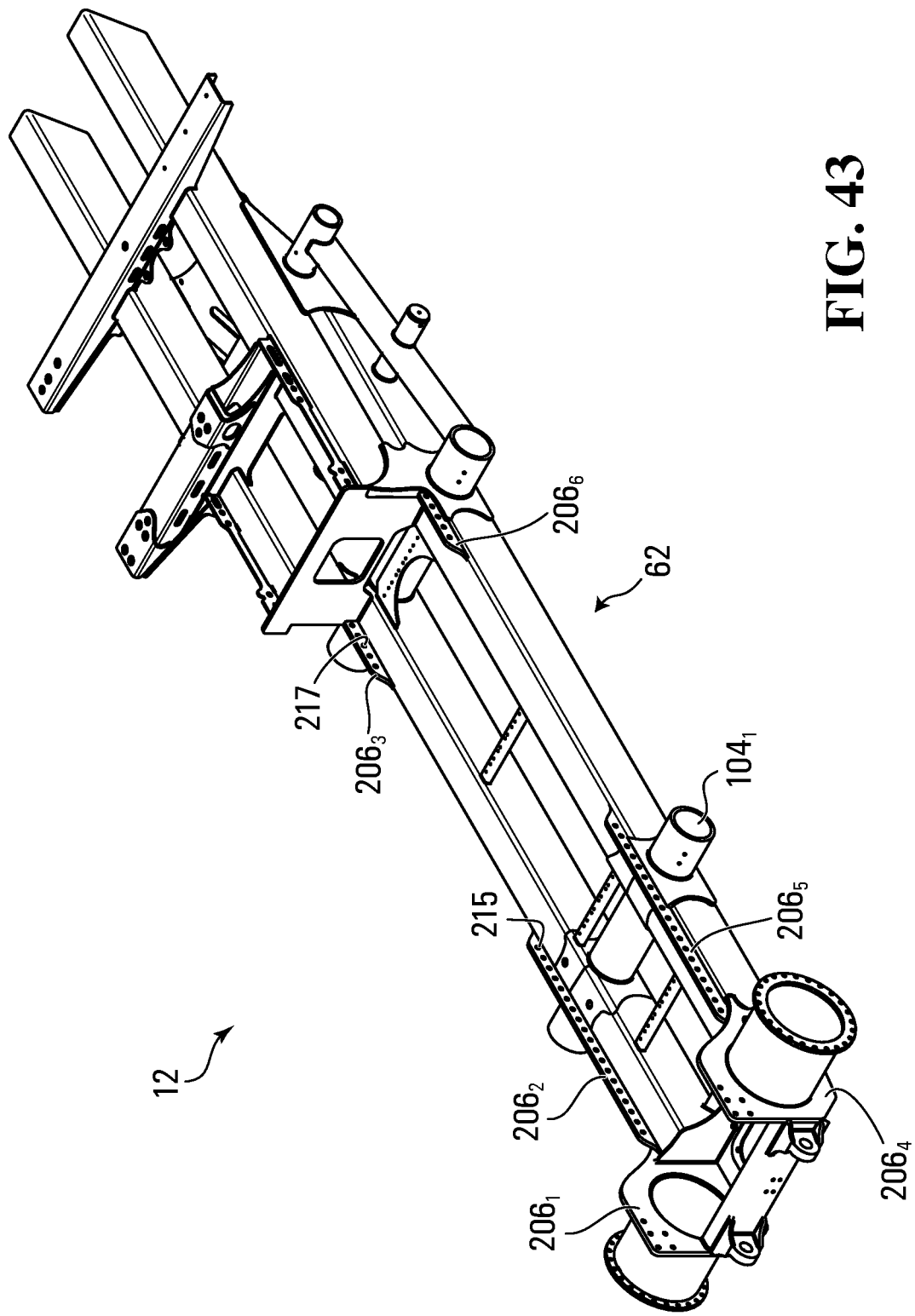
FIG. 43 shows a perspective view of the chassis in accordance with a variant, where the lateral plates are configured are not connected directly to the torque box.

For instance, with additional reference to FIG. 43, in a variant, the lateral plates of the lower frame structure 62 may be configured differently. For example, the lower frame structure 62 may comprise lateral plates $206_1$-$206_6$, including a pair of rear plates $206_1$, $206_4$, a pair of middle plates $206_2$, $206_5$, and a pair of frontal plates $206_3$, $206_6$. The rear plates $206_1$, $206_4$ are substantially similar to the rear plates $106_1$, $106_4$ described above in that they comprise a plate portion and a drive wheel support structure for supporting the drive wheel of a respective one of the track assemblies $16_1$, $16_2$. The middle plates $206_2$, $206_5$ and the frontal plates $206_3$, $206_6$ are connected to a respective one of the rails $80_1$, $80_2$ (e.g., via welding) at the top surface 93 of each rail $80_i$.

The middle plates $206_2$, $206_5$ are centered in relation to the support member $104_1$ in the longitudinal direction of the vehicle 10. Each of the middle plates $206_2$, $206_5$ is generally rectangular and has a length $L_M$ that is significant in relation to the length $L_{LF}$ of the lower frame structure 62. For instance, a ratio $L_m/L_{LF}$ of the length $L_M$ of each middle plate $206_2$, $206_5$ over the length $L_{LF}$ of the lower frame structure 62 may be at least 0.1, in some cases at least 0.3, in some cases at least 0.5, and in some cases even more. The middle plates $206_2$, $206_5$ further comprise openings 215 for engaging a fastener.

Unlike the frontal plates $106_3$, $106_6$ described above, the frontal plates $206_3$, $206_6$, which are generally rectangular, are not connected to the upper frame structure 60. That is, the frontal plates $206_3$, $206_6$ are solely connected to the lower frame structure 62. Moreover, the frontal plates also comprise openings 217 for engaging a fastener.

The middle plates $206_2$, $206_5$ and the frontal plates $206_3$, $206_6$ have a relatively low height. That is because, unlike the middle plates $106_2$, $106_5$ and the frontal plates $106_3$, $106_6$ described above, the middle plates $206_2$, $206_5$ and the frontal plates $206_3$, $206_6$ are not connected directly to the torque box 102. Rather, the middle plates $206_2$, $206_5$ and the frontal plates $206_3$, $206_6$ are connected via their respective openings 215, 217 (e.g., via a bolted connection) to "fishplates" which can in turn be connected directly to the torque box 102 or to a frame similar to a standard truck frame to which the torque box 102 may be connected to (e.g., via rivets, bolts, and/or welding). A ratio of a height of each of the middle and frontal plates $206_2$, $206_3$, $206_5$, $206_6$ over a height of each of the rails $80_1$, $80_2$ may be no more than 0.4, in some cases no more than 0.2, in some cases no more than 0.1, and in some cases even less.

Figure 44:
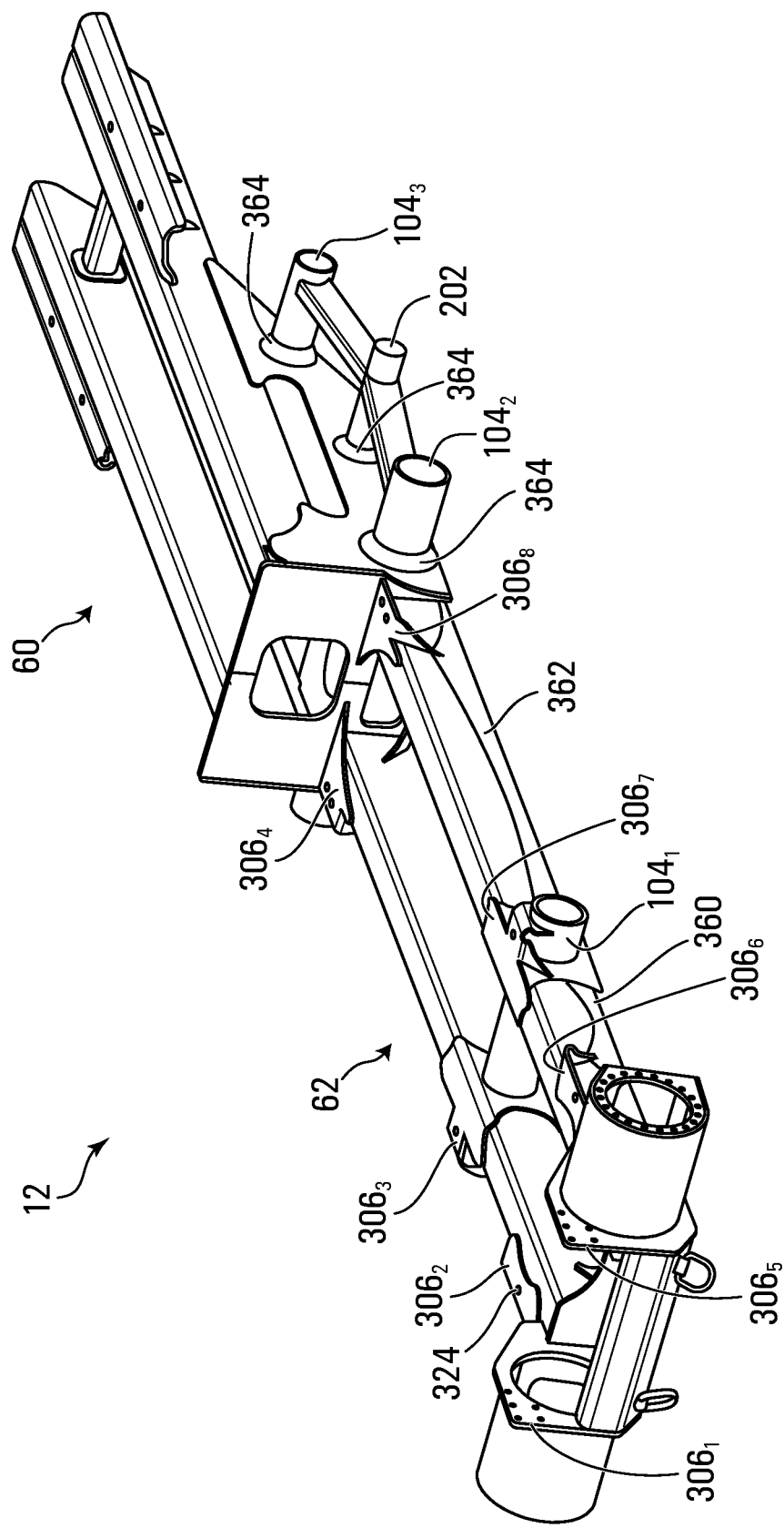
FIG. 44 shows a perspective view of the chassis in accordance with a variant in which the lateral plates are configured such that the torque box is disposed substantially on the rails of the lower frame structure of the chassis.

In another variant, with additional reference to FIG. 44, the chassis 12 may be configured such that the torque box 102 is disposed substantially on the rails $80_1$, $80_2$ of the lower frame structure 62. This may allow wider torque boxes to be secured to the lower frame structure 62 because they do not need to fit into a channel.

To that end, the lower frame structure 62 comprises lateral plates $306_1$-$306_8$, including a pair of rear plates $306_1$, $306_5$, a pair of first middle plates $306_2$, $306_6$, a pair of second middle plates $306_3$, $306_7$, and a pair of frontal plates $306_4$, $306_8$. The rear plates $306_1$, $306_5$ are substantially similar to the rear plates $106_1$, $106_4$ described above in that they comprise a plate portion and a drive wheel support structure for supporting the drive wheel of a respective one of the track assemblies $16_1$, $16_2$. The first middle plates $306_2$, $306_6$, the second middle plates $306_3$, $306_7$ and the frontal plates $306_4$, $306_8$ are connected to a respective one of the rails $80_1$, $80_2$ (e.g., via welding) at the top surface 93 of each rail $80_i$.

Figure 46:
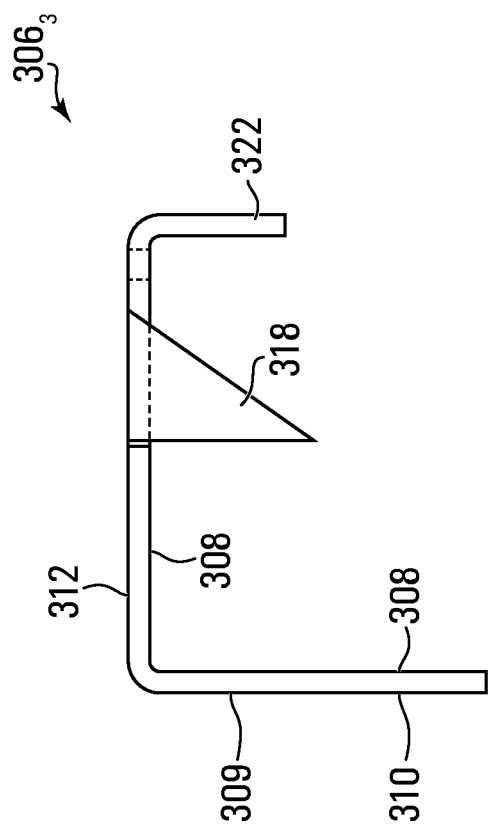
FIGS. 45 and 46 show a top view and a side view of a lateral middle plate of the chassis of FIG. 44.
Figure 45:
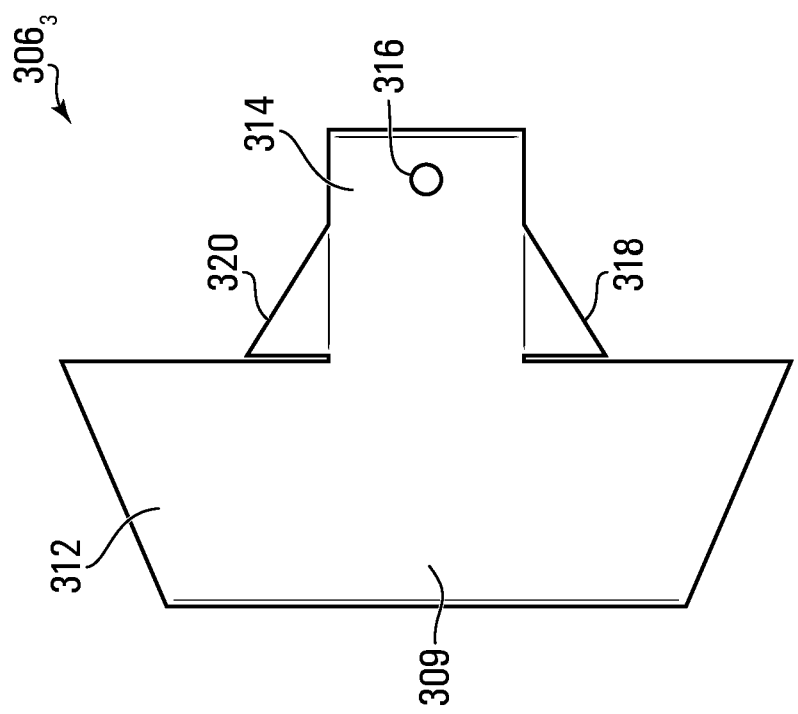

The second middle plates $306_3$, $306_7$ are centered in relation to and supported by the support member $104_1$ in the longitudinal direction of the vehicle 10. With additional reference to FIGS. 45 and 46, the second middle plate $306_3$ (to which the second middle plate $306_7$ is identical) comprises an inner surface 308 and an outer surface 309 opposite the inner surface 308. The second middle plate $306_3$ comprises first and second portions 310, 312 for connecting to a respective one of the rails $80_1$, $80_2$. More specifically, the first portion 310 is fastened to an inboard one of the lateral surfaces $97_1$, $97_2$ of the rail $80_i$ while the second portion 312 is fastened to the top surface 93 of the rail $80_i$ such that the inner surface 308 of the second middle plate $306_3$ faces the inboard lateral surface $97_i$ and the top surface 93 of the rail $80_i$. In this example of implementation, the first and second portions 310, 312 are connected to the rail $80_i$ via welding. However, the first and second portions 310, 312 may be connected to the rail $80_i$ in any other suitable way (e.g., via bolts or rivets). The second middle plate $306_3$ further comprises a connecting portion 314 comprising at least one opening 316 for affixing the torque box 102, and support flanges 318, 320, 322 projecting from the connecting portion 314 to support the connecting portion 314. The support flanges 318, 320, 322 are configured to provide support to the second middle plate $306_3$. For instance, the support flanges 318, 320 are affixed to an outboard one of the lateral surfaces $97_1$, $97_2$ of the rail $80_i$ (or to a reinforcing plate that is affixed to the outboard lateral surface $97_i$ of the rail $80_i$) while the support flange 322 is affixed to and supported by the first support member $104_1$. The support flanges 318, 320, 322 can be affixed to the rail $80_i$ or the first support member $104_1$ via welding or in any other suitable way (e.g., bolts or rivets).

The first middle plates $306_2$, $306_6$ are configured similarly to the second middle plates $306_3$, $306_7$ with the exception that they do not comprise a portion that is affixed to an inboard one of the lateral surfaces $97_1$, $97_2$ of the rail $80_i$ and they do not comprise a support flange that is affixed to any of the support members $104_1$-$104_3$. Rather, the first middle plates $306_2$, $306_6$ comprise a support flange affixed solely to the outboard one of the lateral surfaces $97_1$, $97_2$ of the rail $80_i$. Each of the first middle plates $306_2$, $306_6$ comprises at least one opening 324 for affixing the torque box 102. In some embodiments, the first and second middle plates $306_2$, $306_3$, $306_6$, $306_7$ and the frontal plates $306_4$, $306_8$ may have a thickness between 0.25 inch and 1 inch.

Figure 47:
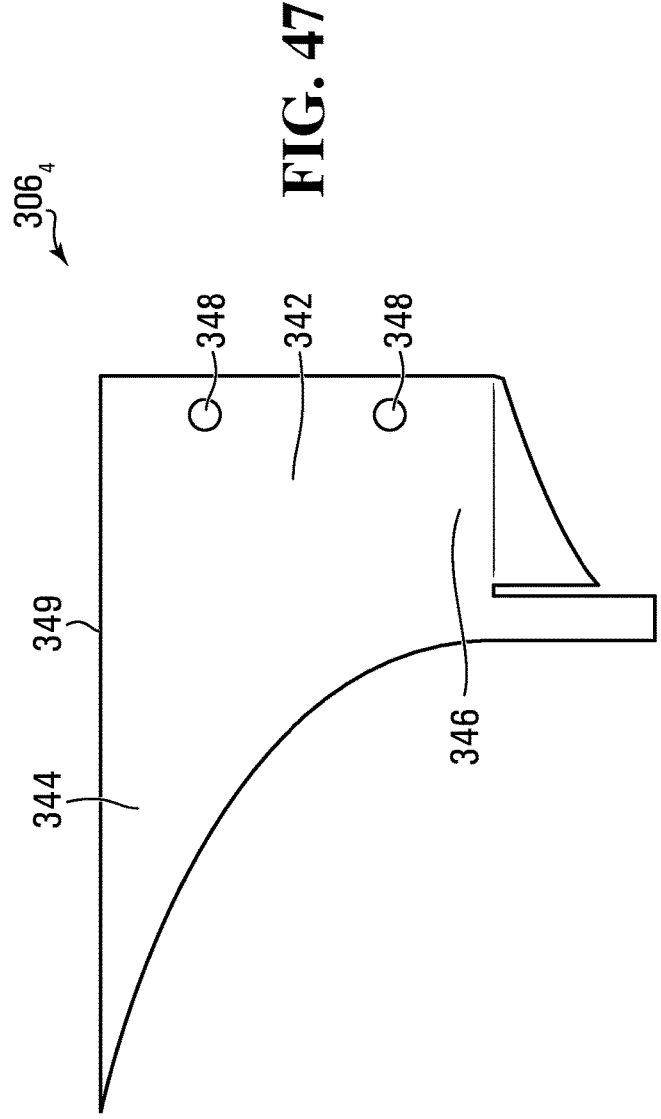
FIGS. 47 and 48 show a top view and a side view of a lateral frontal plate of the chassis of FIG. 44.
Figure 48:
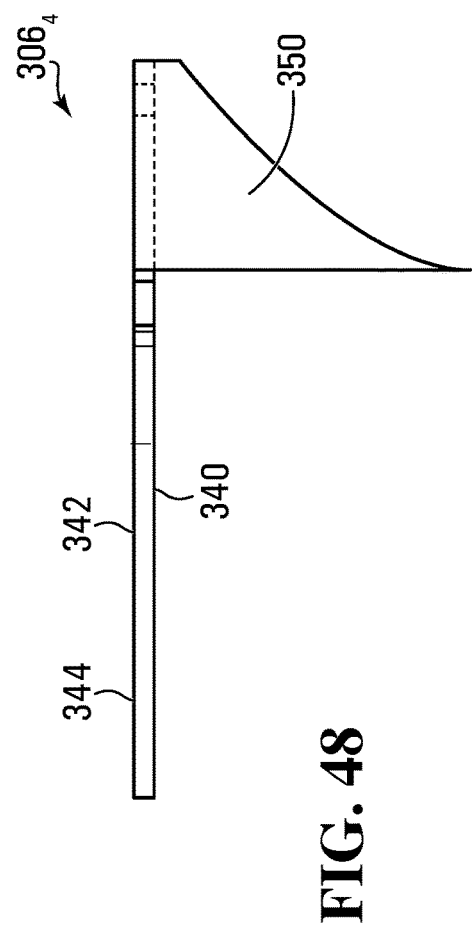

With additional reference to FIGS. 47 and 48, the frontal plate $306_4$ (to which the frontal plate $306_8$ is identical) comprises an inner surface 340 and an outer surface 342 opposite the inner surface 340. The frontal plate $306_4$ further comprises a first portion 344 for affixing the frontal plate $306_4$ to the rail $80_i$, and a connecting portion 346 extending beyond the widthwise extent of the rail $80_i$ and comprising at least one opening 348 for affixing the torque box 102 to the frontal plate $306_4$. A lateral edge 349 of the frontal plate $306_4$ is affixed (e.g., via welding) to the transversal connection plate 174. The frontal plate $306_4$ also comprises a support flange 350 projecting from the connecting portion 346 to support the connecting portion 346. The support flange 350 is configured to provide support to the frontal plate $306_4$. For instance, the support flange 350 is affixed to an outboard one of the lateral surfaces $97_1$, $97_2$ of the rail $80_i$ (or to a reinforcing plate that is affixed to the outboard lateral surface $97_i$ of the rail $80_i$) The support flange 350 can be affixed to the rail $80_i$ via welding or in any other suitable way (e.g., bolts or rivets).

As shown in FIGS. 49 and 50, in this variant, the torque box 102 is mounted substantially on the rails $80_1$, $80_2$. That is, when the torque box 102 is mounted to the lower frame structure 62, the bottom surface 166 of the torque box 102 is separated from the top surface 93 of the rails $80_1$, $80_2$ by no vertical gap (or by a vertical gap 375 that is of negligible size). More specifically, the bottom surface 166 of the torque box 102 is in contact with the outer surface of each of the first and second middle plates $306_2$, $306_3$, $306_6$, $306_7$ and the frontal plates $306_4$, $306_8$ such that the bottom surface 166 of the torque box 102 is separated from the top surface 93 of each rail $80_i$ by a spacing approximately equal to a thickness of each of the first and second middle plates $306_2$, $306_3$, $306_6$, $306_7$ and the frontal plates $306_4$, $306_8$. As such, the spacing between the torque box 102 and the rails $80_1$, $80_2$ may be no more than 4 inches, in some cases no more than 2 inches, in some cases no more than 0.25 inch, and in some cases even less. This may allow the work equipment 41 to be mounted on the chassis 12 at an even further lowered position to allow a greater clearance between the work equipment 41 and the vehicle height limit of the public road infrastructure and/or to allow taller work equipment 41 to be installed without surpassing the vehicle height limit of the public road infrastructure. The torque box 102 is secured to the first and second middle plates $306_2$, $306_3$, $306_6$, $306_7$ and to the frontal plates $306_4$, $306_8$ by inserting a fastener 380 (e.g., a bolt) in their respective openings 316, 324, 348 and securing the fastener 380 with a fastener-receiving element 382 (e.g., a nut or an internal thread of the opening 316, 324, 348).

Moreover, as shown in FIG. 44, the lower frame structure 62 of the chassis 12 may be reinforced further via reinforcement plates. More specifically, the lower frame structure 62 may comprise reinforcement plates 360, 362 affixed to outboard ones of the lateral surfaces $97_1$, $97_2$ of the rails $80_1$, $80_2$. Each of the reinforcement plates 360, 362 extends in the longitudinal direction of the vehicle 10 and spans at least a majority of a length of the second portion $P_2$ of the length $L_{SF}$ of the lower frame structure 62. In some cases, the reinforcement plates 360, 362 may form of a single continuous reinforcement plate.

Furthermore, the support members $104_1$-$104_3$ of the chassis 12 may be reinforced via reinforcement collars 364 configured for supporting a respective support member $104_i$. Each reinforcement collar 364 comprises an annular body sized as to receive therein a respective support member $104_i$ and is affixed to an outboard one of the lateral surfaces $97_1$, $97_2$ of the rails $80_1$, $80_2$ (e.g., via welding). In this example, the support members $104_2$, $104_3$ are reinforced via a respective reinforcement collar 364. Moreover, in this example, the transversal reinforcement element 202 may also be reinforced via a reinforcement collar 364 that supports the transversal reinforcement element 202.

b) Power Plant

The power plant 14 generates power to move the tracked utility vehicle 10. To that end, the power plant 14 comprises a prime mover 17. For example, the prime mover 17 may comprise an internal combustion engine and/or one or more other types of motors (e.g., electric motors, etc.) for generating motive power to move the vehicle 10. In this embodiment, the power plant 14 is affixed to the first and second crossmembers $66_1$, $66_2$ of the upper frame structure 60.

Figure 24:
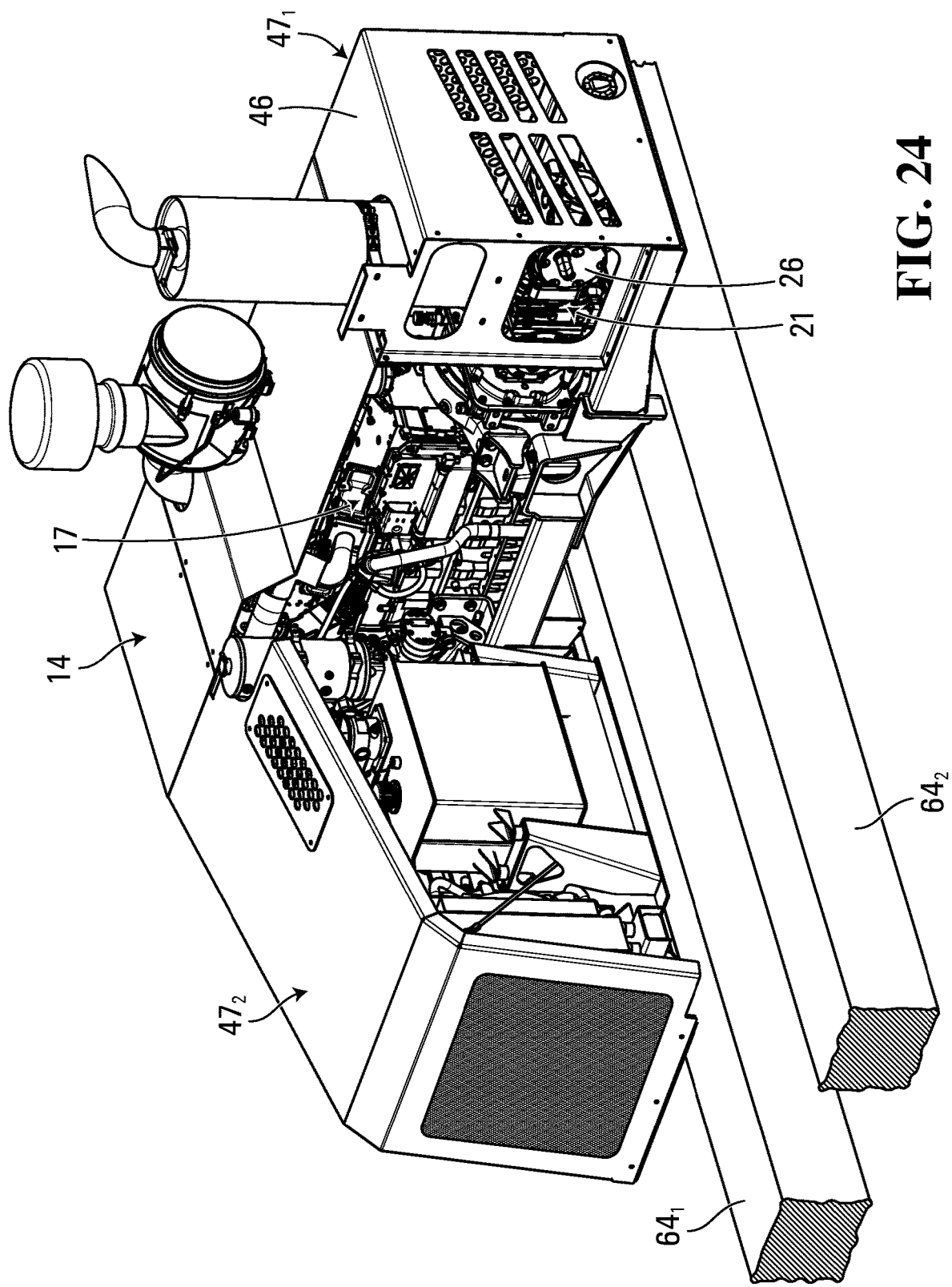
FIG. 24 shows a perspective view of the power plant of the tracked vehicle.
Figure 25:
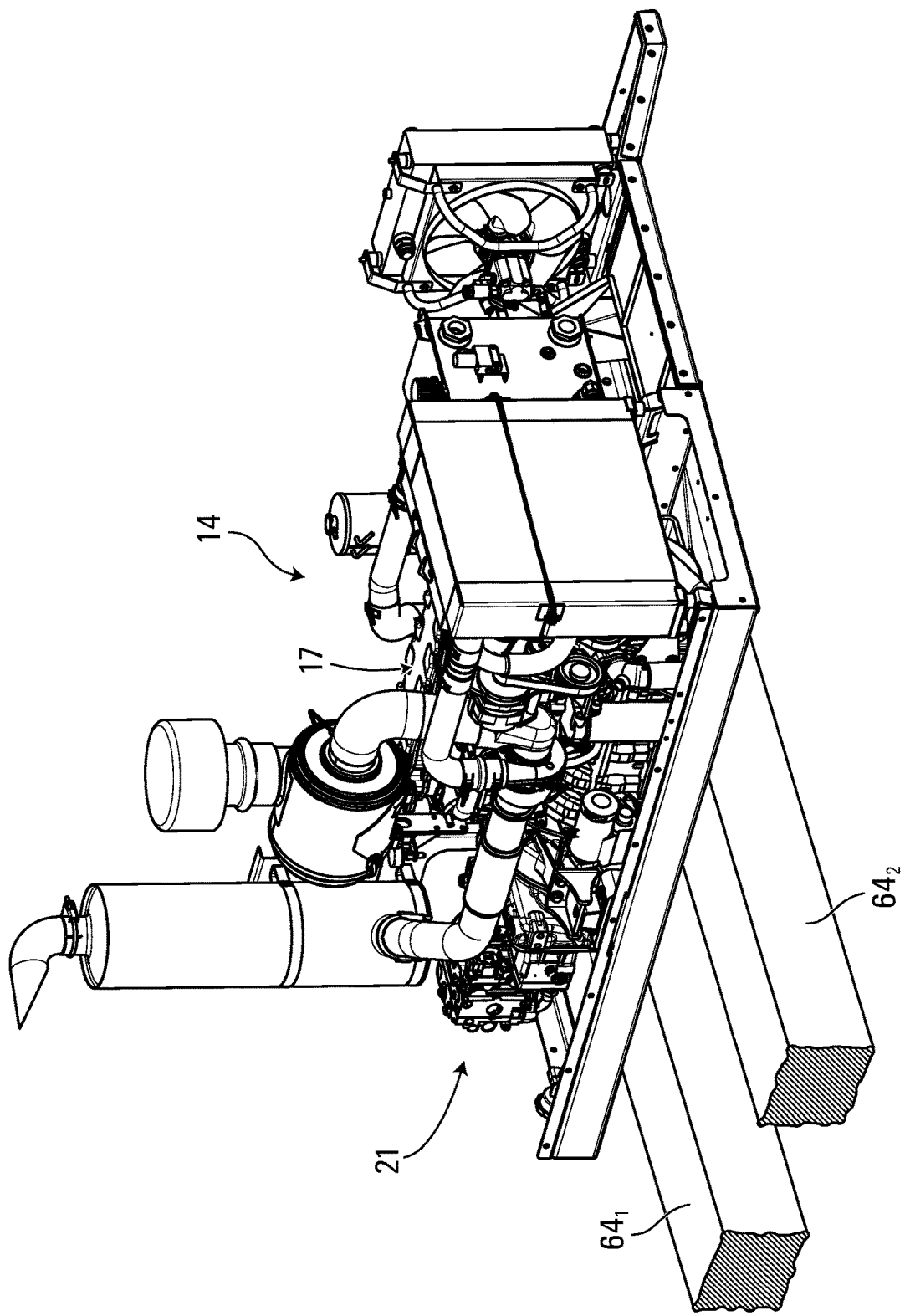
FIG. 25 shows another perspective view of the power plant of the tracked vehicle with panels of a housing of the power plant removed.

The power plant 14 is in a driving relationship with each of the track assemblies $16_1$, $16_2$. That is, power derived from the power plant 14 is transmitted to each of the track assemblies $16_1$, $16_2$ in order to drive the track assemblies $16_1$, $16_2$. In this embodiment, with additional reference to FIGS. 24 and 25, power from the power plant 14 is transmitted to the track assemblies $16_1$, $16_2$ via a hydraulic drive system 21. For instance, in this example, the hydraulic drive system 21 comprises, for each of the track assemblies $16_1$, $16_2$, a hydraulic pump 26 driven by the prime mover 17 and connected to a hydraulic motor (not shown) which drives that track assembly. Power from the power plant 14 may be transmitted to the track assemblies $16_1$, $16_2$ in various other ways in other embodiments.

In this embodiment, the power plant 14 includes a housing 46 which houses the prime mover 17 and other components of the power plant 14. More particularly, in this embodiment, the housing 46 houses: hydraulic components including each hydraulic pump 26 of the hydraulic drive system 21 and a hydraulic fluid reservoir; a cooling system for cooling the prime mover 17 and hydraulic fluid of the hydraulic drive system 21; batteries; components of an exhaust system; pipes; and cables. Other components of the power plant 14 may be housed in the housing 46 in other embodiments.

The housing 46 and the components of the power plant 14 that it houses are mounted on top of the upper frame structure 60. More particularly, in this embodiment, the housing 46 comprises a back housing portion $47_1$ which houses a first portion of the power plant 14 and is located above the upper frame structure 60 behind the operator cabin 20 and a side housing portion $47_2$ which houses a second portion of the power plant 14 and is located above the upper frame structure 60 on a right side of the operator cabin 20. Thus, in this embodiment, the housing 46 has a generally L-shaped configuration that extends behind and next to the operator cabin 20, with the back housing portion $47_1$ being elongated in the widthwise direction of the vehicle 10 and the side housing portion $47_2$ being elongated in the longitudinal direction of the vehicle 10.

Mounting of the housing 46 and the components of the power plant 14 that it houses above the upper frame structure 60 may facilitate installation and servicing of the power plant 14. For example, maintenance or other servicing activities may be performed by accessing components of the power plant 14 without being obstructed by the work equipment 41.

Also, components of the power plant 14, including the prime mover 17, the hydraulic pumps of the hydraulic drive system 21, and the housing 46, may secured to one another to constitute a "power plant module" that can be installed on and removable from the chassis 12 together as a unit. This may allow the tracked utility vehicle 10 to be easily equipped with a particular one of a plurality of different power plant modules during manufacturing of the vehicle 10 depending on an application or environment in which the vehicle 10 will be used. For example, in some embodiments, the plurality of different power plant modules may comprise different types of prime movers. For instance, in some cases, the different types of prime movers may be different types of internal combustion engines, such as different types of engines that conform to requirements of different engine tiers (e.g., an engine conforming to requirements of a T3 engine tier and an engine conforming to requirements of a T4 engine tier). In such examples of implementation, a controller controlling the prime mover 17 (e.g., an engine control unit (ECU)) may comprise software that can control the different types of engines and receives an input indicating a particular type of engine to which the prime mover 17 corresponds to control it accordingly.

Furthermore, mounting of the housing 46 and the components of the power plant 14 that it houses above the upper frame structure 60 may allow the height $H_v$ of the tracked utility vehicle 10 to be kept small. This may be beneficial in various cases.

For example, in this embodiment, the operator cabin 20 can have one or more seats to accommodate a number of individuals (e.g., one, two, etc.,) as further discussed later on, and the tracked utility vehicle 10 carrying the work equipment 41 can travel on a public road infrastructure. The vehicle 10 may travel on the public road infrastructure by self-propulsion or by being transported on another vehicle (e.g., on a flatbed truck). The vehicle 10 may therefore respect a vehicle height limit (i.e., a maximum vehicle height allowable) for travel on the public road infrastructure. The vehicle height limit is normally set by a government responsible for the public road infrastructure. For example, in some cases, the vehicle height limit for travel on the public road infrastructure may be between 13.5 feet (4.1 m) and 14 feet (4.3 m). The vehicle height limit for travel on the public road infrastructure may have any other suitable value in other cases.

More particularly, in this embodiment, when the work equipment 41 is in the retracted nonworking state (i.e., a state in which it is retracted onto the vehicle 10 and not performing any work operation, as opposed to an extended working state in which it is extended outwardly from the vehicle 10 to perform a work operation), the work equipment 41 is arranged such that it extends frontward in the longitudinal direction of the vehicle 10 beyond a rear side 114 of the operator cabin 20. In this example of implementation, the work equipment 41 extends frontward in the longitudinal direction of the vehicle 10 beyond a front side 112 of the operator cabin 20, next to a right side $116_2$ of the operator cabin 20, above the side housing portion $47_2$. Mounting part of the power plant 14, including the prime mover 17, on top of the upper frame structure 60 and behind the operator cabin 20 (e.g., as opposed to within an internal space or "tub" defined by the chassis 12) allows the operator cabin 20 to be low enough for installing the work equipment 41 in this manner. For example, in some embodiments, the height $H_v$ of the vehicle 10 to the roof 118 of the operator cabin 20 may be no more than 2.8 m, in some cases no more than 2.7 m, and in some cases no more than 2.6 m. For instance, in this embodiment, the height $H_v$ of the vehicle 10 may be about 2.5 m.

As another example, the tracked utility vehicle 10, without the work equipment 41 installed thereon, may fit in a closed shipping container for transport (e.g., overseas). For instance, in some examples, a maximum height for a shipping container may be no more than 3 m, in some cases no more than 2.8 m, and in some cases no more than 2.6 m, and the vehicle 10 may fit in that shipping container.

As yet another example, keeping the height $H_v$ of the tracked utility vehicle 10 small may permit a vertical distance between a top of the operator cabin 20 and the lower frame structure 62 to be identical or similar to a corresponding distance in trucks to allow work equipment such as the work equipment 41 possibly designed primarily for mounting on trucks to be easily mountable on the vehicle 10.

In addition to generating motive power to propel the tracked utility vehicle 10, in some embodiments, the power plant 14 may power the work equipment 41 carried by the vehicle 10. For instance, in some cases, the prime mover 17 may be used to supply power to the work equipment 41. In other cases, the power plant 14 may comprise an additional prime mover to supply power to the work equipment 41.

c) Track Assemblies

The track assemblies $16_1$, $16_2$ are used to propel the tracked utility vehicle 10 on the ground. The track assembly $16_1$ is on a first lateral side of the vehicle 10, while the track assembly $16_2$ is on a second lateral side of the vehicle 10. The track assemblies $16_1$, $16_2$ are mounted to the lower frame structure 62. Each of the track assemblies $16_1$, $16_2$ supports a portion of a weight of the vehicle 10 in use. In this example, the track assemblies $16_1$, $16_2$ are similarly configured and are disposed symmetrically relative to the lower frame structure 62 of the chassis 12 and thus the portion of the weight of the vehicle 10 supported by each of the track assemblies $16_1$, $16_2$ is about half of the weight of the vehicle 10. In other examples, the portion of the weight of the vehicle 10 supported by each of the track assemblies $16_1$, $16_2$ may be other than one-half of the weight of the vehicle 10.

Figure 26:
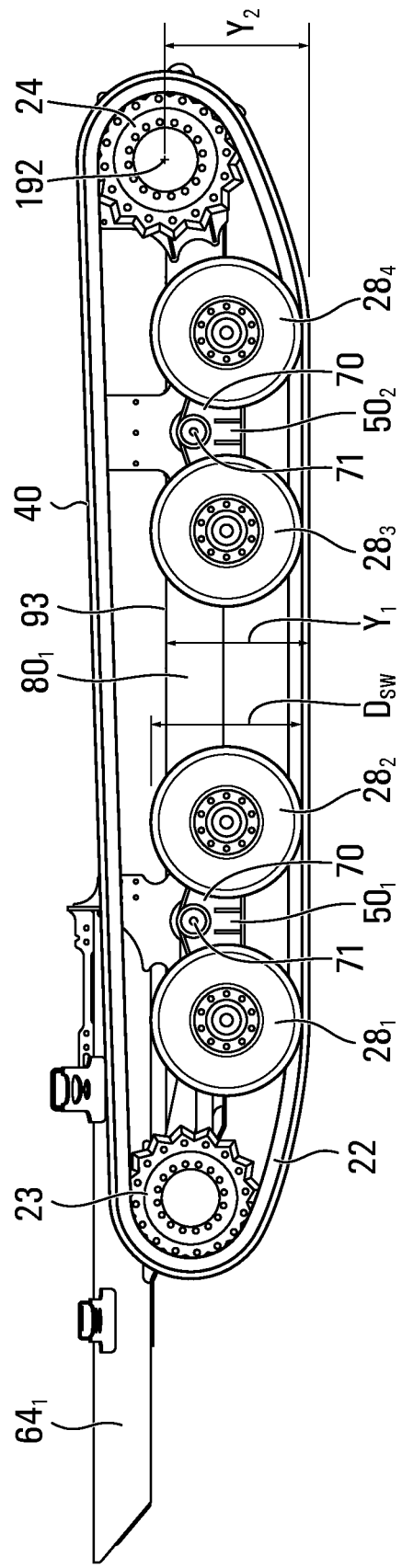
FIG. 26 shows a side view of a track assembly of the vehicle mounted to the lower frame structure of the chassis.

With additional reference to FIG. 26, in this embodiment, each track assembly $16_i$ comprises a plurality of wheels, which includes a drive wheel 24, an idler wheel 23 (alternatively referred to as an end wheel), and a plurality of support wheels $28_1$-$28_4$, and an endless track 22 disposed around the wheels 24, 23, $28_1$-$28_4$. The track assembly $16_i$ has a length $L_{ta}$, a width $W_{ta}$, and a height $H_{ta}$. A longitudinal direction of the track assembly $16_i$ is generally parallel to the longitudinal direction of the tracked utility vehicle 10. The track assembly $16_i$ also has transversal directions, including a widthwise direction which is generally parallel to the widthwise direction of the tracked vehicle 10, and a height direction which is generally parallel to the height direction of the vehicle 10.

The endless track 22 engages the ground to provide traction. The endless track 22 is disposed around the wheels 24, 23, $28_1$-$28_4$ and includes a top run 40 and a bottom run 42. The top run 40 and the bottom run 42 of the endless track 22 are generally parallel to one another and extend along the longitudinal direction of the tracked utility vehicle 10. The top run 40 of the endless track 22 is generally horizontal and has a length that is generally defined by the distance between the drive wheel 24 and the idler wheel 23. The bottom run 42 of the endless track 22 is that portion of the endless track 22 which is beneath the support wheels $28_1$-$28_4$ and which engages the ground. The bottom run 42 of the endless track 22 has a length that is generally defined by the distance between a frontmost one of the support wheel $28_1$-$28_4$, in this case, the support wheel $28_1$, and a rearmost one of the support wheel $28_1$-$28_4$, in this case, the support wheel $28_4$.

The drive wheel 24 is in a driven relationship with the power plant 14 to impart movement of the endless track 22 in order to propel the vehicle 10 on the ground. The drive wheel 24 is rotatable about an axis of rotation 192 which is transverse to the longitudinal direction of the vehicle 10 by power derived from the power plant 14 to impart movement of the endless track 22. More specifically, the drive wheel 24 is mounted to the drive wheel support structure 117 via a planetary gearbox (not shown). Thus in this embodiment, the drive wheel 24 is located in a rear region of the chassis 12 and therefore a powertrain of the tracked utility vehicle 10 is configured to transmit the motive power of the prime mover 17 to the rear of the vehicle 10. To that end, in this embodiment, the powertrain of the tracked utility vehicle 10 comprises a hydrostatic transmission (not shown) which connects the hydraulic drive system 21 at the front of the vehicle 10 to the drive wheel 24 at the rear of the vehicle 10. In this embodiment, the drive wheel 24 comprises a sprocket that engages the endless track 22. The drive wheel 24 may be configured in various other ways in other embodiments.

As shown in FIG. 26, the top surface 93 of each rail $80_i$ of the lower frame structure 62 may be positioned slightly higher than the axis of rotation 192 of the drive wheel 24 of respective ones of the track assemblies $16_1$, $16_2$. For example, a distance $Y_1$ measured from the top surface 93 of each rail $80_i$ to the ground may be greater than a distance $Y_2$ measured from the axis of rotation 192 of the drive wheel 24 to the ground. For instance, in some cases, the top surface 93 of each rail $80_i$ may be further from the ground than the axis of rotation 192 of the drive wheel 24 by (i.e., $Y_1$-$Y_2$ may be) no more than 320 mm (about 12.6 inches), in some cases no more than 150 mm (about 5.9 inches), in some cases no more than 50 mm (about 2 inches) and in some cases even less than 50 mm (e.g., 25 mm (about 1 inch)).

The idler wheel 23 does not convert power derived from the power plant 14 to motive force for movement of the endless track 22, but rather guides the endless track 22 and maintains it under tension as it is driven by the drive wheel 24. The idler wheel 23 is rotatable about an axis of rotation which is transverse to the longitudinal direction of the tracked utility vehicle 10. In this embodiment, the idler wheel 23, which is located in a rear region of the chassis 12, and more specifically in a rear region of the lower frame structure 62 of the chassis 12, may comprise a sprocket or any other type of wheel that engages the endless track 22.

The support wheels $28_1$-$28_4$ are arranged in an in-line configuration extending along the longitudinal direction of tracked utility vehicle 10 and roll on the bottom run 42 of the endless track 22 as the vehicle 10 moves on the ground. The support wheels $28_1$-$28_4$ do not convert power derived from the power plant 14 to motive force for movement of the endless track 22, but rather support and distribute onto the ground via the endless track 22 the portion of the weight of the vehicle 10 that is supported by the track assembly $16_i$. The support wheels $28_1$-$28_4$ may also maintain the shape and position of the endless track 22, as well as keep the track 22 generally aligned with the general direction of vehicular movement.

Each of the support wheels $28_1$-$28_4$ occupies most of the height $H_{ta}$ of the track assembly $16_i$. That is, each of the support wheels $28_1$-$28_4$ has a diameter $D_{sw}$ corresponding to at least half, in some cases at least two-thirds, and in some cases at least three-quarters of the height $H_{ta}$ of the track assembly $16_i$. In this case, the diameter $D_{sw}$ of each of the support wheels $28_1$-$28_4$ corresponds to about 65% of the height $H_{ta}$ of the track assembly $16_i$. In some embodiments, the diameter $D_{sw}$ of each of the support wheels $28_1$-$28_4$ may be such that the top run 40 of the endless track 22 can contact the support wheels $28_1$-$28_4$ in use. In other embodiments, the support wheels $28_1$-$28_4$ may be made smaller such that there is no contact between the top run 40 of the endless track 22 and the support wheels $28_1$-$28_4$ in use.

The support wheels $28_1$-$28_4$ are carried by a plurality of wheel-carrying assemblies $50_1$, $50_2$ of the track assembly $16_i$. Each of the wheel-carrying assemblies $50_1$, $50_2$ carries at least two of the support wheels $28_1$-$28_4$ and, since it is an assembly carrying wheels, will be referred to as a "bogie". More particularly, in this embodiment, the bogie $50_1$ carries the support wheels $28_1$, $28_2$ and the bogie $50_2$ carries the support wheels $28_3$, $28_4$.

Figure 41:
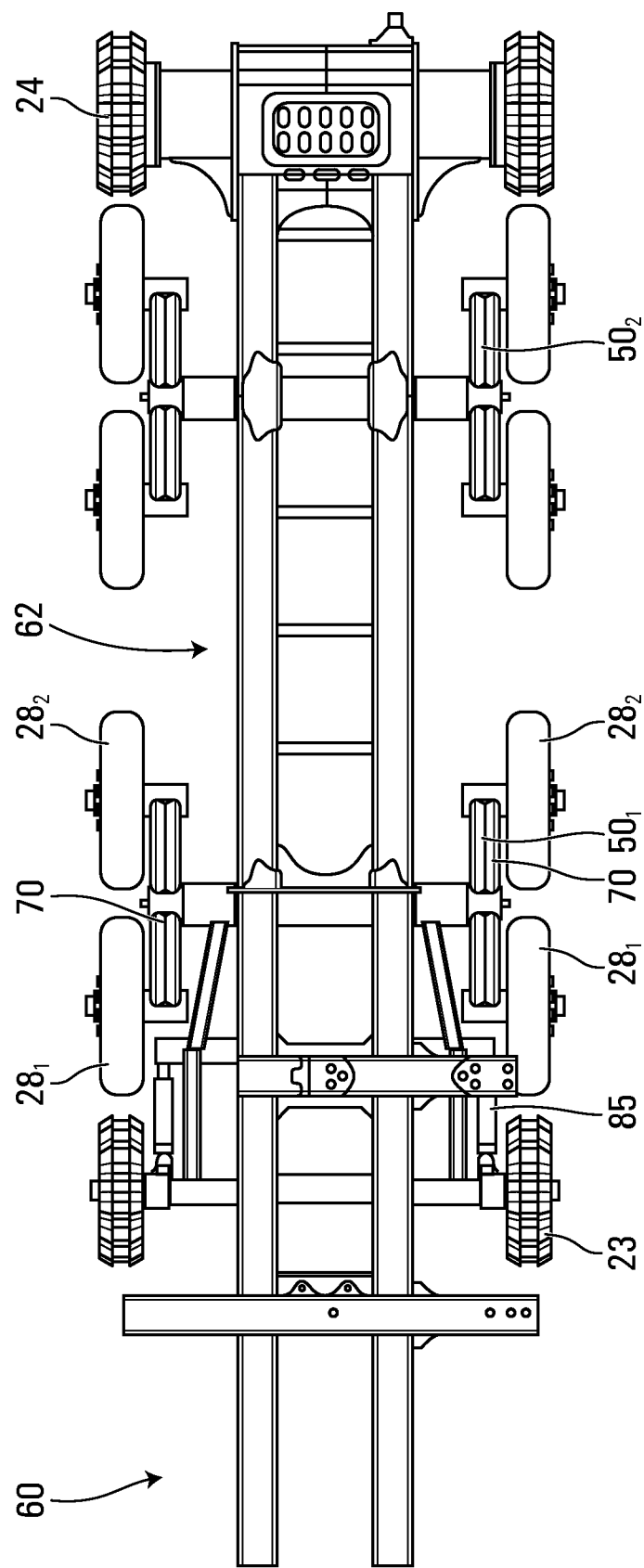
FIG. 41 shows a top view of the chassis of the vehicle mounted with wheels of the track assemblies of the vehicle mounted thereto.
Figure 42:
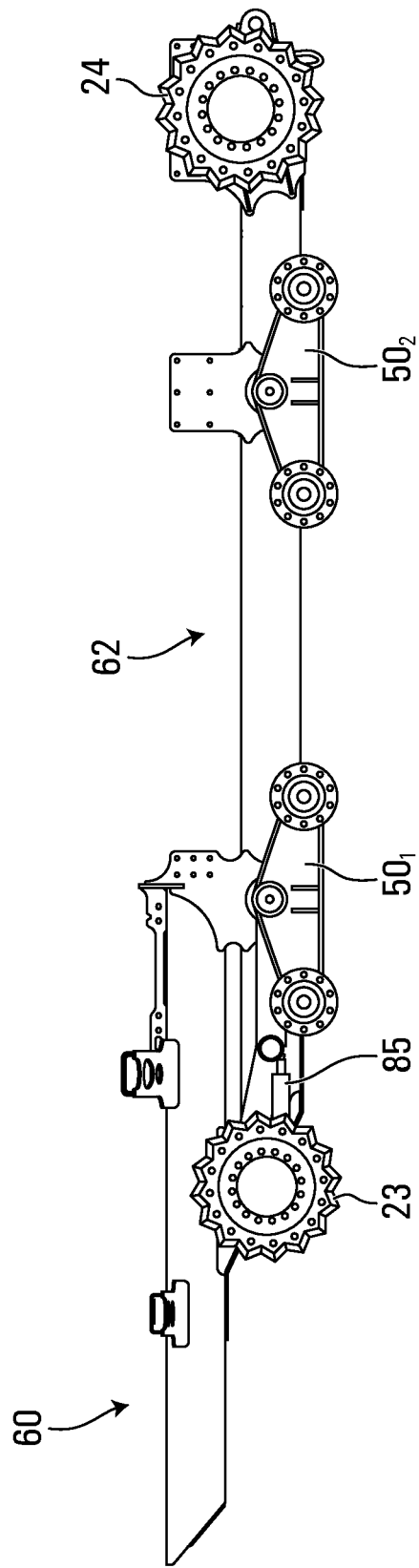
FIG. 42 shows a side of the chassis of the vehicle with an idler wheel, a drive wheel and bogies mounted thereto.

With additional reference to FIGS. 26, 41 and 42, the bogie $50_1$ comprises a link 70 interconnecting the support wheels $28_1$, $28_2$ and pivotable relative to the lower frame structure 62 about a pivot 71 which defines a pivot axis. The link 70 is a connecting structure that may have any suitable form (e.g., a single member or a plurality of members connected to one another by one or more fasteners, welding, etc.). More specifically, the link 70 comprises an axle for mounting within an aperture of its corresponding support member $104_i$. The axle of the link 70 may be secured to the support member $104_i$ in any suitable way (e.g., via fasteners). The support wheels $28_1$, $28_2$ are rotatably mounted to the link 70 via respective axles which define respective axes of rotation of the support wheels $28_1$, $28_2$. In this embodiment, the pivot axis of the link 70 lies closer to the axis of rotation of the support wheel $28_1$ than that of the support wheel $28_2$ and above the axes of rotation of the support wheels $28_1$, $28_2$. The pivot axis of the link 70 and the axes of rotation of the support wheels $28_1$, $28_2$ may be positioned differently in relation to one another in other embodiments (e.g., the pivot axis of the link 70 may lie equidistant between the axes of rotation of the support wheels $28_1$, $28_2$). The bogie $50_2$ is configured similarly to the bogie $50_1$ and will thus not be further discussed.

In this embodiment, each bogie $50_i$ and the drive wheel 24 are aligned with respective ones of the lateral plates $106_1$-$106_6$ in the longitudinal direction of the vehicle 10. Thus, in this embodiment, a projection of the axis of rotation of each bogie $50_i$ intersects a projection onto the ground plane of at least one of the lateral plates $106_1$-$106_6$. Also in this embodiment, a projection of the axis of rotation 192 of the drive wheel 24 onto a ground plane intersects a projection onto the ground plane of at least one of the lateral plates $106_1$-$106_6$.

The endless track 22 engages the ground to provide traction to the tracked utility vehicle 10. More particularly, as the drive wheel 24 is rotated by power derived from the power plant 14, the drive wheel 24 imparts motion to the endless track 22 for traction of the vehicle 10 on the ground. The endless track 22 has an inner side 32 facing the wheels 24, 23, $28_1$-$28_4$ and a ground-engaging outer side 33, opposite the inner side 32, for engaging the ground.

Figure 27:
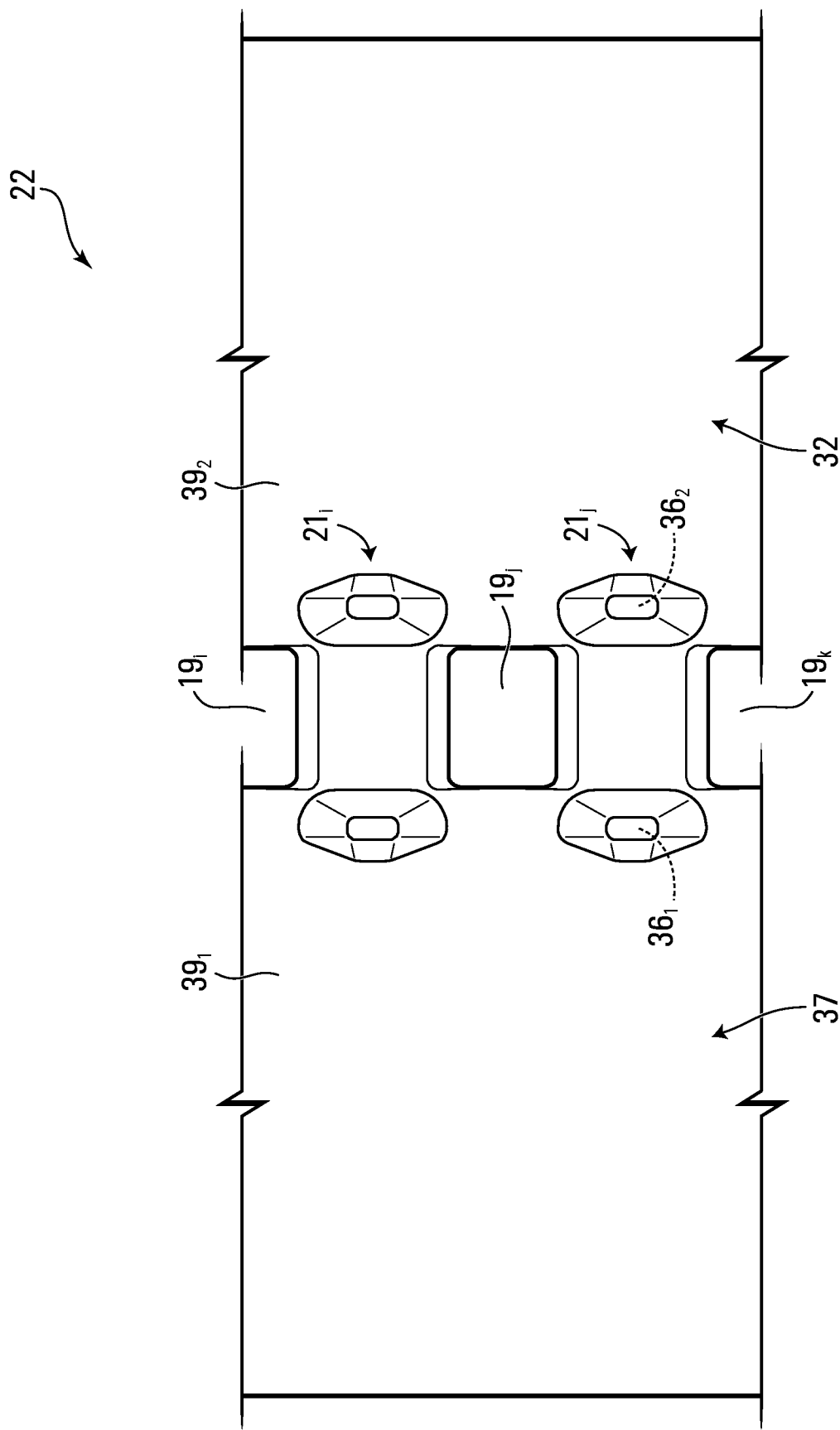
FIGS. 27 and 28 show a top view of an inner side, and a cross-sectional view, of an endless track in accordance with an embodiment of the invention.
Figure 28:
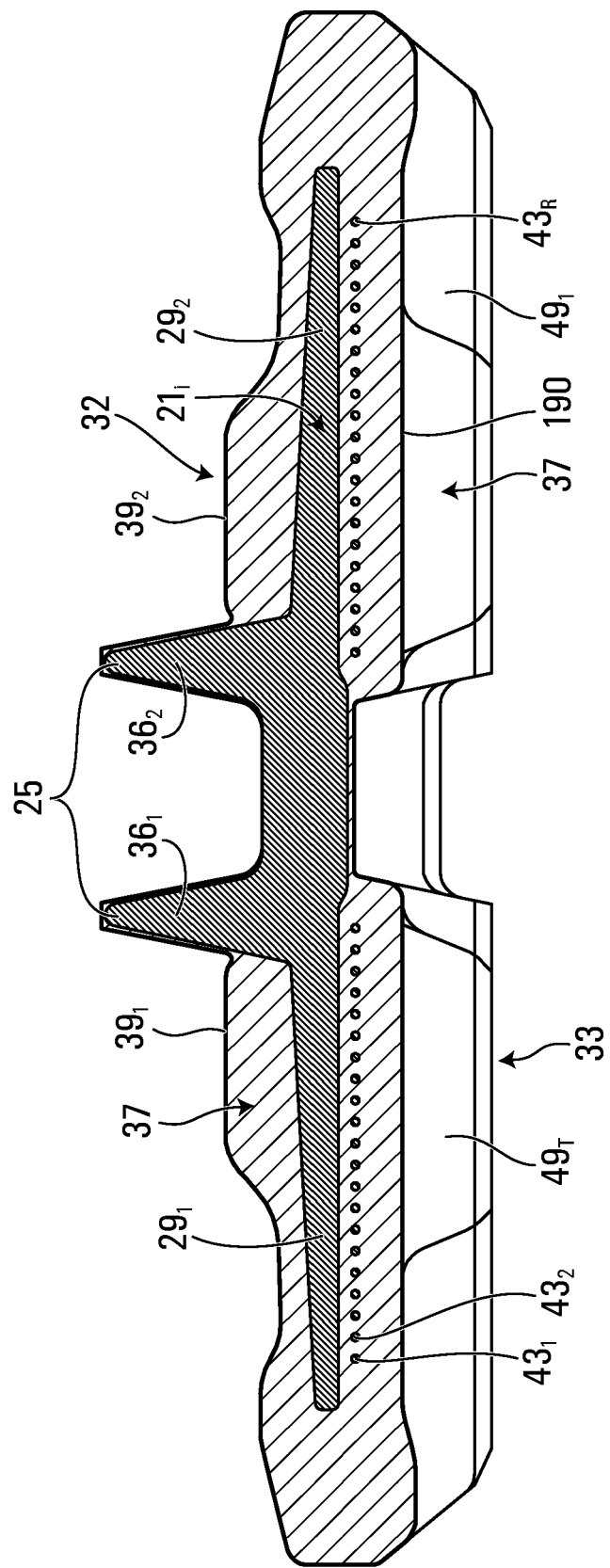

In this embodiment, as shown in FIGS. 27 and 28, the endless track 22 comprises an elastomeric body 37 underlying its inner side 32 and its ground-engaging outer side 33. The body 37 is elastomeric in that it comprises elastomeric material which allows the track 22 to elastically change in shape as it is in motion around the wheels 24, 23, $28_1$-$28_4$. The elastomeric material of the body 37 can be any polymeric material with suitable elasticity. In this embodiment, the elastomeric material includes rubber. Various rubber compounds may be used and, in some cases, different rubber compounds may be present in different areas of the track 22. In other embodiments, the elastomeric material may include another elastomer in addition to or instead of rubber (e.g., polyurethane elastomer).

A plurality of cores $21_1$-$21_C$ are embedded in the elastomeric material of the body 37 of the endless track 22, spaced apart along the longitudinal direction of the track 22, and extending transversally to the longitudinal direction of the track 22 to impart transverse rigidity to the track 22. The cores $21_1$-$21_C$ are made of rigid material. For instance, in this embodiment, the cores $21_1$-$21_C$ are metallic (e.g., steel) cores. This type of track can thus sometimes be referred to as a "metal-embedded rubber track" (MERT).

The cores $21_1$-$21_C$ interact with the wheels 24, 23, $28_1$-$28_4$ to impart and/or guide motion of the endless track 22. For example, in this embodiment, the track 22 has a plurality of drive openings $19_1$-$19_O$ for receiving teeth of the drive wheel 24 such that the drive wheel 24 can engage parts of the track 22 where are located individual ones of the cores $21_1$-$21_C$ in order to apply motive force to the track 22. The cores $21_1$-$21_C$ also guide motion of the track 22 as it is driven by the drive wheel 24. More particularly, each core $21_i$ comprises a pair of wings $29_1$, $29_2$ and a wheel guide 25 between the wings $29_1$, $29_2$. The wheel guide 25 comprises at least one, in this case, two guide projections $36_1$, $36_2$ projecting on the inner side 32 of the endless track 22. In this embodiment, when its teeth enter the drive openings $19_1$-$19_O$ of the track 22, the drive wheel 24 engages the wheel guide 25 of the core $21_i$ between the guide projections $36_1$, $36_2$ to drive the track 22, while the guide projections $36_1$, $36_2$ pass in a guiding space 38 defined by each of the support wheels $28_1$-$28_4$ in order to guide the track 22 relative to the support wheels $28_1$-$28_4$.

One or more reinforcements may be embedded in the elastomeric material of the body 37 of the endless track 22. For instance, a reinforcement may be a layer of reinforcing cables $43_1$-$43_R$ that are adjacent to one another and that extend in the longitudinal direction of the track 22 to enhance strength in tension of the track 22 along its longitudinal direction. In some cases, a reinforcing cable $43_i$ may be a cord or wire rope including a plurality of strands or wires. In other cases, a reinforcing cable $43_i$ may be another type of cable and may be made of any material suitably flexible longitudinally (e.g., fibers or wires of metal, plastic or composite material). Various other types of reinforcements may be provided in other embodiments.

The ground-engaging outer side 33 of the endless track 22 comprises a tread pattern to enhance traction on the ground. The tread pattern comprises a plurality of traction projections $49_1$-$49_T$, which can be referred to as "traction lugs", spaced apart along the longitudinal direction of the track 22 and engaging the ground to enhance traction. The ground-engaging outer side 33 of the track 22 also comprises a ground-engaging surface 190 in between the traction projections $49_1$-$49_T$.

Figure 38:
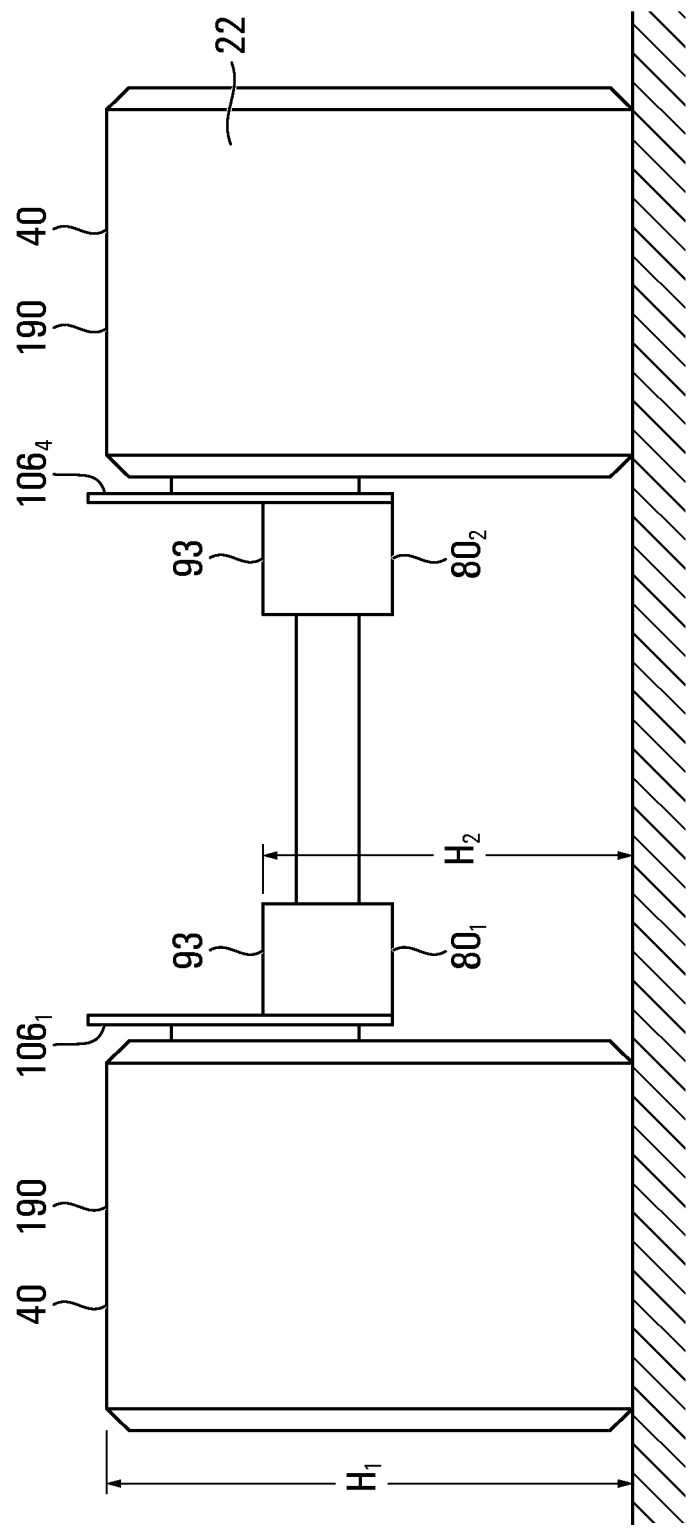
FIG. 38 shows a rear view of the lower frame structure and the track assemblies with a rear drawbar of the lower frame structure to reveal the rails of the lower frame structure.

As shown in FIG. 38, in this embodiment, the top surface 93 of each rail $80_i$ of the lower frame structure 62 is positioned closer to the ground than the ground-engaging surface 190 of the top run 40 of the track 22 of respective ones of the track assemblies $16_1$, $16_2$. For instance, a distance $H_1$ measured from the ground-engaging surface 190 of the top run 40 of the track 22 to the ground is greater than a distance $H_2$ measured from the top surface 93 of the rails $80_1$, $80_2$ to the ground. For example, in some cases, the top surface 93 of each rail $80_i$ is closer to the ground than the ground-engaging surface 190 of the top run 40 of each track 22 by (i.e., $H_1$-$H_2$ may be) at least 90 mm (about 3.5 inches), in some cases by at least 300 mm (about 11.8 inches), in some cases by at least 500 mm (about 19.7 inches), and in some cases by at least 640 mm (about 25.2 inches).

The distance $H_2$ itself (i.e., the distance $H_2$ measured from the top surface 93 of the rails $80_1$, $80_2$ to the ground) may in some embodiments be 16 inches, in other non-limiting embodiments 28 inches and in still other embodiments, 42 inches, or even more.

The inner side 32 of the endless track 22 comprises the guide projections $36_1$, $36_2$ of each of the cores $21_1$-$21_C$. In addition, the inner side 32 of the track 22 comprises rolling surfaces $39_1$, $39_2$ on which the support wheels $28_1$-$28_4$ roll to apply the track 22 onto the ground.

The endless track 22 may be configured in various other ways in other embodiments.

For example, in some embodiments, as shown in FIGS. 29 and 30, the endless track 22 may comprise a pair of belts $30_1$, $30_2$ spaced apart to accommodate the wheels 24, 23, $28_1$-$28_4$ and a series of cross-links $31_1$-$31_N$ distributed longitudinally along the track 22 and extending transversally to interconnect the belts $30_1$, $30_2$.

Each belt $30_i$ is elastomeric in that it comprises rubber and/or other elastomeric material. The belt $30_i$ may comprise one or more reinforcements such as a layer of cables embedded in its rubber and/or other elastomeric material. In this case, the belt $30_i$ is made up of a series of belt sections connected to one another. In other cases, the belt $30_i$ may be a one-piece belt.

The cross-links $31_1$-$31_N$ interconnect the belts $30_1$, $30_2$ and interact with the wheels 24, 23, $28_1$-$28_4$ as the endless track 22 moves around these wheels. For example, in this embodiment, as the drive wheel 24 rotates, individual ones of the cross-links $31_1$-$31_N$ engage recesses between the teeth of the drive wheel 24, thereby causing the track 22 to be driven. Also, the cross-links $31_1$-$31_N$ help to guide motion of the track 22 by contacting the support wheels $28_1$-$28_4$. More particularly, each cross-link $31_i$ comprises a wheel guide 44 including a pair of guide projections $45_1$, $45_2$ projecting on the inner side 32 of the endless track 22. In this embodiment, when its teeth enter gaps between the cross-links $31_1$-$31_N$, the drive wheel 24 engages the wheel guide 44 of the cross-links $28_1$-$28_4$ between the guide projections $45_1$, $45_2$ to drive the track 22, while the support wheels $28_1$-$28_4$ pass between the guide projections $45_1$, $45_2$ in order to guide the track 22 relative to the support wheels $28_1$-$28_4$. In such embodiments, each of the support wheels $28_1$-$28_4$ may be a unitary support wheel as shown in FIG. 31.

Each cross-link $31_i$ comprises an elongated member 73 extending transversally to the longitudinal direction of the endless track 22 to interconnect the belts $30_1$, $30_2$. The elongated member 73 is made of rigid material, in this case metallic material (e.g., steel). The elongated member 73 is secured to the belts $30_1$, $30_2$ by fasteners which extend through the elongated member 73, the belts $30_1$, $30_2$, and backing plates $75_1$, $75_2$ disposed on the inner side 32 of the track 22. In this embodiment, the cross-link $31_1$ comprises a polymeric sole 77 mounted to the elongated member 73. The polymeric sole 77 can be used when the vehicle 10 is to travel on a hard surface (e.g., a paved surface) in order to minimize an impact of the cross-link $31_i$ on that surface. In other embodiments, the cross-link $31_i$ may not include any polymeric sole.

As another example, in some embodiments, the endless track 22 may comprise an endless elastomeric body underlying its inner side 32 and its ground-engaging outer side 33, similar to the elastomeric body 37 discussed above in respect of FIGS. 27 and 28, but without cores embedded in the elastomeric body (e.g., an "all-rubber" track).

The track assembly $16_i$ comprises a track tensioner 85 for maintaining tension of the endless track 22. In this embodiment, as shown in FIGS. 41 and 42, the track tensioner 85 is connected between the transversal reinforcement element 202 and the axle of the idler wheel 23 to urge the idler wheel 23 in a direction to maintain the tension of the endless track 22. Also, in this embodiment, the track tensioner 85 is a fluidic tensioning system, e.g., a hydraulic or pneumatic tensioning system, which comprises a piston-cylinder tensioning actuator 79 connected to a fluid reservoir. In this example of implementation, the tensioning actuator 79 is a hydraulic piston-cylinder actuator.

Figure 32:
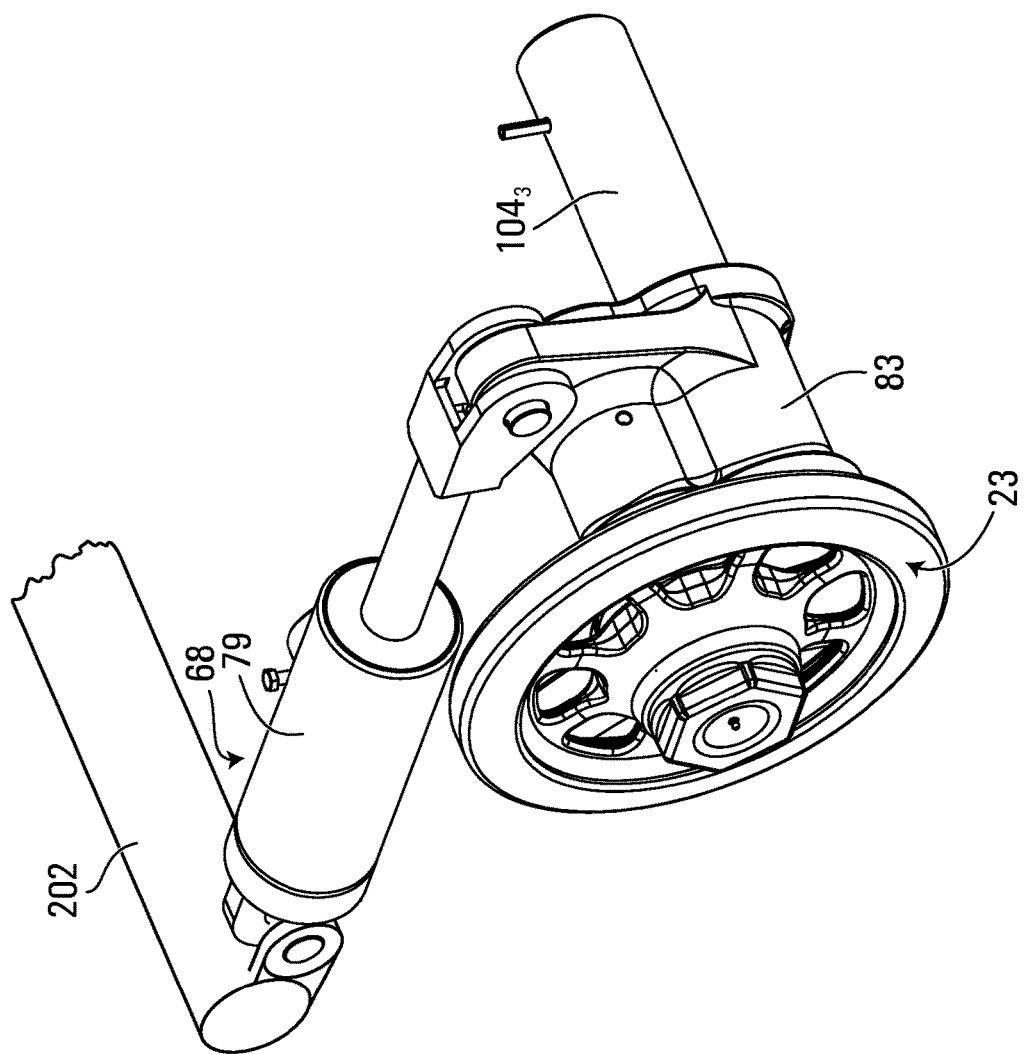
FIGS. 32 and 33 show a perspective view and a cross-sectional view of a track tensioner in relation to wheels of a track assembly.
Figure 33:
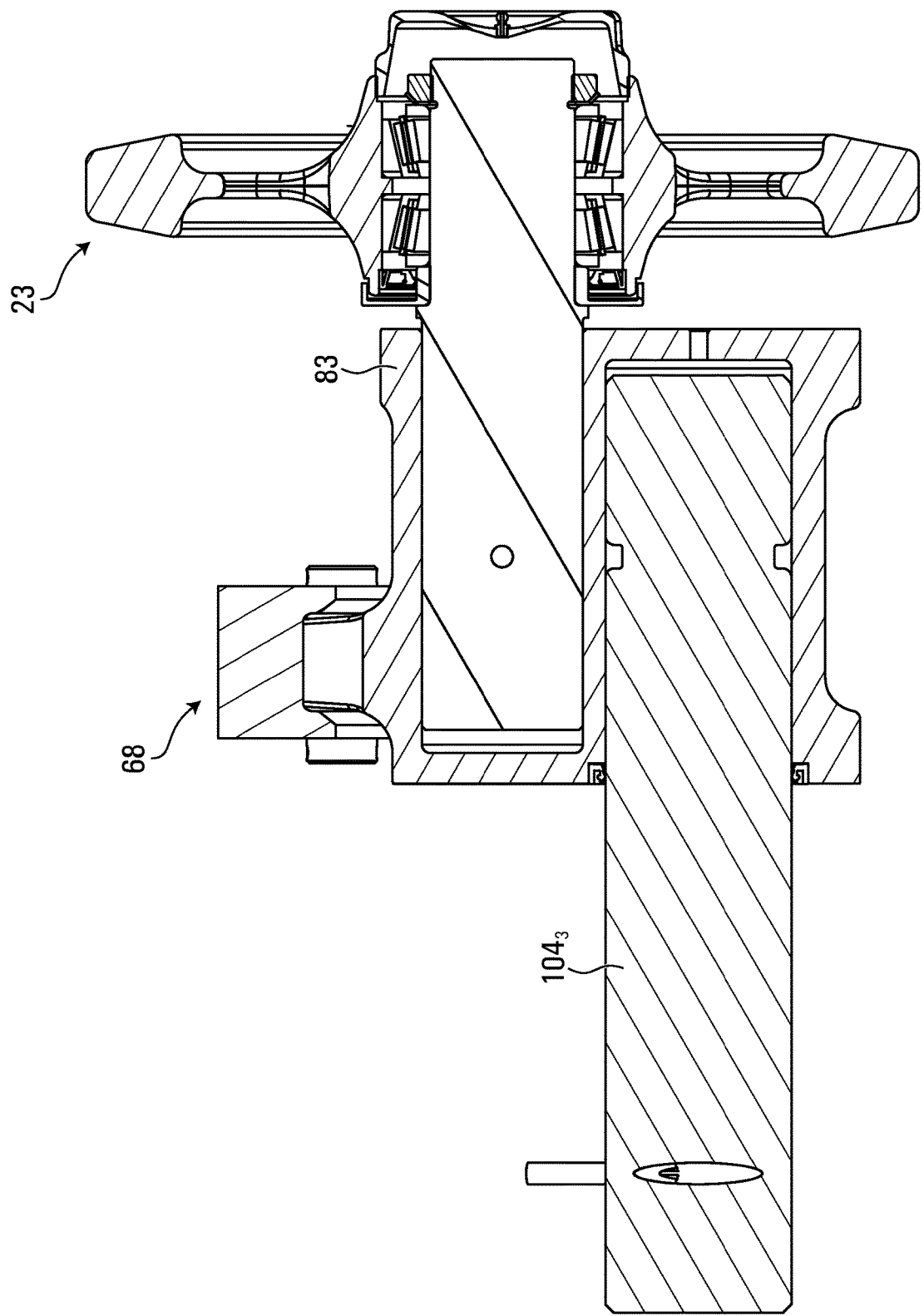

More particularly, in this embodiment, with additional reference to FIGS. 32 and 33, the tensioning actuator 79 is connected at one end to the transversal reinforcement element 202 and at another end to an idler wheel support arm 83 which is pivotable about a the support member $104_3$. The axle of the idler wheel 23 is fixed to the idler wheel support arm 83. The tensioning actuator 79 can apply the tension in the track 22 by extending or retracting to turn the idler wheel support arm 83 about the support member $104_3$ and thus move the idler wheel 23 further or closer to the drive wheel 24.

In this embodiment, the track tensioner 85 becomes active when the tracked utility vehicle 10 is started. That is, the track tensioner 85 applies a force to generate the tension in the endless track 22 when the prime mover 17 of the vehicle 10 is started.

Figure 34:
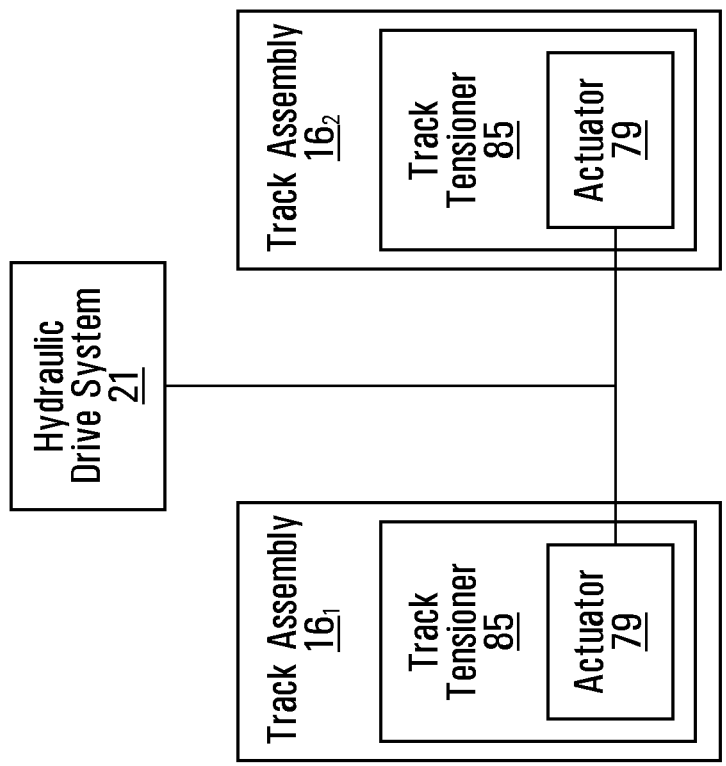
FIGS. 34 and 35 show track tensioners of the track assemblies hydraulically connected to a hydraulic drive system of the tracked vehicle.

With additional reference to FIG. 34, in this embodiment, the track tensioner 85 is hydraulically connected to the hydraulic drive system 21 of the vehicle 10 such that the tension in the endless track 22 is generated by the hydraulic fluid of the hydraulic drive system 21. The tensioning actuator 79 is in hydraulic communication with the hydraulic drive system 21 such that, when the prime mover 17 is started and starts to power the hydraulic drive system 21, the hydraulic fluid of the hydraulic drive system 21 acts on the tensioning actuator 79, which applies a force to generate the tension in the endless track 22.

Figure 35:
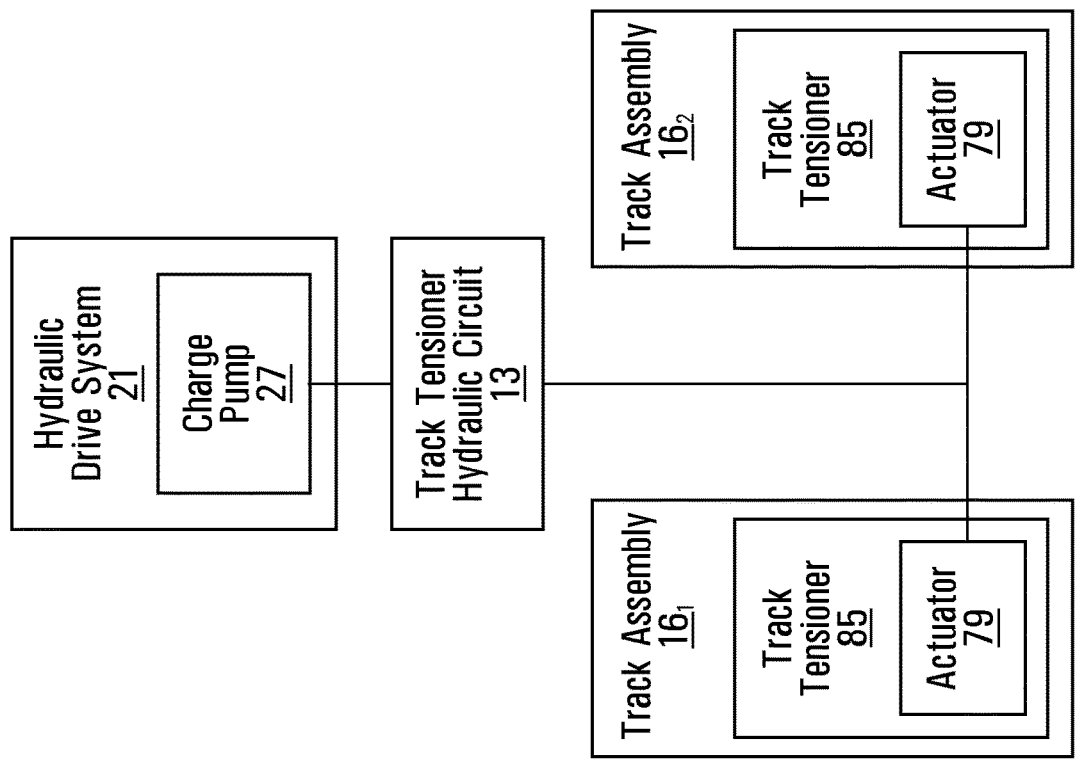

More particularly, as shown in FIG. 35, in this embodiment, the hydraulic drive system 21 comprises a charge pump 27 hydraulically connected to the tensioning actuator 79 via a track tensioner hydraulic circuit 13.

Although in this embodiment the track tensioner 85 is hydraulically connected to the hydraulic drive system 21 of the vehicle 10 via the charge pump 27 such that the tension in the endless track 22 is generated when the prime mover 17 is started and starts to power the hydraulic drive system 21, the track tensioner 85 may be connected in other ways such that it would become active when the vehicle 10 is started (e.g., there may be a dedicated pump for the track tensioner 85).

The track assembly $16_i$ may be configured in various other ways in other embodiments. For example, although in this embodiment it comprises four (4) support wheels $28_1$-$28_4$, the track assembly $16_i$ may comprise more than four support wheels (e.g., five (5) support wheels) in other embodiments. As another example, while in this embodiment the drive wheel 24 is located in a front region of the lower frame structure 62 and the idler wheel 23 is located in a rear region of the lower frame structure 62, this may be reversed in other embodiments such that the drive wheel 24 is located in a rear region of the lower frame structure 62 and the idler wheel 23 of the track assembly $16_i$ is located in a front region of the lower frame structure 62. As yet another example, while in this embodiment the idler wheel 23 is not in a driven relationship with the power plant 14, in other embodiments, the idler wheel 23 may be replaced by another drive wheel that is in a driven relationship with the power plant 14.

d) Operator Cabin

The operator cabin 20 is where an operator sits and controls the tracked utility vehicle 10. In this embodiment, the operator cabin 20 is affixed to the first and second crossmembers $66_1$, $66_2$ of the upper frame structure 60 and comprises a front side 112, a rear side 114, a pair of lateral sides $116_1$, $116_2$, a roof 118, and a floor 120. The lateral side $116_1$ of the operator cabin 20 defines an access opening 122 that can be closed by a door 124 and that allows the operator to enter or exit the operator cabin 20. A plurality of windows $126_1$-$126_W$ are provided to allow the operator to see outside of the vehicle 10.

Figure 39:
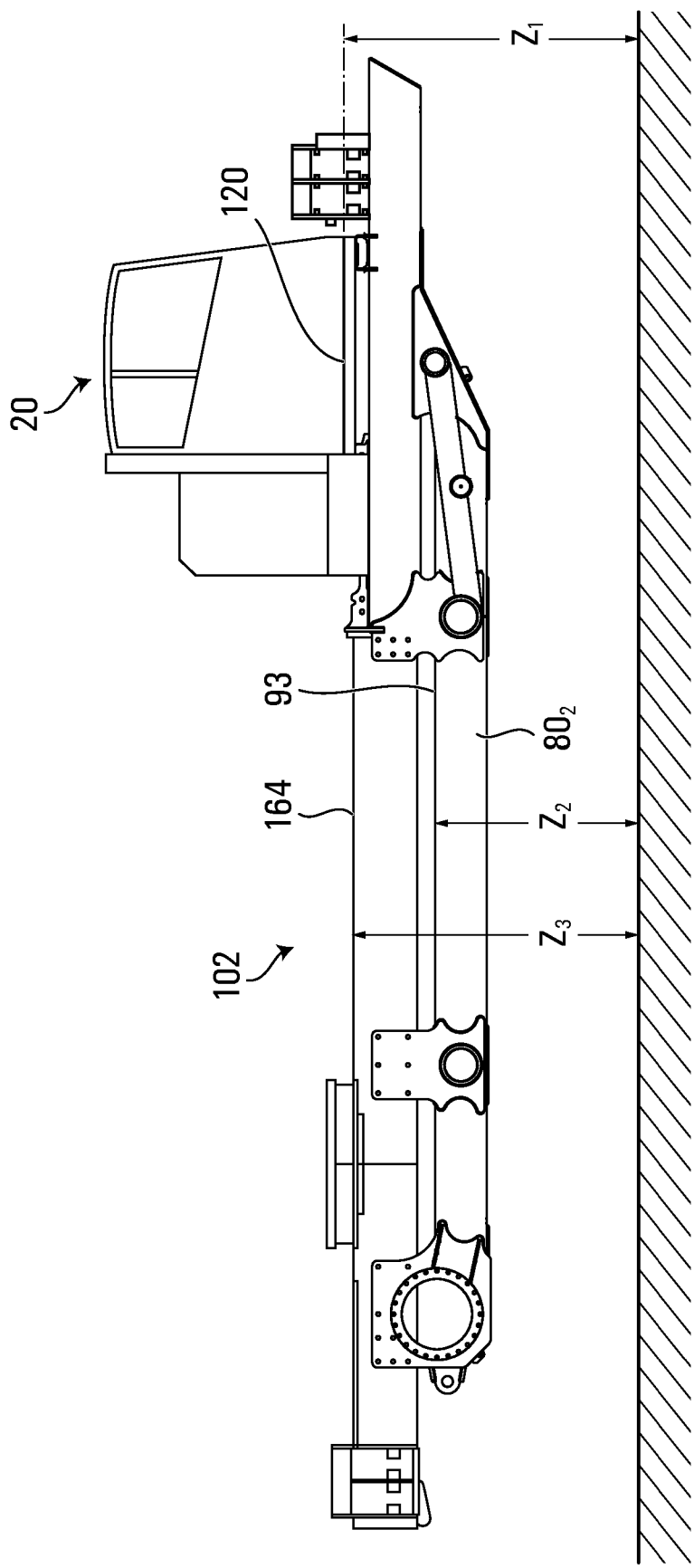
FIG. 39 shows a side view of the chassis mounted with the torque box, the operator cabin and the power plant.

In this embodiment, with additional reference to FIG. 39, the top surface 93 of each rail $80_i$ of the pair of parallel rails $80_1$, $80_2$ is positioned closer to the ground than the floor of the operator cabin 20. For instance, a distance $Z_1$ measured from the floor 120 of the operator cabin 20 to the ground may be greater than a distance $Z_2$ measured from the top surface 93 of each rail $80_i$ to the ground. For example, the top surface 93 of each rail $80_i$ may be closer to the ground than the floor 120 of the operator cabin 20 by (i.e., $Z_1$-$Z_2$ may be) at least 300 mm (about 11.8 inches), in some cases by at least 450 mm (about 17.7 inches), in some cases by a least 550 mm (about 21.7 inches) and in some cases by even more than 550 mm (e.g., 600 mm (about 23.6 inches)).

As another example, in this embodiment, even when the torque box 102 is mounted to the lower frame structure 62, the top surface 164 of the torque box 102 is still closer to the ground than the floor of the operator cabin 20. For instance, the distance $Z_1$ measured from the floor 120 of the operator cabin 20 to the ground may be greater than a distance $Z_3$ measured from the top surface 164 of the torque box 102 to the ground. For example, the top surface 164 of the torque box 102 may be closer to the ground than the floor 120 of the operator cabin 20 by (i.e., $Z_1$-$Z_3$ may be) at least 200 mm (about 7.9 inches), in some cases by at least 350 mm (about 13.8 inches), in some cases by a least 500 mm (about 19.7 inches) and in some cases by even more than 500 mm (e.g., 550 mm (about 21.7 inches) or more).

Figure 36:
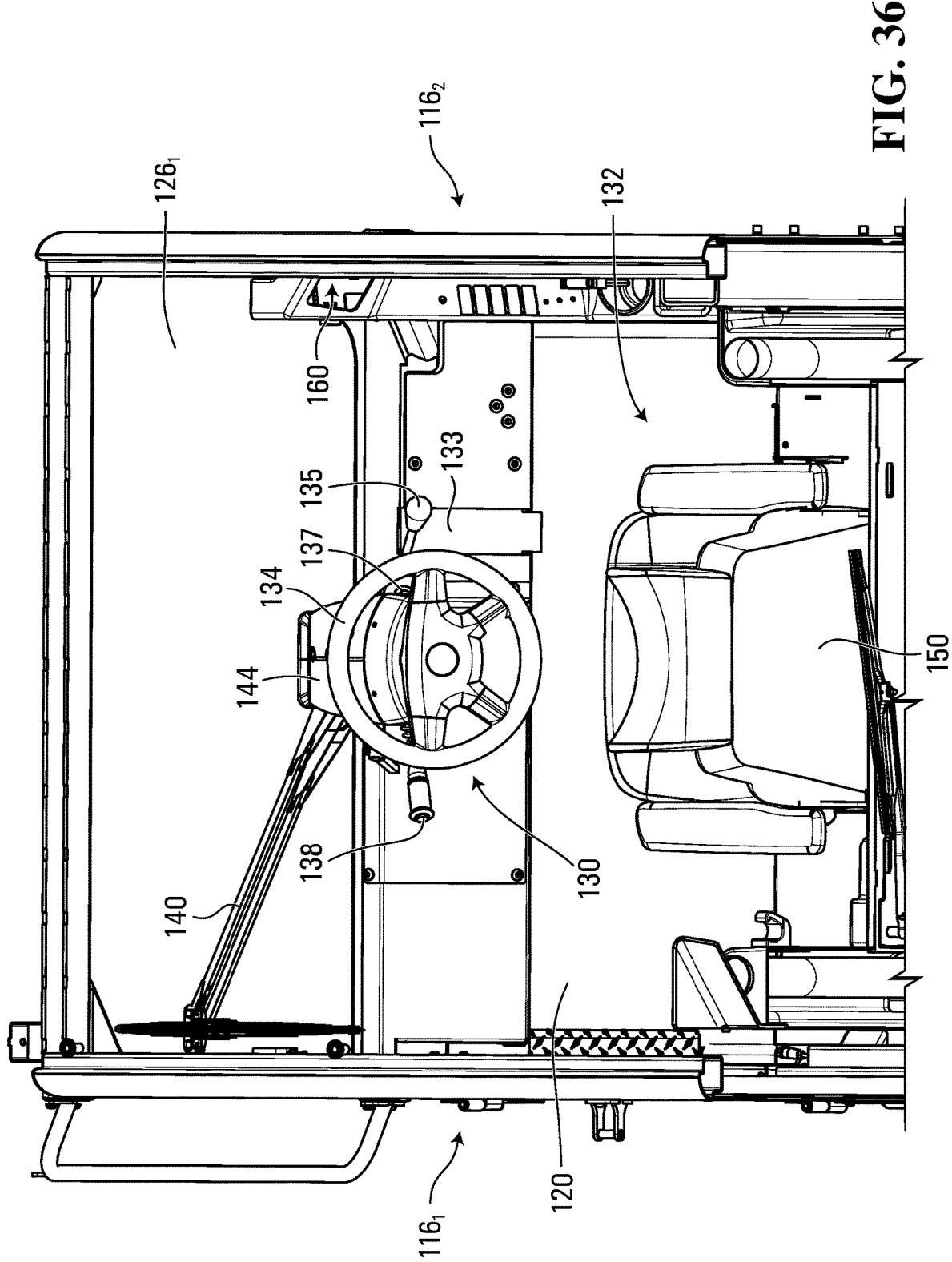
FIG. 36 shows an operator cabin of the tracked vehicle configured in a one-person configuration.

With additional reference to FIG. 36, the operator cabin 20 comprises a seating area 132 and a user interface 130.

The user interface 130 enables the operator to interact with the tracked utility vehicle 10. For example, the user interface 130 comprises controls allowing the operator to move the tracked utility vehicle 10 on the ground. In some cases, the user interface 130 may also include controls for controlling the work equipment 41 carried by the vehicle 10. The user interface 130 comprises an input portion to allow the operator to input commands for execution by the vehicle 10 and an output portion to convey information to the operator.

In this embodiment, the input portion of the user interface 130 comprises an accelerator 133, a steering device 134, a transmission state selector 135, a starter switch 137, and a control lever 138. More particularly:

The accelerator 133 allows the operator to control a speed of the vehicle 10 on the ground. In this example, the accelerator 133 comprises a speed pedal operated by a foot of the operator. The accelerator 133 may be implemented in other ways in other examples (e.g., a hand-operated accelerator).

The steering device 134 allows the operator to steer the vehicle 10 on the ground. In this example, the steering device 134 comprises a steering wheel that is rotatable relative to a steering column 144 about a steering axis. In addition to the steering wheel 134, in this example of implementation, the steering column 144 supports the transmission state selector 135, the starter switch 137, and the control lever 138. The steering device 134 may be implemented in other ways in other embodiments (e.g., a joystick).

The transmission state selector 135 allows the operator to control a state of power transmission to the track assemblies $16_1$, $16_2$. For instance, in this example, the transmission state selector 135 comprises a proportional front-neutral-reverse selector to control whether power is transmitted to the track assemblies $16_1$, $16_2$ to move in a forward or reverse direction or not transmitted to the track assemblies $16_1$, $16_2$. The transmission state selector 135 may be implemented in other ways in other embodiments.

The starter switch 137 allows the operator to start the prime mover 17 of the vehicle 10. For instance, in this example, the starter switch 137 comprises a key-receiving unit to receive a key to start the prime mover 17 of the vehicle 10. The starter switch 137 may be implemented in other ways in other embodiments (e.g., a start button, a code entry device, a biometric authentication device, etc.).

The control lever 138 allows the operator to control various devices of the vehicle 10. For instance, in this example, the control lever 138 includes a wiper control which allows the operator to control a wiper 140 of the front window $126_1$ of the operator cabin 20, a washer fluid control which allows the operator to control outflow of washer fluid from a washer fluid nozzle onto the front window $126_1$, and a turning indicator control which allows the operator to control a turning indicator of the vehicle 10. The control lever 138 may include any other suitable control in other examples.

The input portion of the user interface 130 may comprise any other input device (e.g., a set of buttons, a joystick, a trackball, etc.) in other embodiments.

In this embodiment, the output portion of the user interface 130 comprises a display 140 to visually convey information to the operator. The display 140 may be any suitable type of electronic display (e.g., a liquid-crystal display (LCD), etc.). Various information can be conveyed to the operator on the display 140. For example, in some embodiments, the display 140 may implement an instrument panel that provides: a speedometer indicator which conveys information indicative of the speed at which the vehicle 10 is moving as measured by a speedometer of the vehicle 10; a tachometer indicator which conveys information indicative of the speed at which the prime mover 17 is running as measured by a tachometer of the vehicle 10; an odometer indicator which conveys information indicative of a distance traveled by the vehicle 10 as measured by an odometer of the vehicle 10; a fuel gauge indicator which conveys information indicative of a quantity of fuel remaining in the vehicle 10; and/or any other indicator conveying information to the user. Each of the speedometer indicator, the tachometer indicator, the odometer indicator, and/or other indicators may comprise a digital numerical reading, a digital dial, a digital bar graph, a digital symbol, and/or any other element displayable on the display 140 to convey information to the operator.

The output portion of the user interface 130 may comprise any other output device (e.g., one or more mechanical dials (e.g., a speedometer dial, a fuel gauge dial, etc.) or other mechanical indicators (e.g., a mechanical odometer); one or more light indicators (e.g., low fuel light indicator, etc.); a speaker; etc.) in other embodiments.

Figure 37:
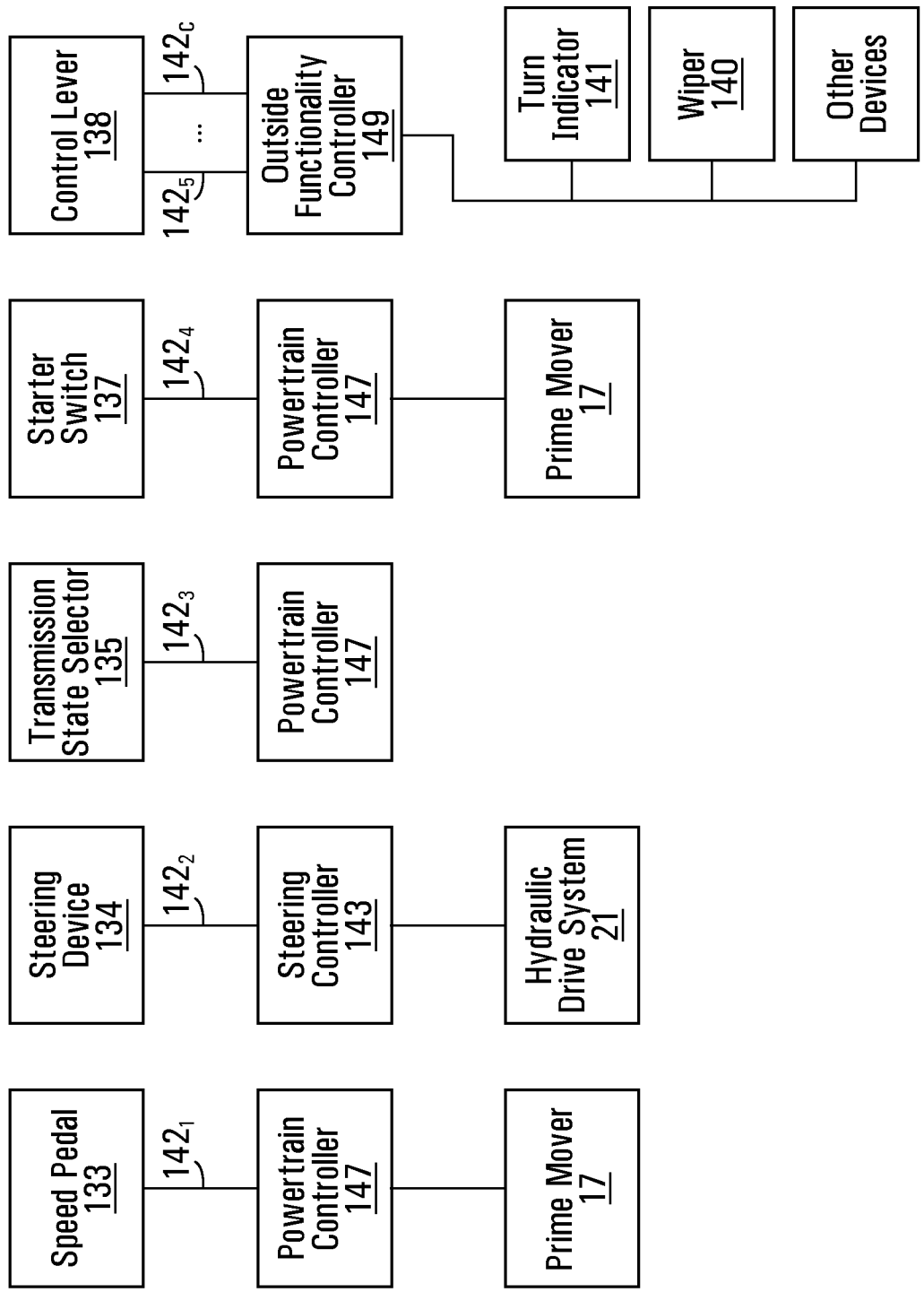
FIG. 37 shows components of a user interface of the operator cabin connected to other components of the tracked vehicle.

The user interface 130 is connected to other components of the tracked utility vehicle 10 to cause execution of commands provided by the operator and to present information to the operator. More particularly, in this embodiment, there are a plurality of connections $142_1$-$142_c$ between the user interface 130 and other components of the vehicle 10. These connections 142₁-142_c may comprise one or more mechanical links, wires, cables, wireless links, and/or other connecting elements depending on how the user interface 130 is connected to other components of the vehicle 10 (e.g., via mechanical control systems and/or via electromechanical systems (e.g., "drive-by-wire" systems)). For example, with additional reference to FIG. 37, in this embodiment:

- The connection 142₁ is between the speed pedal 133 and the prime mover 17. For instance, in this embodiment, the connection 142₁ may comprise a wire connected to a pedal position sensor (e.g., comprising a potentiometer) for sensing a position of the speed pedal 133 and transmitting a signal indicative of this position to a powertrain controller 147 controlling the prime mover 17 (e.g., an engine control unit (ECU)). In other embodiments, the connection 142₁ may comprise a mechanical link between the speed pedal 133 and a throttle for the prime mover 17.
- The connection 142₂ is between the steering wheel 134 and a steering controller 143 which controls a steering direction of the vehicle 10 by controlling the hydraulic motors of the hydraulic drive system 21 to cause the endless track 22 of one of the track assemblies 16₁, 16₂ to move faster than the endless track 22 of the other one of the track assemblies 16₁, 16₂ when the vehicle 10 turns. For instance, in this embodiment, the connection 142₂ comprises a steering device angle sensor for sensing an angle in which the steering wheel 134 is positioned and transmitting a signal indicative of this angle to the steering controller 143.
- The connection 142₃ is between the proportional front-neutral-reverse selector 135 and the powertrain controller 147. For instance, in this embodiment, the connection 142₃ may comprise a wire transmitting a signal indicative of the state of the selector 135 to the powertrain controller 147.
- The connection 142₄ is between the starter switch 137 and the prime mover 17. For instance, in this embodiment, the connection 142₄ may comprise a wire between the starter switch 137 and the powertrain controller 147.
- The connections 142₅-142_C are between the control lever 138 and the wiper 140, the washer fluid nozzle, the turning indicator 141 and/or any other device of the vehicle 10 which can be controlled via inputs at the control lever 138. For instance, in this embodiment, the connections 142₆-142_N may comprise wires between the control lever 138 and an outside functionality controller 149 of the vehicle 10 which sends signals to these devices of the vehicle 10 to control these devices. In other embodiments, the connections 142₆-142_N may comprise wires directly connected to these devices.

Controllers of the tracked utility vehicle 10, such as the powertrain controller 147, the steering controller 143 and the outside functionality controller 149, with which the user interface 130 may interact may be implemented in various manners. A controller comprises suitable hardware and/or software (e.g., firmware) implementing: an interface for receiving and transmitting signals to other components of the vehicle 10 to which it is connected; a processing portion comprising one or more processors for performing processing operations, where a processor may be a general-purpose processor executing program code stored in the controller or a specific-purpose processor comprising one or more pre-programmed hardware or firmware elements (e.g., application-specific integrated circuits (ASICs), electrically erasable programmable read-only memories (EEPROMs), etc.); and a memory portion comprising one or more memories for storing program code executed by the processing portion and/or data used during operation of the processing portion, where a memory may be a semiconductor memory (e.g., read-only memory (ROM) and/or random-access memory (RAM)), a magnetic storage medium, an optical storage medium, and/or any other suitable type of memory. In some embodiments, two (2) or more (e.g., all) controllers of the vehicle 10 may be physically distinct from one another and may be connected to one another via a bus (e.g., a controller-area network (CAN) bus or other suitable bus). In other embodiments, two (2) or more (e.g., all) controllers of the vehicle 10 may be functional entities of a single physical control unit (e.g., a vehicle controller).

The seating area 132 comprises a seat 150 for the operator of the tracked utility vehicle 10. The seat 150, which will be referred to as an "operator seat", is positioned relative to the user interface 130 to allow the operator to easily interact with the user interface 130.

Although the operator cabin 20 is described and depicted as having a one-person cabin configuration, in some embodiments, the operator cabin 20 may have a two-person cabin configuration (i.e., a cabin configuration adapted to fit two persons). For example, in such embodiments, the operator cabin 20 may comprise a passenger seat positioned next to the operator seat 150 for sitting a passenger.

While in embodiments considered above the tracked vehicle 10 is a tracked carrier vehicle carrying work equipment, in other embodiments, certain features of the tracked vehicle 10 may be implemented in other types of industrial tracked vehicles, such as an agricultural vehicle (e.g., a tractor, a harvester, etc.) or a construction vehicle (e.g., a loader, a bulldozer, an excavator, etc.).

Any feature of any embodiment discussed herein may be combined with any feature of any other embodiment discussed herein in some examples of implementation.

Although various embodiments have been illustrated, this was for the purpose of describing, but not limiting, the invention. Various modifications will become apparent to those skilled in the art and are within the scope of this invention, which is defined by the following claims.

The invention claimed is:

1. A tracked vehicle comprising:
    a chassis comprising an upper frame structure connected to a lower frame structure, the lower frame structure spanning a longitudinal distance along a longitudinal direction of the tracked vehicle, wherein over a first portion of the longitudinal distance, the lower frame structure overlaps with the upper frame structure and wherein over a second portion of the longitudinal distance, the lower frame structure does not overlap with the upper frame structure;
    an operator cabin mounted to the upper frame structure of the chassis;
    a power plant mounted to the upper frame structure of the chassis and comprising a prime mover; and
    a plurality of track assemblies for traction of the tracked vehicle, a first one of the track assemblies being on a first lateral side of the tracked vehicle, a second one of the track assemblies being on a second lateral side of the tracked vehicle, each track assembly of the plurality of track assemblies being mounted to the lower frame structure of the chassis and comprising:
        i) a plurality of wheels including:
            a drive wheel;
            an end wheel spaced apart from the drive wheel in the longitudinal direction of the tracked vehicle; and a plurality of support wheels arranged between the drive wheel and the end wheel; and ii) an endless track disposed around the plurality of wheels for engaging a ground on which the tracked vehicle travels, the drive wheel being in driving engagement with the endless track to impart motion to the endless track, wherein the lower frame structure includes a pair of parallel elongated structural members extending along at least the second portion of the longitudinal distance spanned by the lower frame structure, and wherein the lower frame structure comprises support members extending transversely between the structural members.

2. The tracked vehicle claimed in claim 1, wherein the first portion of the longitudinal distance spanned by the lower frame structure is located further towards a front of the tracked vehicle than the second portion of the longitudinal distance spanned by the lower frame structure.

3. The tracked vehicle claimed in claim 1, wherein the operator cabin is mounted to the upper frame structure.

4. The tracked vehicle claimed in claim 1, wherein the operator cabin is mounted on a top surface of the upper frame structure.

5. The tracked vehicle claimed in claim 1, wherein the second portion of the longitudinal distance spanned by the lower frame structure is greater than the first portion of the longitudinal distance spanned by the lower frame structure.

6. The tracked vehicle claimed in claim 1, wherein the pair of parallel structural members also extends into the first portion of the longitudinal distance spanned by the lower frame structure.

7. The tracked vehicle claimed in claim 1, wherein the pair of parallel structural members also extends under the upper frame structure.

8. The tracked vehicle claimed in claim 7, wherein the structural members are not hollow.

9. The tracked vehicle claimed in claim 1, wherein each structural member of the pair of parallel structural members has a top surface at a height off the ground of no more than 42 inches.

10. The tracked vehicle claimed in claim 1, wherein the second portion of the longitudinal distance spanned by the lower frame structure is greater than a longitudinal distance spanned by the upper frame structure.

11. The tracked vehicle claimed in claim 1, wherein each structural member of the pair of parallel structural members has a top surface that is separated by at least 8 inches from a top surface of the upper frame structure.

12. The tracked vehicle claimed in claim 1, wherein the endless track comprises a top run extending between the drive wheel and the end wheel over the support wheels, each structural member of the pair of parallel structural members having a top surface that is closer to the ground than a ground-engaging surface of the top run of each endless track.

13. The tracked vehicle claimed in claim 1, wherein the drive wheel has an axis of rotation, and wherein each structural member of the pair of parallel structural members has a top surface that is no more than 320 mm further from the ground than the axis of rotation of the drive wheel.

14. The tracked vehicle claimed in claim 1, wherein the operator cabin has a floor, and wherein each structural member of the pair of parallel structural members has a top surface that is at least 300 mm closer to the ground than the floor of the operator cabin.

15. The tracked vehicle claimed in claim 1, wherein the upper frame structure includes a pair of parallel beams.

16. The tracked vehicle claimed in claim 15, wherein each beam of the pair of parallel beams is hollow and has a rectangular cross-section.

17. The tracked vehicle claimed in claim 15, wherein the upper frame structure further includes first and second crossmembers disposed transversally to the pair of parallel beams.

18. The tracked vehicle claimed in claim 17, wherein the first crossmember is longer than the second crossmember.

19. The tracked vehicle claimed in claim 18, wherein the operator cabin and the power plant are affixed to the first and second crossmembers of the upper frame structure.

20. The tracked vehicle claimed in claim 1, wherein connectedness of the upper and lower frame structures provides the chassis with a greater resistance to torsion along said first portion than along said second portion.

21. The tracked vehicle claimed in claim 1, wherein the upper frame structure is connected to the lower frame structure by a connection structure.

22. The tracked vehicle claimed in claim 1, further comprising a torque box mounted to the lower frame structure.

23. The tracked vehicle claimed in claim 22, wherein the torque box does not extend into the first portion of the longitudinal distance spanned by the lower frame structure.

24. The tracked vehicle claimed in claim 23, wherein the torque box has a ground-facing bottom surface and wherein each of the structural members has a top surface that is separated from the bottom surface of the torque box by a vertical gap.

25. The tracked vehicle claimed in claim 22, wherein the operator cabin has a floor and wherein the torque box has a top surface that faces away from the ground and is substantially flat over a majority of the second portion of the longitudinal distance spanned by the lower frame structure, the top surface of the torque box being closer to the ground than the floor of the operator cabin.

26. The tracked vehicle claimed in claim 22, wherein the torque box is mounted to the lower frame structure via a plurality of plates.

27. The tracked vehicle claimed in claim 26, wherein the plurality of plates includes a pair of lateral plates separated in a direction transverse to the direction of forward motion of the vehicle, the pair of lateral plates defining a channel for laterally bounding the torque box.

28. The tracked vehicle claimed in claim 27, wherein the torque box is riveted to the lateral plates.

29. The tracked vehicle claimed in claim 27, wherein the torque box is welded to the lateral plates.

30. The tracked vehicle claimed in claim 27, wherein the torque box has a width in a direction transverse to the longitudinal direction of the vehicle, wherein each of the lateral plates has a substantially flat interior surface facing the torque box, wherein the interior surfaces of the pair of lateral plates are separated by a channel width, and wherein the channel width is at least as large as the width of the torque box.

31. The tracked vehicle claimed in claim 30, wherein the channel width is greater than the width of the torque box.

32. The tracked vehicle claimed in claim 31, further comprising at least one spacer between the torque box and at least one of the lateral plates.

33. The tracked vehicle claimed in claim 26, wherein the plurality of plates are secured to the lower frame structure with a fastener that passes through the structural members of the lower frame structure.

34. The tracked vehicle claimed in claim 26, each track assembly further comprising at least one wheel-carrying assembly that pivots about a pivot axis that is transverse to a direction of travel of the tracked vehicle, wherein a projection of said pivot axis onto a ground plane intersects a projection onto the ground plane of at least one of the plates.

35. The tracked vehicle claimed in claim 1, wherein the lower frame structure further includes a plurality of plates forming a channel for laterally bounding a torque box to be mounted above the structural members.

36. The tracked vehicle claimed in claim 35, the plates including at least a first lateral plate and a second lateral plate.

37. The tracked vehicle claimed in claim 36, the first and second lateral plates being fishplates.

38. The tracked vehicle claimed in claim 36, the first and second lateral plates being detachably connected to respective ones of the structural members.

39. The tracked vehicle claimed in claim 36, the first and second lateral plates being integrated with respective ones of the structural members.

40. The tracked vehicle claimed in claim 36, the plates further including a first frontal plate and a second frontal plate, the first and second frontal plates being connected to the upper frame structure.

41. The tracked vehicle claimed in claim 1, wherein the structural members comprise rails.

42. A chassis extending in a longitudinal direction for a tracked vehicle having an operator cabin, comprising:
    a first portion directly under the operator cabin;
    a second portion behind the operator cabin in the longitudinal direction, the second portion being lower to the ground than the first portion, the first portion being reinforced so as to provide a greater resistance to torsion than the second portion.

43. The chassis claimed in claim 42, wherein the second portion comprises a pair of parallel structural members extending in the longitudinal direction behind the operator cabin.

44. The chassis claimed in claim 43, wherein the second portion comprises support members extending transversely between the structural members.

45. The chassis claimed in claim 43, wherein the structural members extend underneath the first portion.

46. The chassis claimed in claim 42, wherein the second portion is connected to the first portion underneath the first portion.

47. The chassis claimed in claim 42, wherein the first portion comprises a pair of parallel structural members.

48. The chassis claimed in claim 47, wherein the first portion comprises cross-members disposed transversally to the pair of parallel structural members.

49. The chassis claimed in claim 42, wherein the first portion is connected to the operator cabin.

* * * * *